United States Patent
Douke et al.

(10) Patent No.: US 10,347,877 B2
(45) Date of Patent: Jul. 9, 2019

(54) BATTERY PACKAGING MATERIAL

(71) Applicant: DAI NIPPON PRINTING CO., LTD., Tokyo (JP)

(72) Inventors: Hiroki Douke, Fukuoka (JP); Yoshihiro Shinohara, Fukuoka (JP); Tsuyoshi Suzuki, Fukuoka (JP); Rikiya Yamashita, Fukuoka (JP); Kazuhiko Yokota, Fukuoka (JP); Masakazu Kandori, Fukuoka (JP); Yaichiro Hori, Fukuoka (JP); Tetsuya Ojiri, Fukuoka (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 669 days.

(21) Appl. No.: 14/765,187

(22) PCT Filed: Feb. 5, 2014

(86) PCT No.: PCT/JP2014/052696
§ 371 (c)(1),
(2) Date: Jul. 31, 2015

(87) PCT Pub. No.: WO2014/123164
PCT Pub. Date: Aug. 14, 2014

(65) Prior Publication Data
US 2015/0372263 A1      Dec. 24, 2015

(30) Foreign Application Priority Data

Feb. 6, 2013  (JP) .................................. 2013-021785
Feb. 6, 2013  (JP) .................................. 2013-021786
(Continued)

(51) Int. Cl.
*H01M 2/02*      (2006.01)
*B32B 15/085*    (2006.01)
(Continued)

(52) U.S. Cl.
CPC .......... *H01M 2/0275* (2013.01); *B32B 15/08* (2013.01); *B32B 15/085* (2013.01); *B32B 27/08* (2013.01);
(Continued)

(58) Field of Classification Search
None
See application file for complete search history.

(56) References Cited

U.S. PATENT DOCUMENTS

2002/0142178 A1    10/2002  Yamashita et al.
2004/0081887 A1*    4/2004  Sugiyama ............. H01M 2/021
                                                           429/162

(Continued)

FOREIGN PATENT DOCUMENTS

JP    2001-202927 A    7/2001
JP    2001-229887 A    8/2001
(Continued)

OTHER PUBLICATIONS

Mar. 18, 2014 Search Report issued in International Patent Application No. PCT/JP2014/052696.

*Primary Examiner* — Alix E Eggerding
(74) *Attorney, Agent, or Firm* — Oliff PLC

(57) ABSTRACT

Presented is battery packaging material which is made of a laminate including, as the essentials, a base material layer, a metal layer and a sealant layer in this order. When a product obtained by packaging a battery element with the packaging material in a hermetically sealed state through heat sealing is heated, the packaging material delaminates at least at a part of the interface between the metal layer and the outside surface of the sealant layer with the hermetically sealed state being kept, and thereafter works so as to make the product unsealed.

16 Claims, 9 Drawing Sheets

(30) Foreign Application Priority Data

| | | |
|---|---|---|
| Feb. 6, 2013 | (JP) | 2013-021787 |
| Mar. 25, 2013 | (JP) | 2013-062989 |
| Mar. 25, 2013 | (JP) | 2013-062990 |
| Mar. 25, 2013 | (JP) | 2013-062991 |
| May 10, 2013 | (JP) | 2013-099898 |
| Aug. 7, 2013 | (JP) | 2013-164055 |
| Aug. 8, 2013 | (JP) | 2013-165503 |
| Aug. 8, 2013 | (JP) | 2013-165504 |
| Sep. 3, 2013 | (JP) | 2013-182204 |

(51) Int. Cl.
  *B32B 27/08* (2006.01)
  *B32B 27/30* (2006.01)
  *B32B 27/32* (2006.01)
  *B32B 15/08* (2006.01)
  *H01M 2/08* (2006.01)

(52) U.S. Cl.
  CPC ......... *B32B 27/302* (2013.01); *B32B 27/306* (2013.01); *B32B 27/308* (2013.01); *B32B 27/32* (2013.01); *H01M 2/0277* (2013.01); *H01M 2/0285* (2013.01); *H01M 2/0287* (2013.01); *H01M 2/08* (2013.01); *B32B 2307/206* (2013.01); *B32B 2307/31* (2013.01); *B32B 2439/00* (2013.01)

(56) References Cited

U.S. PATENT DOCUMENTS

| | | |
|---|---|---|
| 2006/0172191 A1 | 8/2006 | Yamashita et al. |
| 2008/0213659 A1* | 9/2008 | Yamada ............... H01M 2/0212 429/181 |
| 2008/0241663 A1* | 10/2008 | Yamashita ............ H01M 2/021 429/122 |
| 2012/0034477 A1 | 2/2012 | Yamashita et al. |
| 2012/0258353 A1 | 10/2012 | Yamashita et al. |

FOREIGN PATENT DOCUMENTS

| | | |
|---|---|---|
| JP | 2002-245983 A | 8/2002 |
| JP | 2003-036822 A | 2/2003 |
| JP | 2012-003919 A | 1/2012 |
| JP | 2012-174438 A | 9/2012 |
| JP | 2012-203982 A | 10/2012 |
| JP | 2012-216364 A | 11/2012 |
| JP | 2012-234816 A | 11/2012 |

* cited by examiner

[Fig. 1]
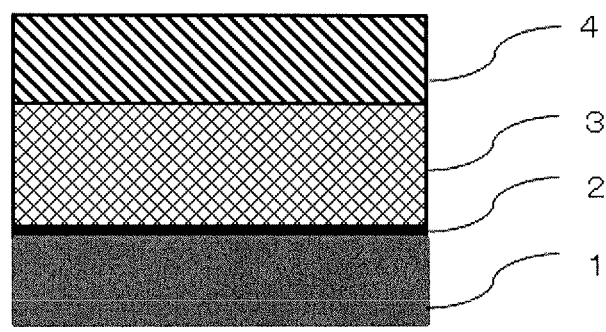
[Fig. 2]
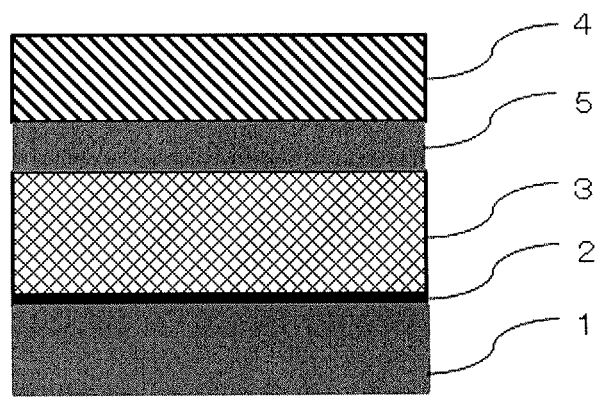

[Fig. 3]
A: State before heating
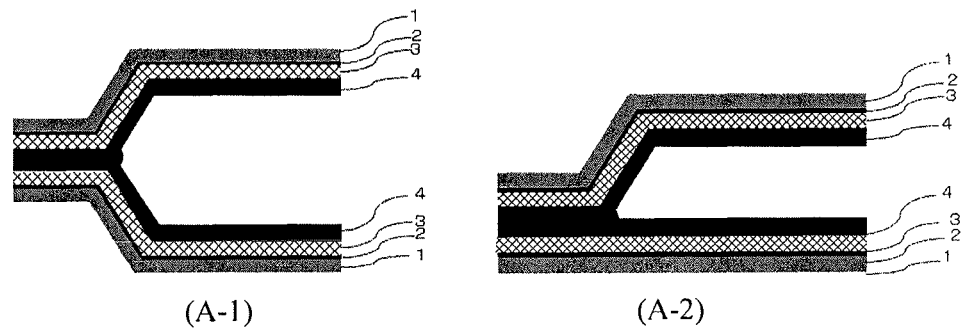
(A-1)　　　　　　　　(A-2)
B: State during delamination after start of heating
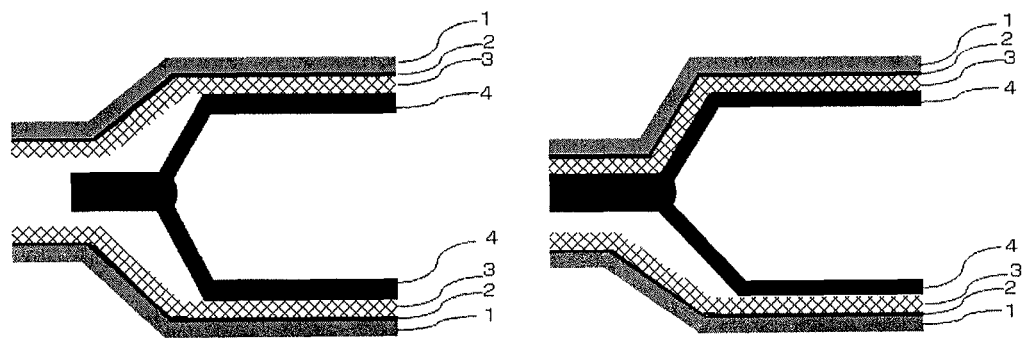
C: State during unsealing
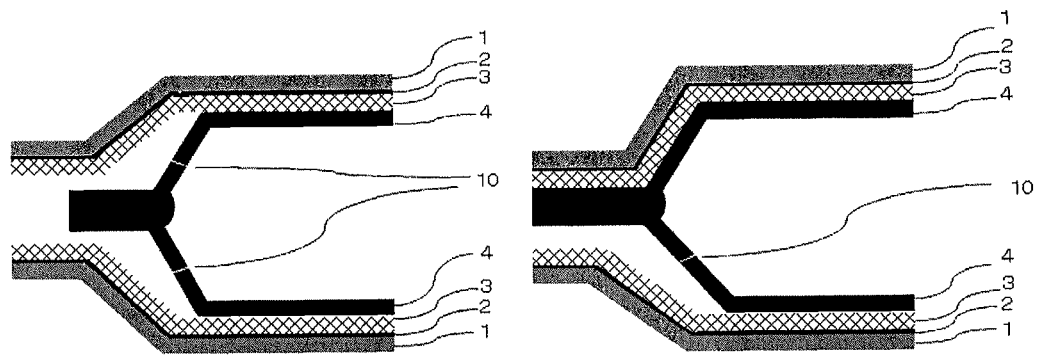

[Fig. 4]
A: State before heating
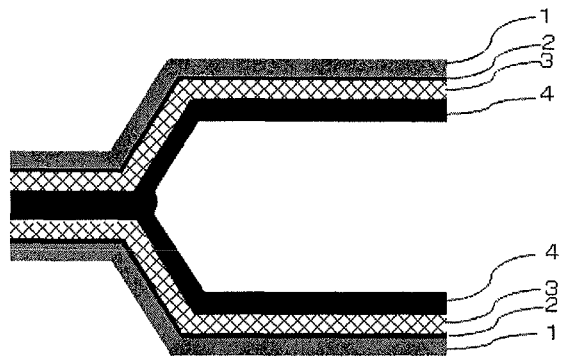
B: State during delamination after start of heating
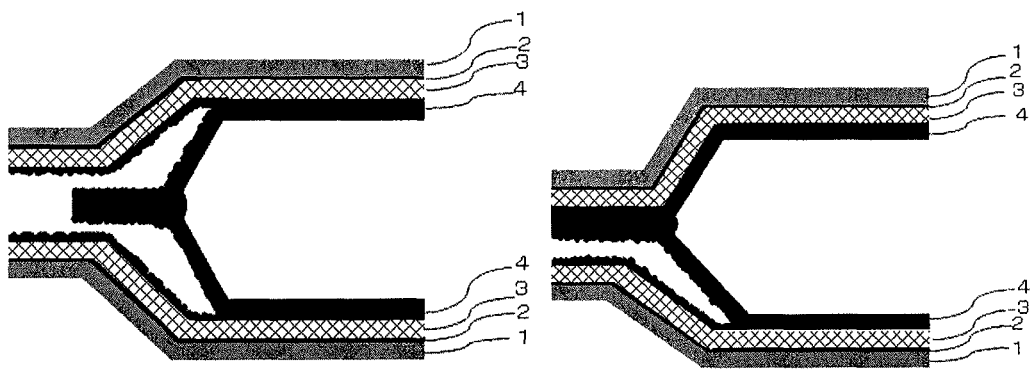
C: State during unsealing
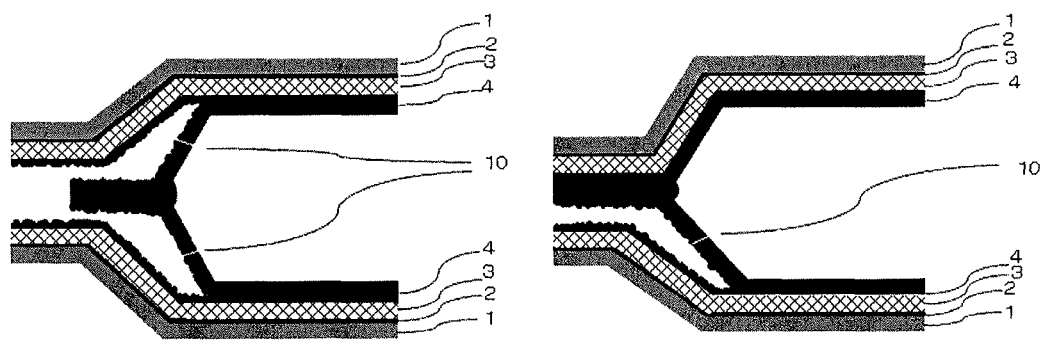

[Fig. 5]
A: State before heating
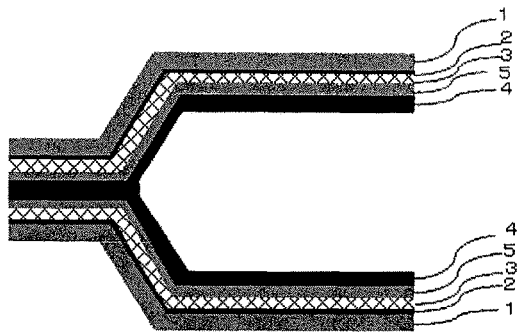
B: State during delamination after start of heating
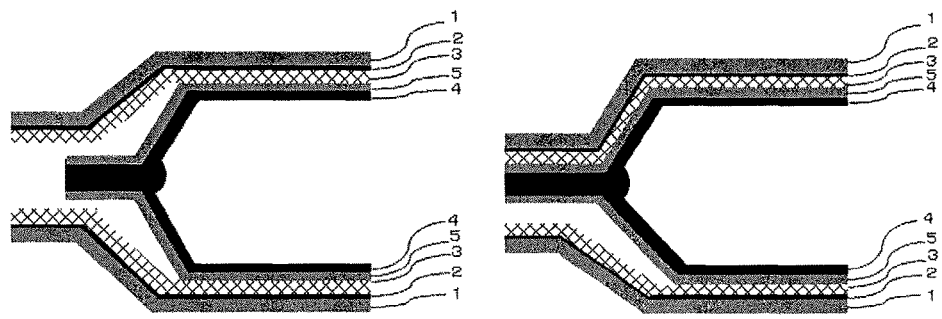
C: State during unsealing
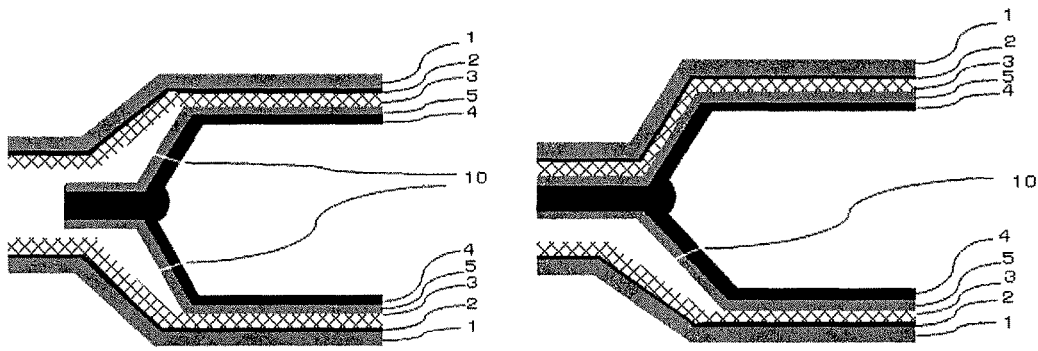

[Fig. 6]
A: State before heating
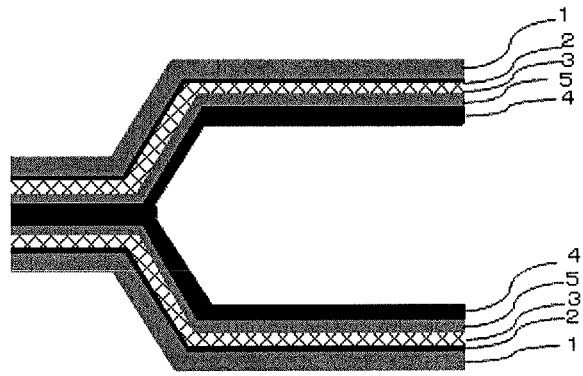
B: State during delamination after start of heating
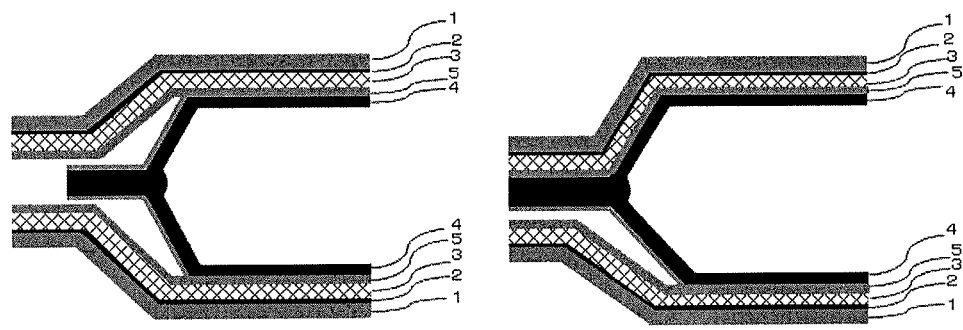
C: State during unsealing
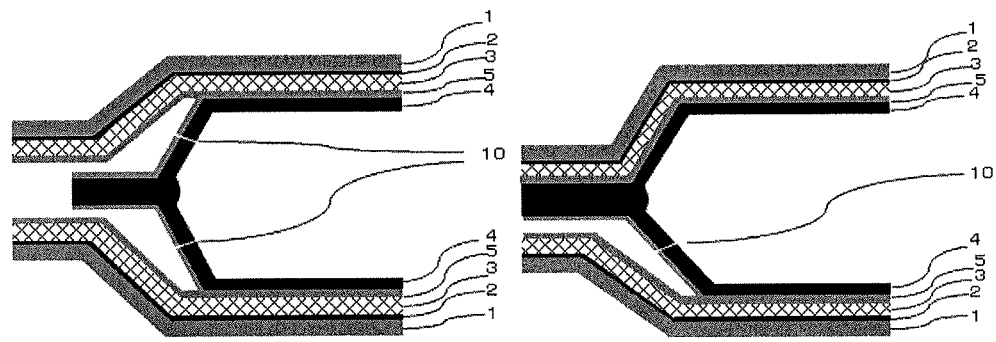

[Fig. 7]
A: State before heating
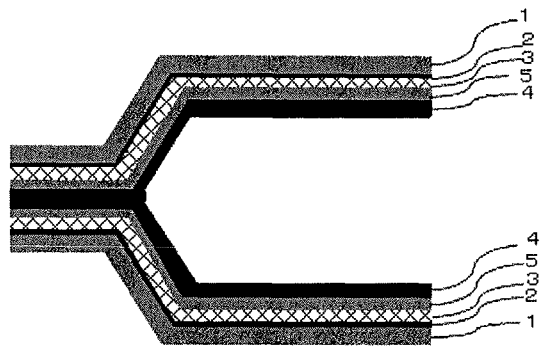
B: State during delamination after start of heating
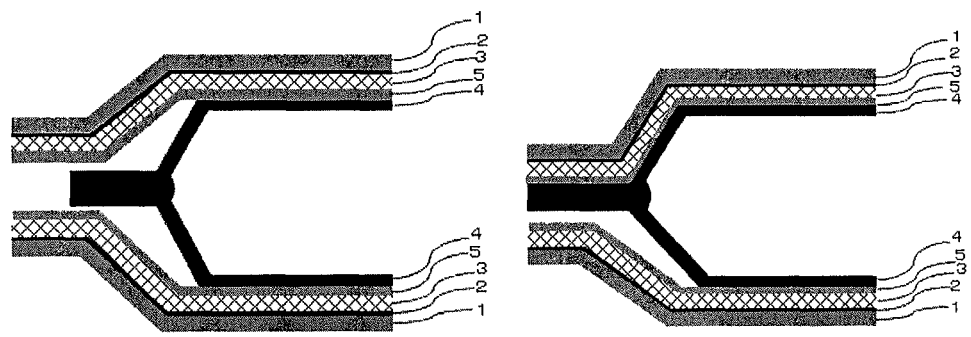
C: State during unsealing
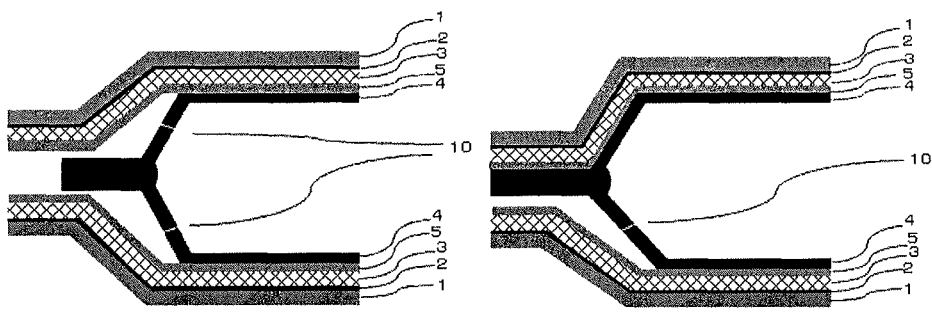

[Fig. 8]
A: State before heating
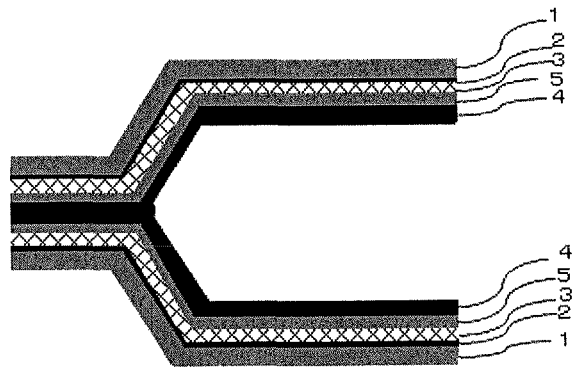
B: State during delamination after start of heating
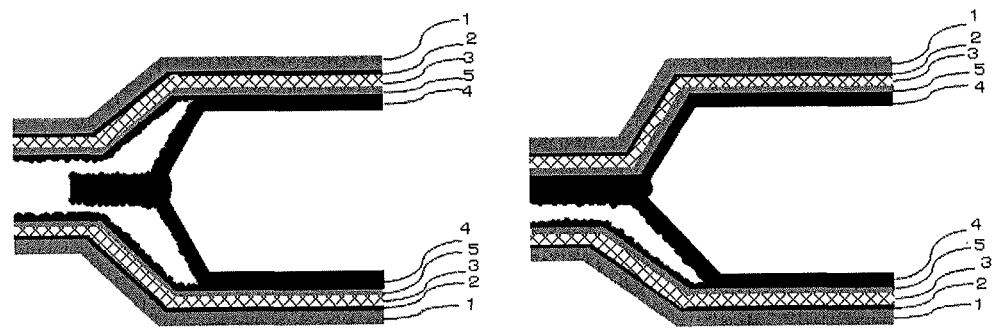
C: State during unsealing
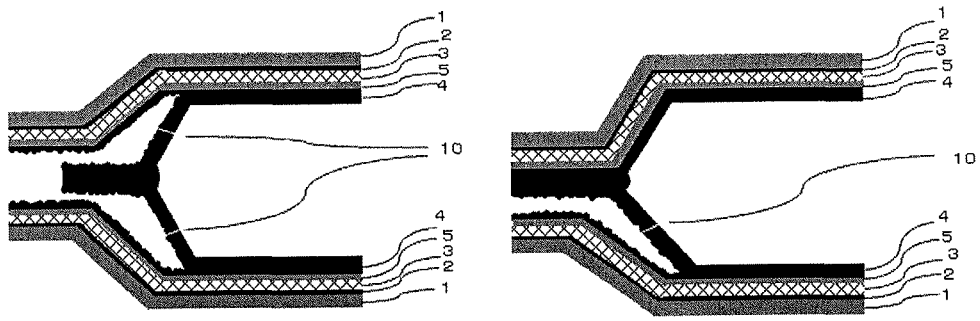

[Fig. 9]
A: State before heating
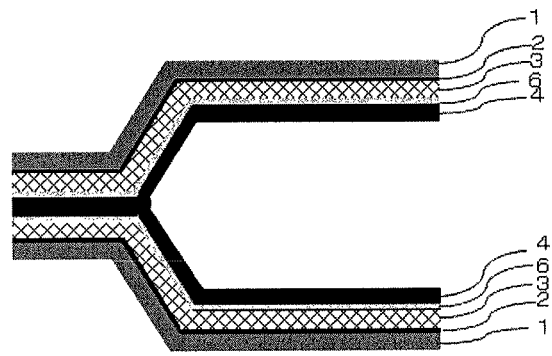
B: State during delamination after start of heating
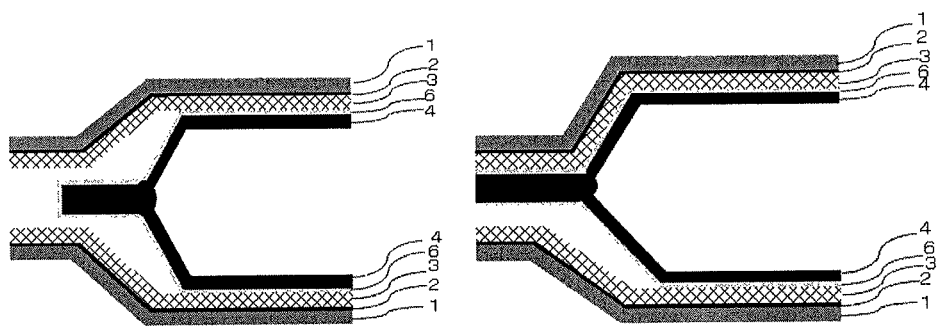
C: State during unsealing
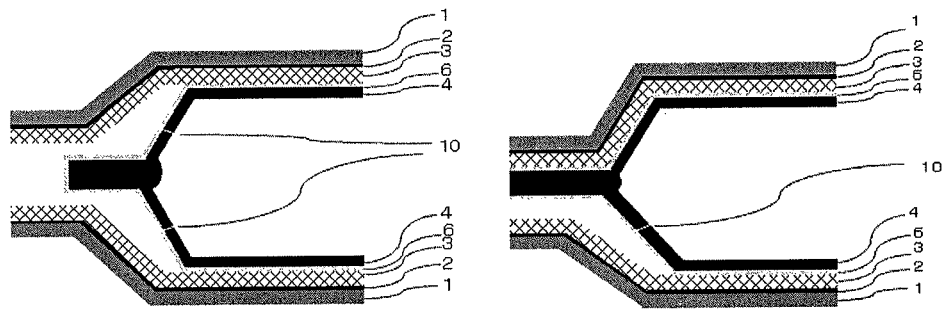

[Fig. 10]
A: State of interfacial delamination of sealant layer
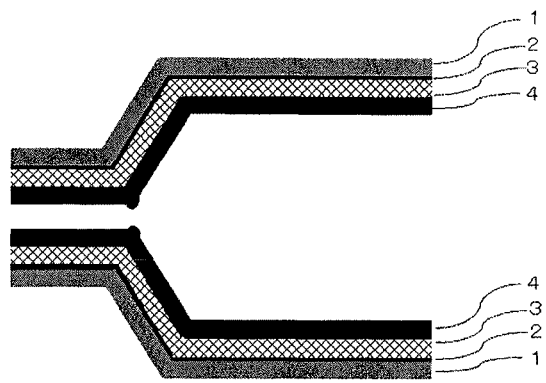
B: State of cohesive delamination of sealant layer
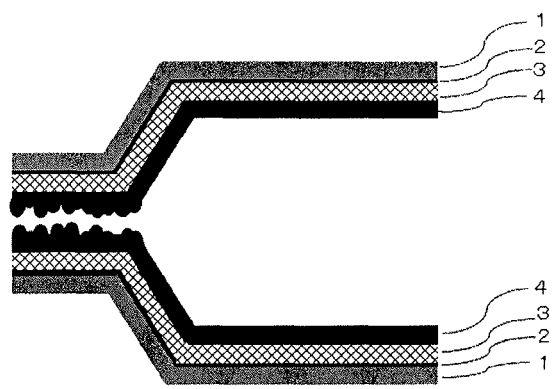
C: State during unsealing
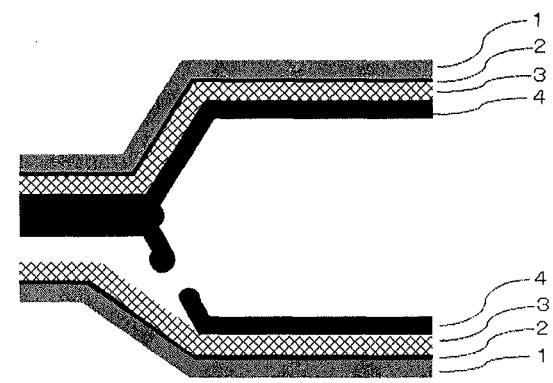

BATTERY PACKAGING MATERIAL

TECHNICAL FIELD

The present invention relates to a battery packaging material capable of ensuring safety even when the pressure or temperature in a battery persistently increases. More specifically, the present invention relates to a battery packaging material which ensures that a battery element can be kept hermetically sealed until the pressure or temperature in a battery increases to a certain level, and at the time when the battery turns into a state in which the pressure or temperature in the battery persistently increases, the battery packaging material can be quickly and gently unsealed to suppress excessive expansion of the battery packaging material, uncontrollable battery reaction, firing and the like.

BACKGROUND ART

Various types of batteries have been heretofore developed, and in every battery, a packaging material is a member that is absolutely necessary for encapsulating battery elements such as an electrode and an electrolyte. Metallic packaging materials have been often used heretofore as battery packages, but in recent years, batteries have been required to be diversified in shape, and desired to be thinner and lighter as performance of electric cars, hybrid electric cars, personal computers, cameras and mobile phones has been enhanced. However, metallic battery packaging materials that have been often used heretofore have the disadvantage that it is difficult to keep up with diversification of shapes, and there is a limit to weight reduction.

Thus, in recent years, there has been proposed a film-shaped laminate with a base material layer, an adhesive layer, a metal layer and a sealant layer laminated in this order has been proposed as a battery packaging material which is easily processed into diversified shapes and is capable of achieving thickness reduction and weight reduction (see, for example, Patent Document 1). Such a film-shaped battery packaging material is formed so as to be able to encapsulate a battery element by heat-sealing a peripheral edge by heat sealing with sealant layers facing each other.

On the other hand, the battery, depending on a type of electrolyte, may generate a combustible gas, leading to an increase in pressure. For example, when the battery is exposed to a high temperature, an organic solvent used in an electrolytic solution may be decomposed to generate a combustible gas, leading to an increase in pressure. The battery may be charged with an excessive voltage or discharged at an excessive current to persistently increase the temperature in the battery, leading to uncontrollable battery reaction.

In a battery using a film-shaped battery packaging material, an increase in pressure or temperature in the battery may cause cleavage of the battery packaging material, leading to occurrence of firing or the like due to eruption of a combustible gas. When the pressure or temperature in the battery persistently increases, so that the battery reaction becomes uncontrollable while the battery packaging material is excessively expanded, the battery may be exploded.

As a battery packaging material capable of suppressing cleavage at a heat-sealed part, and occurrence of breakage immediately before the heat-sealed part even when the pressure in a battery persistently increases, one including, on a sealant layer or an adhesive resin layer adjacent thereto, a cleavage induction portion at which stress during cleavage is smaller than stress during cleavage of the sealed surfaces of sealant layers has been presented (see Patent Document 2). In Patent Document 2, however, merely progress of cleavage with low stress at the interface between the adhesive resin layer and a corrosion inhibition treatment layer on a metal layer is suppressed by inducing cleavage to the cleavage induction portion, but the battery packaging material is not designed so that the battery can be gently unsealed at the time when the battery turns into a state in which the pressure or temperature in the battery persistently increases. Actually, in Patent Document 2, the battery packaging material is designed so that when strong stress is applied, interlayer delamination in which cleavage progresses between adhesive layers, or cohesive fracture in which cracking progresses in an adhesive layer occurs. The risk of firing, explosion or the like due to rapid eruption of a combustible gas may be increased if the battery is unsealed due to interlayer delamination or cohesive fracture at the time when the pressure or temperature in the battery increases.

Thus, for ensuring safety when the pressure or temperature in the battery persistently increases, the battery packaging material is required to be designed so that until the ambient temperature reaches a certain temperature, the battery packaging material is not cleaved, and a battery element is kept hermetically sealed to suppress firing etc. resulting from rapid eruption of a combustible gas, and thereafter the battery is gently unsealed to slowly release a gas in the battery packaging material.

PRIOR ART DOCUMENTS

Patent Documents

Patent Document 1: Japanese Patent Laid-open Publication No. 2001-202927
Patent Document 2: Japanese Patent Laid-open Publication No. 2012-203982

SUMMARY OF THE INVENTION

Problems to be Solved by the Invention

An object of the present invention is to provide a battery packaging material capable of ensuring safety even when the pressure or temperature in a battery persistently increases. More specifically, an object of the present invention is to provide a battery packaging material which ensures that a battery element can be kept hermetically sealed until the pressure or temperature in a battery increases to a certain level, and at the time when the battery turns into a state in which the pressure or temperature in the battery persistently increases, the battery packaging material can be quickly and gently unsealed to suppress excessive expansion of the battery packaging material, uncontrollable battery reaction, firing and the like.

Means for Solving the Problem

The present inventors have extensively conducted studies for solving the above-mentioned problems, and resultantly devised a battery packaging material which includes a laminate including at least a base material layer, a metal layer and a sealant layer in this order, wherein when heating is performed with a battery element hermetically sealed by heat-sealing the battery packaging material, the battery packaging material delaminates at least at a part of the interface between the metal layer and the outside surface of the sealant layer (innermost layer side surface) while maintaining a hermetically sealed state, and then works so as to turn into an unsealed state. According to this battery packaging material, the battery element can be kept hermetically sealed until the pressure or temperature in the battery increases to a certain level, and at the time when the battery turns into a state in which the pressure or temperature in the battery persistently increases, fine cleavages such as pinholes can be quickly generated in the sealant layer at the delaminated part to gently unseal the battery packaging material. The present invention has been completed by further conducting studies based on the above-mentioned findings.

That is, the present invention provides inventions of the following aspects.

Item 1. A battery packaging material which includes a laminate including at least a base material layer, a metal layer and a sealant layer in this order, wherein when heating is performed with a battery element hermetically sealed by heat-sealing the battery packaging material, the battery packaging material delaminates at least at a part of the interface between the metal layer and the outside surface of the sealant layer while maintaining a hermetically sealed state, and then works so as to turn into an unsealed state.

Item 2. The battery packaging material according to item 1, wherein an inner bag is formed at the delaminated part, the inner bag is then cleaved, and the battery packaging material works so as to turn into the unsealed state.

Item 3. The battery packaging material according to item 1 or 2, further including an adhesive layer between the base material layer and the metal layer.

Item 4. The battery packaging material according to any one of items 1 to 3, further including an adhesive layer between the metal layer and the sealant layer.

Item 5. The battery packaging material according to any one of items 1 to 4, wherein the battery packaging material delaminates at least at one of the interface between the metal layer and the sealant layer, the interface between the metal layer and the adhesive layer, the interface between the adhesive layer and the sealant layer, the inside of the adhesive layer and the inside of the sealant layer.

Item 6. The battery packaging material according to any one of items 1 to 5, wherein a lamination strength between the metal layer and the sealant layer at 25° C. is 3 (N/15 mm) or more.

Item 7. The battery packaging material according to any one of items 1 to 6, wherein a lamination strength between the metal layer and the sealant layer at 80° C. is 2.5 (N/15 mm) or more, and a lamination strength between the metal layer and the sealant layer at 125° C. is 2.5 (N/1.5 mm) or less.

Item 8. The battery packaging material according to any one of items 1 to 7, wherein a sealing strength at a part that is heat-sealed with the sealant layers facing each other at 25° C. is 30 (N/15 mm) or more.

Item 9. The battery packaging material according to any one of items 1 to 8, wherein a sealing strength at a part that is heat-sealed with the sealant layers facing each other at 125° C. is 20 (N/15 mm) or less.

Item 10. The battery packaging material according to any one of items 1 to 9, wherein in a bag-shaped packaging material obtained by performing heat-sealing with the sealant layers facing each other, a sealing strength of the heat-sealed part is 0.2 (N/15 mm) or more after the packaging material is left standing at 85° C. for 24 hours with an electrolytic solution contained in the internal space of the bag-shaped packaging material.

Item 11. A battery packaging material which is used in a battery configured to ensure that when the battery is heated to a set temperature T° C. fixed between 100° C. and 160° C., the packaging material is not unsealed until the ambient temperature reaches T° C., and the packaging material is quickly unsealed after the ambient temperature reaches T° C., wherein the battery packaging material includes a laminate including at least a base material layer, a metal layer and a sealant layer in this order, the sealant layer includes a first sealant layer which is situated on the metal layer side and which contains an acid-modified polyolefin, and a second sealant layer which is laminated on the first sealant layer and situated at the innermost layer and which contains a polyolefin, and the first sealant layer and the second sealant layer satisfy the following formulae (1) and (2):

$$-10 \leq T_{m1} - T \leq -5 \quad (1)$$

$$-5 \leq T_{m2} - T \leq 5 \quad (2)$$

wherein $T_{m1}$ is a melting point (° C.) of the first sealant layer; and
$T_{m2}$ is a melting point (° C.) of the second sealant layer.

Item 12. The battery packaging material according to item 11, wherein the acidic polyolefin contained in the first sealant layer includes at least propylene as a constituent monomer.

Item 13. The battery packaging material according to item 11 or 12, wherein the polyolefin contained in the second sealant layer includes at least propylene as a constituent monomer.

Item 14. The battery packaging material according to any one of items 11 to 13, wherein the first sealant layer has a thickness of 5 to 40 μm, and the second sealant layer has a thickness of 5 to 40 μm.

Item 15. The battery packaging material according to any one of items 11 to 14, wherein the metal layer is an aluminum foil.

Item 16. The battery packaging material according to any one of items 11 to 15, wherein at least one of the first sealant layer and the second sealant layer contains a slipping agent.

Item 17. A battery, wherein a battery element including at least a positive electrode, a negative electrode and an electrolyte is stored in the battery packaging material according to any one of items 11 to 16.

Item 18. A method for screening a resin component that is used in a sealant layer formed in a battery packaging material, wherein the battery packaging material is used in a battery configured to ensure that when the battery is heated to a set temperature T° C. fixed between 100° C. and 160° C., the packaging material is not unsealed until the ambient temperature reaches T° C., and the packaging material is quickly unsealed after the ambient temperature reaches T° C., the battery packaging material includes a laminate including a base material layer, a metal layer and a sealant layer in this order, the sealant layer includes a first sealant layer situated on the metal layer side and a second sealant layer laminated on the first sealant layer and situated at the innermost layer, at least an acid-modified polyolefin is selected as a resin component that forms the first sealant layer, at least a polyolefin is selected as a resin component that forms the second sealant layer, and the resin components that form the first sealant layer and the second sealant layer are selected so as to ensure that the first sealant layer and the second sealant layer satisfy the following formulae (1) and (2):

$$-10 \leq T_{m1}-T \leq -5 \quad (1)$$

$$-5 \leq T_{m2}-T \leq 5 \quad (2)$$

wherein $T_{m1}$ is a melting point (° C.) of the first sealant layer; and $T_{m2}$ is a melting point (° C.) of the second sealant layer.

Item 19. A battery packaging material which is used in a battery configured to ensure that when the battery is heated to a set temperature T° C. fixed between 100° C. and 160° C., the packaging material is not unsealed until the ambient temperature reaches T° C., and the packaging material is quickly unsealed after the ambient temperature reaches T° C., wherein the battery packaging material includes a laminate including at least a base material layer, a metal layer and a sealant layer in this order, the sealant layer includes in order a first sealant layer containing an acid-modified polyolefin, a second sealant layer containing at least one of a polyolefin and an acid-modified polyolefin, and a third sealant layer containing a polyolefin, the first sealant layer being situated on the metal layer side, the third sealant layer being situated at the innermost layer, and the first sealant layer, the second sealant layer and the third sealant layer satisfy the following formulae (1) to (3):

$$-10 \leq T_{m1}-T \leq -5 \quad (1)$$

$$5 \leq T_{m2}-T \leq 10 \quad (2)$$

$$-5 \leq T_{m3}-T \leq 5 \quad (3)$$

wherein $T_{m1}$ is a melting point (° C.) of the first sealant layer;

$T_{m2}$ is a melting point (° C.) of the second sealant layer; and $T_{m3}$ is a melting point (° C.) of the third sealant layer.

Item 20. The battery packaging material according to item 19, wherein the acidic polyolefin contained in the first sealant layer includes at least propylene as a constituent monomer.

Item 21. The battery packaging material according to item 19 or 20, wherein the polyolefin contained in the second sealant layer includes at least propylene as a constituent monomer.

Item 22. The battery packaging material according to any one of items 19 to 21, wherein the polyolefin contained in the third sealant layer includes at least propylene as a constituent monomer.

Item 23. The battery packaging material according to any one of items 19 to 22, wherein the first sealant layer has a thickness of 5 to 40 µm, the second sealant layer has a thickness of 5 to 40 µm, and the second sealant layer has a thickness of 5 to 40 µm.

Item 24. The battery packaging material according to any one of items 19 to 23, wherein the metal layer is an aluminum foil.

Item 25. The battery packaging material according to any one of items 19 to 24, wherein at least one of the first sealant layer, the second sealant layer and the third sealant layer contains a slipping agent.

Item 26. A battery, wherein a battery element including at least a positive electrode, a negative electrode and an electrolyte is stored in the battery packaging material according to any one of items 19 to 25.

Item 27. A method for screening a resin component that is used in a sealant layer formed in a battery packaging material, wherein the battery packaging material is used in a battery configured to ensure that when the battery is heated to a set temperature T° C. fixed between 100° C. and 160° C., the packaging material is not unsealed until the ambient temperature reaches T° C., and the packaging material is quickly unsealed after the ambient temperature reaches T° C., the battery packaging material includes a laminate including a base material layer, a metal layer and a sealant layer in this order, and the sealant layer includes a first sealant layer, a second sealant layer and a sealant layer in order, the first sealant layer being situated on the metal layer side, the third sealant layer being situated at the innermost layer, and at least an acid-modified polyolefin is selected as a resin component that forms the first sealant layer, at least one of a polyolefin and an acid-modified polyolefin is selected as a resin component that forms the second sealant layer, at least a polyolefin is selected as a resin component that forms the third sealant layer, and the resin components that form the first sealant layer, the second sealant layer and the third sealant layer are selected so as to ensure that the first sealant layer, the second sealant layer and the third sealant layer satisfy the following formulae (1) to (3):

$$-10 \leq T_{m1}-T \leq -5 \quad (1)$$

$$5 \leq T_{m2}-T \leq 10 \quad (2)$$

$$-5 \leq T_{m3}-T \leq 5 \quad (3)$$

wherein $T_{m1}$ is a melting point (° C.) of the first sealant layer;

$T_{m2}$ is melting point (° C.) of the second sealant layer; and $T_{m3}$ is a melting point (° C.) of the third sealant layer.

Item 28. A battery packaging material which includes a laminate including at least a base material layer, a metal layer and a sealant layer in this order, wherein the sealant layer includes in order a first sealant layer containing an acid-modified polyolefin, and a second sealant layer, the first sealant layer is situated on the metal layer side and the second sealant layer is situated at the innermost layer in the sealant layer, and the first sealant layer has a melting point $T_{m1}$ of 100 to 160° C., and the first sealant layer has a softening point $T_{s1}$ of 60 to 150° C.

Item 29. The battery packaging material according to item 28, wherein the melting point $T_{m2}$ of the second sealant layer and the melting point $T_{m1}$ of the first sealant layer satisfy the following relationship:

$$T_{m2} \geq T_{m1}.$$

Item 30. The battery packaging material according to item 28 or 29, wherein the first sealant layer further contains at least one of a noncrystalline polyolefin and a thermoplastic elastomer.

Item 31. The battery packaging material according to any one of items 28 to 30, wherein the second sealant layer has a melting point $T_{m2}$ of 100 to 160° C., and the second sealant layer has a softening point $T_{s2}$ of 60 to 150° C.

Item 32. The battery packaging material according to any one of items 28 to 31, wherein the battery packaging material is used in a battery configured to ensure that when the battery is heated, the battery packaging material delaminates at least at a part of the interface between the metal layer and the outside surface of the sealant layer, but the packaging material is not unsealed until the ambient temperature reaches a set temperature, and after the ambient temperature reaches the set temperature, the packaging material is quickly unsealed to prevent firing and uncontrollable reaction in the battery.

Item 33. The battery packaging material according to any one of items 28 to 32, wherein the acidic polyolefin contained in the first sealant layer includes at least propylene as a constituent monomer.

Item 34. The battery packaging material according to any one of items 28 to 33, wherein the second sealant layer contains a polyolefin.

Item 35. The battery packaging material according to item 34, wherein the polyolefin contained in the second sealant layer includes at least propylene as a constituent monomer.

Item 36. The battery packaging material according to any one of items 28 to 35, wherein the first sealant layer has a thickness of 0.1 to 40 µm, and the second sealant layer has a thickness of 5 to 40 µm.

Item 37. The battery packaging material according to any one of items 28 to 36, wherein the metal layer is an aluminum foil.

Item 38. The battery packaging material according to any one of items 28 to 37, further including an adhesive layer between the base material layer and the metal layer.

Item 39. A battery packaging material which includes a laminate including at least a base material layer, a metal layer and a sealant layer in this order, wherein the sealant layer includes in order a first sealant layer containing an acid-modified polyolefin, and a second sealant layer, the first sealant layer is situated on the metal layer side and the second sealant layer is situated at the innermost layer in the sealant layer, and the first sealant layer contains at least one of polyethylene and acid-modified polyethylene.

Item 40. The battery packaging material according to item 39, wherein the total content of at least one of the polyethylene and the acid-modified polyethylene in the sealant layer is 5% by mass or more.

Item 41. The battery packaging material according to item 39 or 40, wherein the melting point $T_{m2}$ of the second sealant layer and the melting point $T_{m1}$ of the first sealant layer satisfy the following relationship:

$$T_{m2} \geq T_{m1}.$$

Item 42. The battery packaging material according to any one of items 39 to 41, wherein the first sealant layer has a melting point $T_{m1}$ of 100 to 160° C., and the first sealant layer has a softening point $T_{s1}$ of 60 to 150° C.

Item 43. The battery packaging material according to any one of items 39 to 42, wherein the second sealant layer has a melting point $T_{m2}$ of 100 to 160° C., and the second sealant layer has a softening point $T_{s2}$ of 60 to 150° C.

Item 44. The battery packaging material according to any one of items 39 to 43, wherein the battery packaging material is used in a battery configured to ensure that when the battery is heated, the battery packaging material delaminates at least at a part of the interface between the metal layer and the outside surface of the sealant layer, but the packaging material is not unsealed until the ambient temperature reaches a set temperature, and after the ambient temperature reaches the set temperature, the packaging material is quickly unsealed to prevent firing and uncontrollable reaction in the battery.

Item 45. The battery packaging material according to any one of items 39 to 44, wherein the acidic polyolefin contained in the first sealant layer includes at least propylene as a constituent monomer.

Item 46. The battery packaging material according to any one of items 39 to 45, wherein the second sealant layer contains a polyolefin.

Item 47. The battery packaging material according to item 46, wherein the polyolefin contained in the second sealant layer includes at least propylene as a constituent monomer.

Item 48. The battery packaging material according to any one of items 39 to 47, wherein the first sealant layer has a thickness of 5 to 40 µm, and the second sealant layer has a thickness of 5 to 40 µm.

Item 49. The battery packaging material according to any one of items 39 to 48, wherein the metal layer is an aluminum foil.

Item 50. The battery packaging material according to any one of items 39 to 49, further including an adhesive layer between the base material layer and the metal layer.

Item 51. A battery packaging material which includes a laminate including at least a base material layer, a metal layer and a sealant layer in this order, wherein the sealant layer includes in order a first sealant layer containing an acid-modified polyolefin, and a second sealant layer, the first sealant layer is situated on the metal layer side and the second sealant layer is situated at the innermost layer in the sealant layer, and the first sealant layer contains at least one selected from the group consisting of an ethylene-vinyl acetate copolymer, an acrylic resin, a styrene polymer and a terpene phenol resin.

Item 52. The battery packaging material according to item 51, wherein the total content of at least one selected from the group consisting of an ethylene-vinyl acetate copolymer, an acrylic resin, a styrene polymer and a terpene phenol resin in the sealant layer is 5% by mass or more.

Item 53. The battery packaging material according to item 51 or 52, wherein the melting point $T_{m2}$ of the second sealant layer and the melting point $T_{m1}$ of the first sealant layer satisfy the following relationship:

$$T_{m2} \geq T_{m1}.$$

Item 54. The battery packaging material according to any one of items 51 to 53, wherein the first sealant layer has a melting point $T_{m1}$ of 100 to 160° C., and the first sealant layer has a softening point $T_{s1}$ of 60 to 150° C.

Item 55. The battery packaging material according to any one of items 51 to 54, wherein the second sealant layer has a melting point $T_{m2}$ of 100 to 160° C., and the second sealant layer has a softening point $T_{s2}$ of 60 to 150° C.

Item 56. The battery packaging material according to any one of items 51 to 55, wherein the battery packaging material is used in a battery configured to ensure that when the battery is heated, the battery packaging material delaminates at least at a part of the interface between the metal layer and the outside surface of the sealant layer, but the packaging material is not unsealed until the ambient temperature reaches a set temperature, and after the ambient temperature reaches the set temperature, the packaging material is quickly unsealed to prevent firing and uncontrollable reaction in the battery.

Item 57. The battery packaging material according to any one of items 51 to 56, wherein the acidic polyolefin contained in the first sealant layer includes at least propylene as a constituent monomer.

Item 58. The battery packaging material according to any one of items 51 to 57, wherein the second sealant layer contains a polyolefin.

Item 59. The battery packaging material according to item 58, wherein the polyolefin contained in the second sealant layer includes at least propylene as a constituent monomer.

Item 60. The battery packaging material according to any one of items 51 to 59, wherein the first sealant layer has a thickness of 5 to 40 μm, and the second sealant layer has a thickness of 5 to 40 μm.

Item 61. The battery packaging material according to any one of items 51 to 60, wherein the metal layer is an aluminum foil.

Item 62. The battery packaging material according to any one of items 51 to 61, further including an adhesive layer between the base material layer and the metal layer.

Item 63. A battery packaging material which is used in a battery configured to ensure that when the battery is heated to a set temperature T° C. fixed between 100° C. and 160° C., the packaging material is not unsealed until the ambient temperature reaches T° C., and the packaging material is quickly unsealed after the ambient temperature reaches T° C., wherein the battery packaging material includes a laminate including at least a base material layer, a metal layer, an insulating layer and a sealant layer in this order, the insulating layer, is formed of a resin composition containing an acid-modified polyolefin resin and a curing agent, the sealant layer includes a first sealant layer containing a polyolefin resin, and the insulating layer and the first sealant layer satisfy the following formulae (1) and (2):

$$-10 \le T_{m1} - T \le -5 \quad (1)$$

$$5 \le T_{m1} - T \le 5 \quad (2)$$

wherein $T_A$ is a melting point (° C.) of the insulating layer; and $T_{m1}$ is a melting point (° C.) of the first sealant layer.

Item 64. The battery packaging material according to item 63, wherein the acid-modified polyolefin resin in the insulating layer is at least one of an acid-modified polyolefin resin modified with an unsaturated carboxylic acid or an acid anhydride thereof, and an acid-modified polyolefin resin modified with an unsaturated carboxylic acid or an acid anhydride thereof and a (meth)acrylic acid ester.

Item 65. The battery packaging material according to item 64, wherein the acid-modified polyolefin resin modified with an unsaturated carboxylic acid or an acid anhydride thereof is formed by modifying at least one of a polyethylene-based resin and a polypropylene-based resin with the unsaturated carboxylic acid or acid anhydride thereof.

Item 66. The battery packaging material according to item 64, wherein the acid-modified polyolefin resin modified with an unsaturated carboxylic acid or an acid anhydride thereof and a (meth)acrylic acid ester is formed by modifying at least one of a polyethylene-based resin and a polypropylene-based resin with the unsaturated carboxylic acid or acid anhydride thereof and (meth)acrylic acid ester.

Item 67. The battery packaging material according to any one of items 63 to 66, wherein the polyolefin resin contained in the first sealant layer includes at least propylene as a constituent monomer.

Item 68. The battery packaging material according to any one of items 63 to 67, wherein the insulating layer has a thickness of 0.1 to 20 μm, and the first sealant layer has a thickness of 1 to 40 μm.

Item 69. The battery packaging material according to any one of items 63 to 68, wherein the metal layer is an aluminum foil.

Item 70. The battery packaging material according to any one of items 63 to 69, wherein the curing agent contains at least one selected from the group consisting of a polyfunctional isocyanate compound, a carbodiimide compound, an epoxy compound and an oxazoline compound.

Item 71. The battery packaging material according to any one of items 63 to 70, wherein in the resin composition, the content of the curing agent is in a range of 0.1 part by mass to 50 parts by mass based on 100 parts by mass of the acid-modified polyolefin resin.

Item 72. The battery packaging material according to any one of items 63 to 71, wherein the sealant layer further includes a second sealant layer, which contains at least one of an acid-modified polyolefin resin and a polyolefin resin, between the insulating layer and the first sealant layer, and the second sealant layer satisfies the following formula (3):

$$5 \le T_{m2} - T \le 10 \quad (3)$$

wherein $T_{m2}$ is a melting point (° C.) of the second sealant layer.

Item 73. The battery packaging material according to item 72, wherein the acid-modified polyolefin resin and the polyolefin resin in the second sealant layer include at least propylene as a constituent monomer.

Item 74. A battery, wherein a battery element including at least a positive electrode, a negative electrode and an electrolyte is stored in the battery packaging material according to any one of items 63 to 73.

Advantages of the Invention

The battery packaging material according to the present invention is a battery packaging material which includes a laminate including at least a base material layer, a metal layer and a sealant layer in this order, wherein when heating is performed with a battery element hermetically sealed by heat-sealing the battery packaging material, the battery packaging material delaminates at least at a part of the interface between the metal layer and the outside surface of the sealant layer while maintaining a hermetically sealed state, and then works so as to turn into an unsealed state. By employing such a specific configuration, the battery packaging material according to the present invention ensures that a battery element can be kept hermetically sealed until pressure or temperature in a battery increases to a certain level, and at the time when the battery turns into a state in which the pressure or temperature in the battery persistently increases, fine cleavages such as pinholes can be quickly generated in the sealant layer at the delaminated part to gently unseal the battery packaging material. More specifically, after the pressure or temperature in the battery increases to a certain level, the internal pressure can be gently reduced by releasing to outside a combustible gas generated in the battery. By reducing the internal pressure in the battery, releasing of an electrolytic solution and a battery cell to outside can be suppressed. Further, since air flows into the battery as the gas is released, the concentration of the combustible gas generated in the battery decreases, so that firing of the battery can be suppressed. Also, the electrolytic solution in the battery is easily dried due to inflow of air, and thus firing of the battery can be suppressed. Particularly, when the temperature of the battery increases, a separator in the battery is easily shrunk, and therefore the battery is deformed as the internal pressure increases, so that the possibility becomes higher that firing occurs due to a short-circuit. However, when the battery packaging material according to the present invention is used, the concentration of a combustible gas that may cause ignition can be reduced owing to releasing of the combustible gas generated in the battery and inflow of air from outside, so that firing due to a short-circuit can be effectively suppressed. Thus, according to the battery packaging material of the present invention, even when the pressure or temperature in the battery persistently increases, the battery packaging material can be gently unsealed, so that excessive expansion of the battery packaging material, and firing can be suppressed to secure safety.

BRIEF DESCRIPTION OF THE DRAWINGS

FIG. 1 is a schematic sectional view of a battery packaging material according to the present invention.

FIG. 2 is a schematic sectional view of a battery packaging material according to the present invention.

FIG. 3 is a schematic sectional view of one side surface (the left end is heat-sealed and the right side part is not illustrated) for a state (A) in which two battery packaging materials according to the present invention are heat-sealed to form a hermetically sealed space, a state (B) in which delamination occurs after the battery packaging material is heated, and (C) a state in which the battery packaging material is unsealed.

FIG. 4 is a schematic sectional view of one side surface (the left end is heat-sealed and the right side part is not illustrated) for a state (A) in which two battery packaging materials according to the present invention are heat-sealed to form a hermetically sealed space, a state (B) in which delamination occurs after the battery packaging material is heated, and (C) a state in which the battery packaging material is unsealed.

FIG. 5 is a schematic sectional view of one side surface (the left end is heat-sealed and the right side part is not illustrated) for a state (A) in which two battery packaging materials according to the present invention are heat-sealed to form a hermetically sealed space, a state (B) in which delamination occurs after the battery packaging material is heated, and (C) a state in which the battery packaging material is unsealed.

FIG. 6 is a schematic sectional view of one side surface (the left end is heat-sealed and the right side part is not illustrated) for a state (A) in which two battery packaging materials according to the present invention are heat-sealed to form a hermetically sealed space, a state (B) in which delamination occurs after the battery packaging material is heated, and (C) a state in which the battery packaging material is unsealed.

FIG. 7 is a schematic sectional view of one side surface (the left end is heat-sealed and the right side part is not illustrated) for a state (A) in which two battery packaging materials according to the present invention are heat-sealed to form a hermetically sealed space, a state (B) in which delamination occurs after the battery packaging material is heated, and (C) a state in which the battery packaging material is unsealed.

FIG. 8 is a schematic sectional view of one side surface (the left end is heat-sealed and the right side part is not illustrated) for a state (A) in which two battery packaging materials according to the present invention are heat-sealed to form a hermetically sealed space, a state (B) in which delamination occurs after the battery packaging material is heated, and (C) a state in which the battery packaging material is unsealed.

FIG. 9 is a sectional view of one side surface (the left end is heat-sealed and the right side part is not illustrated) for a state (A) in which two battery packaging materials are heat-sealed to form a hermetically sealed space, a state (B) before the ambient temperature reaches a set temperature T° C. when the battery packaging is heated to the set temperature T° C. fixed between 100° C. and 160° C., and a state (C) after the ambient temperature reaches the set temperature T° C., when the battery packaging materials according to the present invention includes an insulating layer between the metal layer and the sealant layer.

FIG. 10 is a schematic sectional view of one side surface (the left end is heat-sealed and the right side part is not illustrated), which shows a state of cleavage occurring when two conventional battery packaging materials are heat-sealed to form a hermetically sealed space, and heated.

EMBODIMENTS OF THE INVENTION

The battery packaging material according to the present invention is a battery packaging material which includes a laminate including at least a base material layer, a metal layer and a sealant layer in this order, wherein when heating is performed with a battery element hermetically sealed by heat-sealing the battery packaging material, the battery packaging material delaminates at least at a part of the interface between the metal layer and the outside surface of the sealant layer while maintaining a hermetically sealed state, and then works so as to turn into an unsealed state. Hereinafter, the battery packaging material according to the present invention will be described in detail.

1. Laminated Structure of Battery Packaging Material

The battery packaging material according to the present invention includes a laminate including at least a base material layer 1, a metal layer 3 and a sealant layer 4 in this order. When the battery packaging material is used in a battery, the base material layer 1 is an outermost layer, and the sealant layer 4 is an innermost layer (battery element side). At the time of assembling a battery, sealant layers 4 situated on the periphery of a battery element are brought into contact with each other and heat-sealed to hermetically seal the battery element, so that the battery element is encapsulated. As shown in FIG. 1, the battery packaging material according to the present invention may include an adhesive layer 2 between the base material layer 1 and the metal layer 3. As shown in FIG. 2, the battery packaging material according to the present invention may include an adhesive layer 5 or an insulating layer 6 between the metal layer 3 and the sealant layer 4.

2. Unsealing Mechanism of Battery Packaging Material

The battery packaging material according to the present invention has such a sealing property that a battery element can be kept hermetically sealed until the pressure or temperature in a battery increases to a certain level (e.g. the temperature in the battery reaches about 100 to 160° C.), and such a gentle unsealing property that at the time when the battery turns into a state in which the pressure or temperature in the battery persistently increases, fine cleavages such as pinholes are quickly generated in the sealant layer 4 at the delaminated part between the metal layer 3 and the outside surface of the sealant layer 4 (surface on the innermost layer side). An example of the unsealing mechanism of the battery packaging material according to the present invention will be described with reference to FIGS. 3 to 9. FIGS. 3 and 4 correspond to a case where the battery packaging material according to the present invention includes the adhesive layer 2, and FIGS. 5 to 9 correspond to a case where the battery packaging material further includes the adhesive layer 5 or the insulating layer 6. FIGS. 3 to 9 each show in the part A a schematic sectional view of one side surface when a battery element is enclosed between two battery packaging materials according to the present invention. In the part A of each of FIGS. 3 to 9, the edge portions of the sealant layers 4 of two battery packaging materials are heat-sealed with each other to form a hermetically sealed space. The battery element is stored in the hermetically sealed space, but the battery element is not illustrated in FIGS. 3 to 9. In the part A of FIG. 3, the part (A-1) shows a sectional view where both two battery packaging materials are molded, and the part (A-2) shows a sectional view where only one battery packaging material is molded. In the present invention, both two battery packaging materials are not required to be molded although this case is not illustrated. In the present invention, two battery packaging materials may have mutually different laminated structures, e.g. one battery packaging material does not have the adhesive layer 2 shown in FIGS. 3 and 4, and the other battery packaging material has the adhesive layer 2 and the adhesive layer 5 shown in FIGS. 5 to 8. Further, in the present invention, the sealant layers 4 of one battery packaging material may be heat-sealed with each other to form a hermetically sealed space, or the sealant layers 4 of a plurality of battery packaging materials may be heat-sealed with one another to form a hermetically sealed space. The battery packaging material according to the present invention has at least any one of the sealing mechanisms shown in FIGS. 3 to 9, so that sealing is performed until the temperature reaches a certain level (e.g. the temperature in the battery reaches about 100 to 160° C.), and subsequently unsealing is performed quickly and gently. While the unsealing mechanisms of the battery packaging material according to the present invention will be described below with reference to sectional views where two battery packaging materials are molded in FIGS. 3 to 9, unsealing is performed with a similar mechanism when either only one battery packaging material is molded or none of the two battery packaging materials is molded.

First, in the unsealing mechanism shown in FIG. 3, the battery packaging material delaminates at least at a part of the interface between the metal layer 3 and the sealant layer 4 (interfacial delamination) as shown in the part B of FIG. 3 when the battery packaging material is heated to a certain temperature from the state in the part A of FIG. 3. Here, preferably, the delaminated part of the sealant layer 4 is formed into a bag shape (inner bag), so that the battery element is kept hermetically sealed. Subsequently, the battery packaging material quickly turns into the state shown in the part C of FIG. 3, and fine cleavages such as pinholes (shown by symbol 10 in FIG. 3) are generated in a region (preferably an inner bag) of the sealant layer 4 which is delaminated from the metal layer 3, so that the battery packaging material turns into an unsealed state under gentle condition.

In the unsealing mechanism shown in FIG. 4, cohesive delamination occurs in the sealant layer 4 as shown in the part B of FIG. 4 when the battery packaging material is heated to a certain temperature from the state in the part A of FIG. 4. Here, preferably, the cohesive-delaminated part of the sealant layer 4 is formed into a bag shape (inner bag), so that the battery element is kept hermetically sealed. Subsequently, the battery packaging material quickly turns into the state shown in the part C of FIG. 4, and fine cleavages such as pinholes (shown by symbol 10 in FIG. 4) are generated in a cohesive-delaminated region (preferably an inner bag) of the sealant layer 4, so that the battery packaging material turns into an unsealed state under gentle conditions.

In the unsealing mechanism shown in FIG. 5 or FIG. 9, the battery packaging material delaminates at least at a part of the interface between the metal layer 3 and the adhesive layer 5 or the insulating layer 6 (interfacial delamination) as shown in the part B of FIG. 5 or FIG. 9 when the battery packaging material is heated to a certain temperature from the state in the part A of FIG. 5 or FIG. 9. Here, preferably, the adhesive layer 5 and the sealant layer 4 are formed into a bag shape (inner bag), or the insulating layer 6 and the sealant layer 4 are formed into a bag shape (inner bag), so that the battery element is kept hermetically sealed. Subsequently, the battery packaging material quickly turns into the state shown in the part C of FIG. 5 or FIG. 9, and fine cleavages such as pinholes (shown by symbol 10 in FIG. 5 or FIG. 9) are generated in a region (preferably an inner bag) of the adhesive layer 5 and the sealant layer 4 or a region (preferably an inner bag) of the insulating layer 6 and the sealant layer 4, which is delaminated from the metal layer 3, so that the battery packaging material turns into an unsealed state under gentle conditions.

In the unsealing mechanism shown in FIG. 6, cohesive delamination occurs in the adhesive layer 5 as shown in the part B of FIG. 6 when the battery packaging material is heated to a certain temperature from the state in the part A of FIG. 6. Here, preferably, the cohesive-delaminated part of the adhesive layer 5 and the sealant layer 4 adjacent thereto are formed into a bag shape (inner bag), so that the battery element is kept hermetically sealed. Subsequently, the battery packaging material quickly turns into the state shown in the part C of FIG. 6, and fine cleavages such as pinholes (shown by symbol 10 in FIG. 6) are generated in a cohesive-delaminated region of the adhesive layer 5 and the sealant layer 4 adjacent thereto (preferably an inner bag), so that the battery packaging material turns into an unsealed state under gentle condition.

In the unsealing mechanism shown in FIG. 7, the battery packaging material delaminates at least at a part of the interface between the adhesive layer 5 and the sealant layer 4 (interfacial delamination) as shown in the part B of FIG. 7 when the battery packaging material is heated to a certain temperature from the state in the part A of FIG. 7. Here, preferably, the sealant layer 4 is formed into a bag shape (inner bag), so that the battery element is kept hermetically sealed. Subsequently, the battery packaging material quickly turns into the state shown in the part C of FIG. 7, and fine cleavages such as pinholes (shown by symbol 10 in FIG. 7) are generated in a region (preferably an inner bag) of the sealant layer 4 which is delaminated from the adhesive layer 5, so that the battery packaging material turns into an unsealed state under gentle condition.

In the unsealing mechanism shown in FIG. 8, cohesive delamination occurs in the sealant layer 4 as shown in the part B of FIG. 8 when the battery packaging material is heated to a certain temperature from the state in the part A of FIG. 8. Here, preferably, the cohesive-delaminated region of the sealant layer 4 is formed into a bag shape (inner bag), so that the battery element is kept hermetically sealed. Subsequently, the battery packaging material quickly turns into the state shown in the part C of FIG. 8, and fine cleavages such as pinholes (shown by symbol 10 in FIG. 8)

are generated in a cohesive-delaminated region (preferably an inner bag) of the sealant layer 4, so that the battery packaging material turns into an unsealed state under gentle condition.

In the case where the battery packaging material delaminates at the inside of the adhesive layer 5 or the sealant layer 4 when the adhesive layer 5 or the sealant layer 4 is formed of a plurality of layers as described later although this case is not illustrated, the battery packaging material delaminates at least at a part of interfaces of a plurality of layers, and fine cleavages such as pinholes are generated in the delaminated regions, so that the battery packaging material may turns into an unsealed state under gentle condition.

Thus, in the battery packaging material according to the present invention, when the battery packaging material is heated to a certain temperature (e.g. a temperature in a range of 100 to 160° C.), the battery packaging material delaminates at least at a part of the interface between the metal layer and the outside surface of the sealant layer (surface on the innermost layer side) (at least at a part of the interface between the layers or at least at a part of the inside of the each layer), but the battery element can be kept hermetically sealed by the sealant layer, and subsequently fine cleavages such as pinholes can be quickly generated in the sealant layer at the delaminated part to gently unseal the battery packaging material. The state of unsealing may be a combination of two or more of the states in FIGS. 3 to 9.

On the other hand, in conventional battery packaging materials, firing or explosion may occur because the battery packaging material is not quickly unsealed, or when the ambient temperature reaches a certain temperature, the battery packaging material may rapidly turn into an unsealed state from a hermetically sealed state, leading to rapid eruption of a combustible gas or an electrolytic solution. Here, FIG. 10 shows in the part A one example of a state of interfacial delamination in which cleavage rapidly progresses at a heat-sealed interface between sealant layers in a conventional battery packaging material. FIG. 10 shows in the part B one example of a state of cohesive delamination in which cleavage rapidly progresses in a sealant layer in the vicinity of a heat-sealed interface in a conventional battery packaging material. FIG. 10 shows in the part C one example of a state of interlayer delamination in which cleavage progresses between layers (between layers in a sealant layer) after the sealant layer is root-cut in a conventional battery packaging material. The term "root-cut" means that the sealant layer is ruptured at the inner edge of the heat-sealed part. The battery packaging material according to the present invention is excellent in safety when the pressure or temperature in the battery persistently increases as compared to conventional battery packaging materials because there is no possibility of rapidly turning into an unsealed state due to occurrence of interfacial delamination, cohesive delamination or interlayer delamination as found in conventional battery packaging materials.

3. Composition of Each Layer Forming Battery Packaging Material

[Base Material Layer 1]

In the battery packaging material according to the present invention, the base material layer 1 is a layer forming an outermost layer. The material that forms the base material layer 1 is not particularly limited as long as it has insulation quality. Examples of the material that forms the base material layer 1 include polyesters, polyamides, epoxy resins, acrylic resins, fluororesins, polyurethanes, silicon resins, phenols, polyether imides, and polyimides and mixtures, copolymers and the like thereof.

Specific examples of the polyester include polyethylene terephthalate, polybutylene terephthalate, polyethylene naphthalate, polybutylene naphthalate, polyethylene isophthalate, polycarbonate, copolymerization polyesters with ethylene terephthalate as a main repeating unit, and copolymerization polyesters with a butylene terephthalate as a main repeating unit. Specific examples of the copolymerization polyester with ethylene terephthalate as a main repeating unit include copolymer polyesters that are polymerized with ethylene isophthalate with ethylene terephthalate as a main repeating unit (hereinafter, abbreviated as follows after polyethylene(terephthalate/isophthalate)), polyethylene(terephthalate/isophthalate), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene(terephthalate/decane dicarboxylate). Specific examples of the copolymerization polyester with butylene terephthalate as a main repeating unit include copolymer polyesters that are polymerized with butylene isophthalate with butylene terephthalate as a main repeating unit (hereinafter, abbreviated as follows after polybutylene(terephthalate/isophthalate)), polybutylene(terephthalate/adipate), polybutylene(terephthalate/sebacate), polybutylene(terephthalate/decane dicarboxylate) and polybutylene naphthalate. These polyesters may be used alone, or may be used in combination of two or more thereof. A polyester has the advantage that it is excellent in electrolytic solution resistance, so that whitening etc. due to deposition of an electrolytic solution is hard to occur, and thus the polyester is suitably used as a material for formation of the base material layer 1.

Specific examples of the polyamide include aliphatic polyamides such as nylon 6, nylon 66, nylon 610, nylon 12, nylon 46, and copolymers of nylon 6 and nylon 6,6; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polymethaxylylene adipamide (MXD6); cycloaliphatic polyamides such as polyaminomethyl cyclohexyl adipamide (PACM 6); polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof. A stretched polyamide film is excellent in stretchability, can prevent occurrence of whitening due to resin breakage in the base material layer 1 during molding, and is thus suitably used as a material for formation of the base material layer 1.

The base material layer 1 may be formed of a uniaxially or biaxially stretched resin film, or may be formed of an unstretched resin film. Among them, a uniaxially or biaxially stretched resin film, particularly a biaxially stretched resin film has improved heat resistance through orientation and crystallization, and is therefore suitably used as the base material layer 1. The base material layer 1 may be formed by coating the top of the metal layer 3 with the above-mentioned material.

Among them, nylons and polyesters are preferred, and biaxially stretched nylons and biaxially stretched polyesters are further preferred, with biaxially stretched nylons being especially preferred, as resin films for formation of the base material layer 1.

The base material layer 1 can also be laminated with at least one of a resin film and a coating which is made of a different material for improving pinhole resistance, and insulation quality as a package of a battery. Specific examples include a multilayer structure in which a polyester film and a nylon film are laminated, and a multilayer structure in which a biaxially stretched polyester and a biaxially stretched nylon are laminated. When the base material layer 1 is made to have a multilayer structure, the resin films may be bonded with the use of an adhesive, or may be directly laminated without the use of an adhesive. Examples of the method for bonding the resin films without the use of an adhesive include methods in which the resin films are bonded in a heat-sealed state, such as a co-extrusion method, a sand lamination method and a thermal lamination method. When the resin films are bonded with the use of an adhesive, the adhesive to be used may be a two-liquid curable adhesive, or may be a one-liquid curable adhesive. Further, the adhesion mechanism of the adhesive is not particularly limited, and may be any one of a chemical reaction type, a solvent volatilization type, a heat melting type, a heat pressing type, an electron beam curing type such as that of UV or EB, and so on. Examples of the component of the adhesive include polyester-based resins, polyether-based resins, polyurethane-based resins, epoxy-based resins, phenol resin-based resins, polyamide-based resins, polyolefin-based resins, polyvinyl acetate-based resins, cellulose-based resins, (meth)acryl-based resins, polyimide-based resins, amino resins, rubbers and silicon-based resins.

The friction of the base material layer 1 may be reduced for improving moldability. When the friction of the base material layer 1 is reduced, the friction coefficient of the surface thereof is not particularly limited, and may be, for example, 1.0 or less. Examples of the method for reducing the friction of the base material layer 1 include matting treatment, formation of a thin film layer of a slipping agent, and a combination thereof.

Examples of method of matting treatment include a method in which a matting agent is added to the base material layer 1 beforehand to form irregularities on the surface, a transfer method by heating or pressurization with an embossing roll, and a method in which the surface is mechanically roughened using dry or wet blasting, or a file. Examples of the matting agent include fine particles having a particle size of about 0.5 nm to 5 µm. The material of the matting agent is not particularly limited, and examples thereof include metals, metal oxides, inorganic substances and organic substances. The shape of the matting agent is not particularly limited, and examples thereof include a spherical shape, a fibrous shape, a plate shape, an unstructured shape and a balloon shape. Specific examples of the matting agent include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acryl, crosslinked styrene, crosslinked polyethylene, benzoguanamine, gold, aluminum, copper and nickel. These matting agents may be used alone, or may be used in combination of two or more thereof. Among these matting agents, silica, barium sulfate and titanium oxide are preferred from the viewpoint of dispersion stability, costs and so on. The surface of the matting agent may be subjected to various kinds of surface treatments such as an insulation treatment and dispersibility enhancing treatment.

The thin film layer of a slipping agent can be formed by precipitating a slipping agent on the surface of the base material layer 1 by bleeding-out to form a thin layer, or depositing a slipping agent on the base material layer 1. The slipping agent is not particularly limited, and examples thereof include fatty acid amides such as erucic acid amide, stearic acid amide, behenic acid amide, ethylene bis-oleic acid amide and ethylene bis-stearic acid amide, metal soaps, hydrophilic silicone, acryl grafted with silicone, epoxy grafted with silicone, polyethers grafted with silicone, polyesters grafted with silicone, block silicone acryl copolymers, polyglycerol-modified silicone and paraffin. These slipping agents may be used alone, or may be used in combination of two or more thereof.

The thickness of the base material layer 1 is, for example, 7 to 75 µm, preferably 12 to 50 µm.

[Adhesive Layer 2]

In the battery packaging material according to the present invention, the adhesive layer 2 is a layer provided as necessary for the purpose of improving adhesion between the base material layer 1 and the metal layer 3. The base material layer 1 and the metal layer 3 may be directly laminated.

The adhesive layer 2 is formed from an adhesive resin capable of bonding the base material layer 1 and the metal layer 3. The adhesive resin used for forming the adhesive layer 2 may be a two-liquid curable adhesive resin, or may be a one-liquid curable adhesive resin. Further, the adhesion mechanism of the adhesive resin used for forming the adhesive layer 2 is not particularly limited, and may be any one of a chemical reaction type, a solvent volatilization type, a heat melting type, a heat pressing type and so on.

Specific examples of the resin component of the adhesive resin that can be used for forming the adhesive layer 2 include polyester-based resins such as polyethylene terephthalate, polybutylene terephthalate, polyethylene naphthalate, polybutylene naphthalate, polyethylene isophthalate, polycarbonate and copolymerized polyester; polyether-based adhesives; polyurethane-based adhesives; epoxy-based resins; phenol resin-based resins; polyamide-based resins such as nylon 6, nylon 66, nylon 12 and copolymerized polyamide; polyolefin-based resins such as polyolefins, acid-modified polyolefins and metal-modified polyolefins; polyvinyl acetate-based resins; cellulose-based adhesives; (meth)acryl-based resins; polyimide-based resins; amino resins such as urea resins and melamine resins; rubbers such as chloroprene rubber, nitrile rubber and styrene-butadiene rubber; silicone-based resins; and ethylene fluoride-propylene copolymers. These adhesive resin components may be used alone, or may be used in combination of two or more thereof. The combination form of two or more adhesive resin components is not particularly limited, and examples of the adhesive resin components include mixed resins of polyamides and acid-modified polyolefins, mixed resins of polyamides and metal-modified polyolefins, mixed resins of polyamides and polyesters, mixed resins of polyesters and acid-modified polyolefins, and mixed resins of polyesters and metal-modified polyolefins. Among them, polyurethane-based two-liquid curable adhesive resins; and polyamides, polyesters or blend resins of these resins and modified polyolefins are preferred because they are excellent in spreadability, durability and yellowing inhibition action under high-humidity conditions, thermal degradation inhibition action during heat-sealing, and so on, and effectively suppress occurrence of delamination by inhibiting a reduction in lamination strength between the base material layer 1 and the metal layer 3.

The adhesive layer 2 may be made multilayered with different adhesive resin components. When the adhesive layer 2 is made multilayered with different resin components, it is preferred that a resin excellent in adhesion with the base material layer 1 is selected as an adhesive resin component to be disposed on the base material layer 1 side, and an adhesive resin component excellent in adhesion with the metal layer 3 is selected as an adhesive resin component to be disposed on the metal layer 3 side for improving the lamination strength between the base material layer 1 and the metal layer 3. When the adhesive layer 2 is made multilayered with different adhesive resin components, specific examples of the preferred adhesive resin component to be disposed on the metal layer 3 side include acid-modified polyolefins, metal-modified polyolefins, mixed resins of polyesters and acid-modified polyolefins, and resins containing a copolymerization polyester.

The thickness of the adhesive layer 2 is, for example, 1 to 50 μm, preferably 2 to 25 μm.

[Metal Layer 3]

In the battery packaging material according to the present invention, the metal layer 3 is a layer which is intended to improve the strength of the packaging material, and also functions as a barrier layer for preventing ingress of water vapor, oxygen, light and the like into the battery. Specific examples of the metal that forms the metal layer 3 include metal foils such as those of aluminum, stainless steel and titanium. Among them, aluminum is suitably used. For preventing occurrence of creases and pinholes during production of the packaging material, it is preferred to use soft aluminum, for example annealed aluminum (JIS A8021P-O) or (JIS A8079P-O), for the metal layer 3 in the present invention.

The thickness of the metal layer 3 is, for example, 10 to 200 μm, preferably 15 to 100 μm.

Preferably, at least one surface, preferably the sealant layer 4-side surface, further preferably both surfaces, of the metal layer 3 is subjected to a chemical conversion treatment for stabilization of bonding, prevention of dissolution and corrosion, and so on. Here, the chemical conversion treatment is a treatment for forming an acid resistance film on the surface of the metal layer 3. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer composed of repeating units represented by the following general formulae (1) to (4).

[Chemical Formula 1]

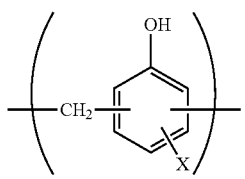

(1)

[Chemical Formula 2]

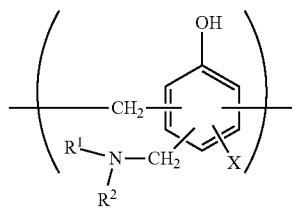

(2)

[Chemical Formula 3]

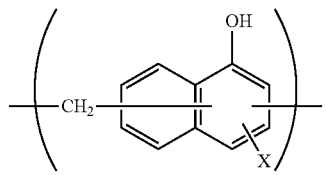

(3)

[Chemical Formula 4]

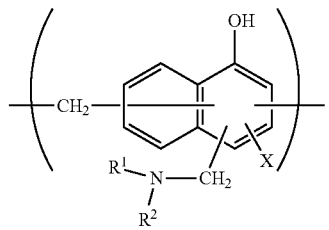

(4)

In the general formulae (1) to (4), X represents a hydrogen atom, a hydroxyl group, an alkyl group, a hydroxyalkyl group, an allyl group or a benzyl group. $R_1$ and $R_2$ are the same or different, and each represent a hydroxyl group, an alkyl group or a hydroxyalkyl group. In the general formulae (1) to (4), examples of the alkyl group represented by X, $R_1$ and $R_2$ include linear or branched alkyl groups with a carbon number of 1 to 4, such as a methyl group, an ethyl group, a n-propyl group, an isopropyl group, a n-butyl group, an isobutyl group and a tert-butyl group. Examples of the hydroxyalkyl group represented by X, $R_1$ and $R_2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), X is preferably any one of a hydrogen atom, a hydroxyl group, and a hydroxyalkyl group. The number average molecular weight of the aminated phenol polymer composed of repeating units represented by the general formulae (1) to (4) is, for example, about 500 to about 1000000, preferably about 1000 to about 20000.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form corrosion resistance treatment layer on the surface of the metal layer 3. A resin layer with a cationic polymer crosslinked with a crosslinking agent may be formed on the corrosion resistance treatment layer. Here, examples of the cationic polymer include polyethyleneimine, ion polymer complexes composed of a polymer having polyethyleneimine and a carboxylic acid, primary amine-grafted acrylic resins obtained by grafting primary amine to an acryl backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

The chemical conversion treatment may be performed with one chemical conversion treatment alone, or may be performed in combination of two or more chemical conversion treatments. The chemical conversion treatment may be performed using one compound alone, or may be performed using two or more compounds in combination. Among them, a chromic acid chromate treatment is preferred, and a chromate treatment using a chromic acid compound, a phosphoric acid compound and the aminated phenol polymer in combination is further preferred.

The amount of the acid resistance film to be formed on the surface of the metal layer 3 in the chemical conversion treatment is not particularly limited, but for example when a chromate treatment is performed using a chromic acid compound, a phosphoric acid compound and the aminated phenol polymer in combination, it is desirable that the chromic acid compound be contained in an amount of about 0.5 mg to about 50 mg, preferably about 1.0 mg to about 40 mg, in terms of chromium, the phosphorus compound be contained in an amount of about 0.5 mg to about 50 mg, preferably about 1.0 to about 40 mg, in terms of phosphorus, and the aminated phenol polymer be contained in an amount of about 1 mg to 200 mg, preferably about 5.0 mg to 150 mg, per 1 $m^2$ of the surface of the metal layer 3.

The chemical conversion treatment is performed in the following manner: a solution containing a compound to be used for formation of an acid resistance film is applied to the surface of the metal layer 3 by a bar coating method, a roll coating method, a gravure coating method, an immersion method or the like, and heating is then performed so that the temperature of the metal layer 3 is about 70 to 200° C. The metal layer 3 may be subjected to a degreasing treatment by an alkali immersion method, an electrolytic cleaning method, an acid cleaning method, an electrolytic acid cleaning method or the like before the metal layer 3 is subjected to a chemical conversion treatment. When a degreasing treatment is performed as described above, the chemical conversion treatment of the surface of the metal layer 3 can be further efficiently performed.

[Sealant Layer 4]

In the battery packaging material according to the present invention, the sealant layer 4 corresponds to an innermost layer, and at the time of assembling a battery, the sealant layers 4 are heat-sealed with each other to hermetically seal the battery element. The sealant layer 4 may be formed of a plurality of layers.

When an adhesive layer 5 or insulating layer 6 as described later is absent, the sealant layer 4 is formed of a resin which allows the sealant layer 4 to be bonded to the metal layer 3 and allows the sealant layers 4 to be heat-sealed with each other. When an adhesive layer 5 or insulating layer 6 as described later is present, the sealant layer 4 is formed of a resin which allows the sealant layer 4 to be bonded to the adhesive layer 5 or insulating layer 6 and allows the sealant layers 4 to be heat-sealed with each other. The resin that forms the sealant layer 4 is not particularly limited as long as it has the above-mentioned properties, and examples thereof include acid-modified polyolefins, polyester resins and fluorine-based resins. When the adhesive layer 5 or insulating layer 6 described later is present, additionally a polyolefin, a modified cyclic polyolefin or the like can be used. The resins that form the sealant layer 4 may be used alone, or may be used in combination of two or more thereof.

The acid-modified polyolefin to be used for formation of the sealant layer 4 is a polymer with the polyolefin modified by, for example, subjecting the polyolefin to graft polymerization with an unsaturated carboxylic acid. Specific examples of the polyolefin to be acid-modified include polyethylene such as low-density polyethylene, medium-density polyethylene, high-density polyethylene and linear low-density polyethylene; crystalline or noncrystalline polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyolefins having at least propylene as a constituent monomer are preferred, and terpolymers of ethylene-butene-propylene and random copolymers of propylene-ethylene are further preferred from the viewpoint of heat resistance. Examples of the unsaturated carboxylic acid to be used for modification include maleic acid, acrylic acid, itaconic acid, crotonic acid, maleic anhydride and itaconic anhydride. Among these unsaturated carboxylic acids, maleic acid and maleic anhydride are preferred. These acid-modified polyolefins may be used alone, or may be used in combination of two or more thereof.

Specific examples of the polyester resin to be used for formation of the sealant layer 4 include polyethylene terephthalate, polybutylene terephthalate, polyethylene naphthalate, polybutylene naphthalate, polyethylene isophthalate, polycarbonate, copolymerization polyesters with ethylene terephthalate as a main repeating unit, and copolymerization polyesters with a butylene terephthalate as a main repeating unit. Specific examples of the copolymerization polyester with ethylene terephthalate as a main repeating unit include copolymer polyesters that are polymerized with ethylene isophthalate with ethylene terephthalate as a main repeating unit (hereinafter, abbreviated as follows after polyethylene(terephthalate/isophthalate)), polyethylene(terephthalate/isophthalate), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene(terephthalate/decane dicarboxylate). Specific examples of the copolymerization polyester with butylene terephthalate as a main repeating unit include copolymer polyesters that are polymerized with butylene isophthalate with butylene terephthalate as a main repeating unit (hereinafter, abbreviated as follows after polybutylene(terephthalate/isophthalate)), polybutylene(terephthalate/adipate), polybutylene(terephthalate/sebacate), polybutylene(terephthalate/decane dicarboxylate) and polybutylene naphthalate. These polyester resins may be used alone, or may be used in combination of two or more thereof.

Specific examples of the fluorine-based resin to be used for formation of the sealant layer 4 include tetrafluoroethylene, trifluoroethylene, polyvinylidene fluoride, polyvinyl fluoride, ethylene tetrafluoroethylene, polychlorotrifluoroethylene, ethylene chlorotrifluoroethylene copolymers, tetrafluoroethylene-hexafluoropropylene copolymers and fluorine-based polyols. These fluorine-based resins may be used alone, or may be used in combination of two or more thereof.

When the adhesive layer 5 or insulating layer 6 is absent, the sealant layer 4 may be formed of only an acid-modified polyolefin, a polyester resin or a fluorine-based resin, or may contain a resin component other than the foregoing resin as necessary. When a resin component other than an acid-modified polyolefin, a polyester resin or a fluorine-based resin is included in the sealant layer 4, the content of the acid-modified polyolefin, the polyester resin or the fluorine-based resin in the sealant layer 4 is, for example, 10 to 95% by mass, preferably 30 to 90% by mass, further preferably 50 to 80% by mass while it is not particularly limited as long as the effect of the present invention is not hindered.

Examples of the resin component that can be included as necessary in addition to an acid-modified polyolefin, a polyester resin or a fluorine-based resin in the sealant layer 4 include polyolefins.

The polyolefin may have an acyclic or cyclic structure. Specific examples of the acyclic polyolefin include polyethylene such as low-density polyethylene, medium-density polyethylene, high-density polyethylene and linear low-density polyethylene; crystalline or noncrystalline polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. These polyolefins may be used alone, or may be used in combination of two or more thereof.

Among these polyolefins, those having properties as an elastomer (i.e. polyolefin-based elastomers), particularly propylene-based elastomers are preferred for improvement of the adhesive strength after heat-sealing, prevention of interlayer delamination after heat-sealing, and so on. Examples of the propylene-based elastomer include polymers containing, as constituent monomers, propylene and one or more α-olefins with a carbon number of 2 to 20 (excluding propylene), and specific examples of the α-olefin with a carbon number of 2 to 20 (excluding propylene), which forms the propylene-based elastomer, include ethylene, 1-butene, 1-pentene, 1-hexene, 4-methyl-1-pentene, 1-octene, 1-decene, 1-dodecene, 1-tetradecene, 1-hexadecene, 1-octadecene and 1-eicosene. These ethylene-based elastomers may be used alone, or may be used in combination of two or more thereof.

When a resin component other than an acid-modified polyolefin, a polyester resin or a fluorine-based resin is included in the sealant layer 4, the content of the resin component is appropriately set within the range of not hindering the purpose of the present invention. For example, when a propylene-based elastomer is included in the sealant layer 4, the content of the propylene-based elastomer in the sealant layer 4 is normally 5 to 70% by mass, preferably 10 to 60% by mass, further preferably 20 to 50% by mass.

When the adhesive layer 5 or insulating layer 6 described later is present between the metal layer 3 and the sealant layer 4, examples of the resin that forms the sealant layer 4 include polyolefins and modified cyclic polyolefins in addition to the above-mentioned acid-modified polyolefin, polyester resin and fluorine-based resin. These resins may be used alone, or may be used in combination of two or more thereof.

When the adhesive layer 5 or the insulating layer 6 is present, examples of the polyolefin that forms the sealant layer 4 include those shown above as an example. The modified cyclic polyolefin is a polymer obtained by a graft-polymerizing a cyclic polyolefin with an unsaturated carboxylic acid. The cyclic polyolefin to be acid-modified is a copolymer of an olefin and a cyclic monomer. Examples of the olefin include ethylene, propylene, 4-methyl-1-pentene, styrene, butadiene and isoprene. Examples of the cyclic monomer include cyclic alkenes such as norbornene, specifically cyclic dienes such as cyclopentadiene, dicyclopentadiene, cyclohexadiene and norbornadiene. Examples of the unsaturated carboxylic acid to be used for modification include maleic acid, acrylic acid, itaconic acid, crotonic acid, maleic anhydride and itaconic anhydride. Among these unsaturated carboxylic acids, maleic acid and maleic anhydride are preferred. These modified cyclic polyolefins may be used alone, or may be used in combination of two or more thereof.

When the adhesive layer 5 or insulating layer 6 is present, the sealant layer 4 may be formed of only an acid-modified polyolefin, a polyester resin, a fluorine-based resin, a polyolefin or a modified cyclic polyolefin, or may contain a resin component other than the foregoing resin as necessary. When a resin component other than the acid-modified polyolefin, polyester resin, fluorine-based resin, polyolefin or modified cyclic polyolefin is included in the sealant layer 4, the content of the above-mentioned resin in the sealant layer 4 is, for example, 10 to 95% by mass, preferably 30 to 90% by mass, further preferably 50 to 80% by mass while it is not particularly limited as long as the effect of the present invention is not hindered. Examples of the resin component that can be included as necessary include those having properties as an elastomer as described above. The content of the resin component that can be included as necessary is appropriately set within the range of not hindering the purpose of the present invention. For example, when a propylene-based elastomer is included in the sealant layer 4, the content of the propylene-based elastomer in the sealant layer 4 is normally 5 to 70% by mass, preferably 10 to 60% by mass, further preferably 20 to 50% by mass.

The melting point $T_{m1}$ of the sealant layer 4 is preferably 90 to 245° C., more preferably 100 to 220° C. for more effectively exhibiting the sealing property and unsealing property of the battery packaging material according to the present invention. The softening point $T_{s1}$ of the sealant layer 4 is preferably 70 to 180° C., more preferably 80 to 150° C. for the same reason as described above. Further, the melt flow rate (MFR) of the sealant layer 4 at 230° C. is preferably 1.5 to 25 g/10 minutes, more preferably 3.0 to 18 g/10 minutes for the same reason as described above.

Here, the melting point $T_{m1}$ of the sealant layer 4 is a value obtained by measuring the melting point of a resin component, which forms the sealant layer 4, by a DSC method in accordance with JIS K6921-2 (ISO1873-2.2:95). When the sealant layer 4 is formed of a blend resin containing a plurality of resin components, the melting point $T_{m1}$ thereof can be calculated by determining melting points of the respective resins in the manner described above, and calculating a weighed average of the determined melting points based on a mass ratio.

The softening point $T_{s1}$ of the sealant layer 4 is a value obtained by performing measurement using a thermo-mechanical analyzer (TMA). When the sealant layer 4 is formed of a blend resin containing a plurality of resin components, the softening point $T_{s1}$ thereof can be calculated by determining softening points of the respective resins in the manner described above, and calculating a weighed average of the determined softening points based on a mass ratio.

The melt flow rate of the sealant layer 4 is a value obtained by performing measurement using a melt flow measurement device in accordance with JIS K7210.

The thickness of the sealant layer 4 is, for example, 12 to 120 μm, preferably 18 to 80 μm, further preferably 20 to 60 μm.

The sealant layer 4 may be a single layer, or may have multiple layers. The sealant layer 4 may contain a slipping agent etc. as necessary. When the sealant layer 4 contains a slipping agent, moldability of the battery packaging material can be improved. Further, in the present invention, when the sealant layer 4 contains a slipping agent, not only moldability but also insulation quality of the battery packaging material can be improved. The detailed mechanism in which the insulation quality of the battery packaging material is improved when the sealant layer 4 contains a slipping agent is not necessarily evident, but may be considered as follows. That is, when the sealant layer 4 contains a slipping agent, the molecular chain of the resin is easily moved in the sealant layer 4 at the time of application of an external force to the sealant layer 4, so that cracks are hardly generated. Particularly, when the sealant layer 4 is formed of a plurality of kinds of resins, cracks are easily generated at interfaces existing between these resins, but when a slipping agent exists on the interfaces, the resin is easily moved at the interface, so that generation of cracks at the time of application of an external force can be effectively suppressed. Through this mechanism, deterioration of insulation quality due to generation of cracks in the sealant layer may be suppressed.

The slipping agent is not particularly limited, a known slipping agent may be used, and examples thereof include those shown above as an example for the base material layer 1. The slipping agents may be used alone, or may be used in combination of two or more thereof. The content of the slipping agent in the sealant layer 4 is not particularly limited, and is preferably about 0.01 to 0.2% by mass, more preferably about 0.05 to 0.15% by mass for improving the moldability and insulation quality of the battery packaging material.

The thickness of the sealant layer 4 is, for example, 5 to 40 μm, preferably 10 to 35 μm, further preferably 15 to 30 μm.

The specific aspect for unsealing the battery packaging material after the ambient temperature reaches a set temperature T° C. fixed between 100° C. and 160° C., the specific aspect for unsealing the battery packaging material at a lower temperature, and the specific aspect in which the insulating layer 6 is provided between the sealant layer 4 and the metal layer 3 will now be described in detail in the following sections A to F.

A. Aspect in which the Sealant Layer has Two Layers when the Battery Packaging Material is Unsealed after the Ambient Temperature Reaches a Set Temperature T° C. Fixed Between 100° C. And 160° C.

Where the battery packaging material of the present invention is a battery packaging material which is used in a battery configured to ensure that when the battery is heated to a set temperature T° C. fixed between 100° C. and 160° C., the packaging material is not unsealed until the ambient temperature reaches the temperature T° C., and after the ambient temperature reaches the temperature T° C., the packaging material is quickly unsealed, the aspect in which the sealant layer has two layers is as described below.

In the battery packaging material according to the present invention, the sealant layer includes a first sealant layer which is situated on the metal layer side and which contains an acid-modified polyolefin, and a second sealant layer which is laminated on the first sealant layer and situated at the innermost layer and which contains a polyolefin, and the first sealant layer 4a and the second sealant layer 4b satisfy the following formulae (1) and (2):

$$-10 \leq T_{m1}-T \leq -5 \quad (1)$$

$$-5 \leq T_{m2}-T \leq 5 \quad (2)$$

wherein $T_{m1}$ is a melting point (° C.) of the first sealant layer;
$T_{m2}$ is a melting point (° C.) of the second sealant layer; and
T is a set temperature (° C.) fixed between 100° C. and 160° C. The set temperature T° C. is preferably 140 to 160° C.

(First Sealant Layer)

In this aspect, the first sealant layer is a layer containing an acid-modified polyolefin and situated on the metal layer side. The acid-modified polyolefin to be used for formation of the first sealant layer may be the same as that shown above as an example for the sealant layer 4. When a resin component other than an acid-modified polyolefin is included in the first sealant layer, the content of the acid-modified polyolefin in the first sealant layer is, for example, 10 to 95% by mass, preferably 30 to 90% by mass, further preferably 50 to 80% by mass while it is not particularly limited as long as the effect of the present invention is not hindered.

The resin component that can be included as necessary in addition to an acid-modified polyolefin in the first sealant layer may be the same as that shown above as an example for the sealant layer 4.

When a resin component other than an acid-modified polyolefin is included in the first sealant layer, the content of the resin component is appropriately set within the range of not hindering the purpose of the present invention. For example, when a propylene-based elastomer is included in the first sealant layer, the content of the propylene-based elastomer in the first sealant layer is normally 5 to 60% by mass, preferably 10 to 50% by mass, further preferably 20 to 40% by mass.

The first sealant layer contains an acid-modified polyolefin, and also is configured to satisfy the following formula (1).

$$-10 \leq T_{m1}-T \leq -5 \quad (1)$$

T: set temperature (° C.) fixed between 100° C. and 160° C.

$T_{m1}$: melting point (° C.) of first sealant layer

In this way, the melting point $T_{m1}$ of the first sealant layer is set to a value lower than the set temperature T in a predetermined range, whereby when the battery is exposed to a high temperature before the ambient temperature reaches the set temperature T° C., the first sealant layer turns into a molten state, so that at least a part of the sealant layer 4 can be delaminated from the interface between the metal layer 3 and the sealant layer 4. At least a part of the sealant layer 4 which is delaminated from the metal layer 3 is extended under internal pressure, and swollen while a hermetically sealed state is maintained, and thereafter fine cleavages (pinholes etc.) are generated in the swollen sealant layer 4 in 30 minutes or less after the ambient temperature reaches the temperature T° C., so that a gas in the battery can be gently released.

Here, the melting point $T_{m1}$ of the first sealant layer is a value obtained by measuring the melting point of a resin component, which forms the first sealant layer, by a DSC method in accordance with JIS K6921-2 (ISO 1873-2.2:95). When the first sealant layer is formed of a blend resin containing a plurality of resin components, the melting point $T_{m1}$ thereof is determined in the following manner: the blend resin is subjected to a DSC method in accordance with JIS K6921-2 (ISO 1873-2.2:95), a ratio of a peak area of a melting point corresponding to each resin component is calculated with the total peak area set to 1, the melting point corresponding to each resin component is multiplied by the ratio of the peak area (melting point×area ratio), and the values (melting point×area ratio) thus calculated for the respective melting points are added together.

The melting point of the resin component depends on a molecular weight, a constituent monomer type and ratio, and so on, and therefore the molecular weight, the constituent monomer type and ratio, and so on of each of an acid-modified polyolefin to be blended in the first sealant layer and a different resin component to be blended in the first sealant layer as necessary are appropriately set so as to satisfy the range of the melting point of the first sealant layer.

The first sealant layer may contain a slipping agent as necessary. When the first sealant layer contains a slipping agent, moldability of the battery packaging material can be improved. Further, in the present invention, when the first sealant layer contains a slipping agent, not only moldability but also insulation quality of the battery packaging material can be improved. The detailed mechanism in which the insulation quality of the battery packaging material is improved when the first sealant layer contains a slipping agent is not necessarily evident, but may be considered as follows. That is, when the first sealant layer contains a slipping agent, the molecular chain of the resin is easily moved in the first sealant layer at the time of application of an external force to the first sealant layer, so that cracks are hardly generated. Particularly, when the first sealant layer is formed of a plurality of kinds of resins, cracks are easily generated at interfaces existing between these resins, but when a slipping agent exists on the interfaces, the resin is easily moved at the interface, so that generation of cracks at the time of application of an external force can be effectively suppressed. Through this mechanism, deterioration of insulation quality due to generation of cracks in the first sealant layer may be suppressed.

The slipping agent is not particularly limited, a known slipping agent may be used, and examples thereof include those shown above as an example for the base material layer 1. The content of the slipping agent in the first sealant layer is not particularly limited, and is preferably about 0.01 to 0.2% by mass, more preferably about 0.1 to 0.15% by mass for improving the moldability and insulation quality of the battery packaging material.

The thickness of the first sealant layer is, for example, 5 to 40 µm, preferably 10 to 35 µm, further preferably 15 to 30 µm.

(Second Sealant Layer)

The second sealant layer is a layer which contains a polyolefin and which is laminated on the first sealant layer and situated at the innermost layer of the battery packaging material. The polyolefin to be used for formation of the second sealant layer is not particularly limited as long as the above-mentioned melting point is satisfied, and polyolefin may be the same as that shown above as an example for the sealant layer 4.

The second sealant layer may be formed of only a polyolefin, or may contain a resin component other than the polyolefin as necessary as long as the above-mentioned melting point is secured. When a resin component other than a polyolefin is included in the second sealant layer, the content of the polyolefin in the second sealant layer is, for example, 10 to 95% by mass, preferably 30 to 90% by mass, further preferably 50 to 80% by mass while it is not particularly limited as long as the effect of the present invention is not hindered.

Examples of the resin component that can be included as necessary in addition to a polyolefin in the second sealant layer include acid-modified polyolefins. Specific examples of the acid-modified polyolefin may be the same as those shown as an example for the sealant layer 4. When a resin component other than a polyolefin is included in the second sealant layer, the content of the resin component is appropriately set within the range of not hindering the purpose of the present invention. For example, when an acid-modified polyolefin is included in the second sealant layer, the content of the acid-modified polyolefin in the second sealant layer is normally 5 to 60% by mass, preferably 10 to 50% by mass, further preferably 20 to 40% by mass.

The second sealant layer contains a polyolefin, and also is configured to satisfy the following formula (2).

$$-5 \leq T_{m2} - T \leq 5 \tag{2}$$

T: set temperature (° C.) fixed between 100° C. and 160° C.

$T_{m2}$: melting point (° C.) of first sealant layer

In this way, the melting point $T_{m2}$ of the second sealant layer is set to a temperature equal to or higher than the melting point $T_{m1}$ of the first sealant layer and set to a temperature within ±5° C. from the set temperature T, whereby even when before the ambient temperature reaches the set temperature T° C., the battery is exposed to a high temperature, and thus the first sealant layer turns into a molten state, so that least at a part of the sealant layer 4 is delaminated from the interface between the metal layer 3 and the sealant layer 4, the second sealant layer functions to maintain a hermetically sealed state while being swollen under internal pressure, and after the ambient temperature reaches the set temperature T° C., fine cleavages (pinholes etc.) are quickly generated, so that a gas in the battery can be gently released. When the melting point $T_{m2}$ of the second sealant layer is set to a temperature higher than the set temperature T by more than 5° C., there is the tendency that it becomes difficult to perform heat-sealing satisfactorily, so that the sealing strength varies, or the sealant layer 4 cannot be quickly unsealed although the ambient temperature reaches the set temperature T° C.

The method for calculating the melting point $T_{m2}$ of the second sealant layer is the same as the method for calculating the melting point $T_{m1}$ of the first sealant layer.

The melting point of the resin component depends on a molecular weight, a constituent monomer type and ratio, and so on, and therefore the molecular weight, the constituent monomer type and ratio, and so on of each of a polyolefin to be blended in the second sealant layer and a different resin component to be blended in the second sealant layer as necessary are appropriately set so as to satisfy the range of the melting point of the second sealant layer.

The second sealant layer may contain a slipping agent as necessary similarly to the first sealant layer. A slipping agent may be applied on a surface of the second sealant layer on a side opposite to the first sealant layer. When the second sealant layer contains a slipping agent, and when a slipping agent is applied on a surface of the second sealant layer, the moldability of the battery packaging material can be improved.

Further, in the present invention, when the second sealant layer contains a slipping agent, not only moldability but also insulation quality of the battery packaging material can be improved. In the present invention, it is preferred that at least one of the first sealant layer and the second sealant layer contains a slipping agent for improving the insulation quality of the battery packaging material. The detailed mechanism in which the insulation quality of the battery packaging material is improved when the second sealant layer contains a slipping agent is not necessarily evident, but may be considered in the same manner as in the case of the first sealant layer. Particularly, a large external force is easily applied to the second sealant layer during heat-sealing because it is situated at the innermost layer of the battery packaging material. Thus, when the second sealant layer situated at the innermost layer contains the slipping agent, the moldability and insulation quality of the battery packaging material can be effectively improved. The type and amount of a slipping agent contained in the second sealant layer may be the same as the type and amount of the slipping agent in the first sealant layer. When a slipping agent is applied on the surface of the second sealant layer, the type of the slipping agent may be the same as the type of the slipping agent in the first sealant layer. The application amount of the slipping agent is not particularly limited, and is, for example, about 0.01 to 100 mg/m², preferably about 0.1 to 10 mg/m².

The thickness of the second sealant layer is, for example, 5 to 40 μm, preferably 10 to 35 μm, further preferably 15 to 30 μm.

(Relationship Between Melting Points of First Sealant Layer and Second Sealant Layer)

The first sealant layer and the second sealant layer satisfy the above-mentioned melting points, respectively, and resultantly satisfy the relationship of $0 \leq (T_{m2} - T_{m1}) \leq 15$.

(Thickness of Sealant Layer 4 where Sealant Layer has Two Layers)

When the sealant layer has two layers, the thickness of the sealant layer 4 is determined on the basis of the thickness of each of the first sealant layer and the second sealant layer, and is, for example, 10 to 80 μm, preferably 20 to 70 μm, further preferably 30 to 60 μm.

B. Aspect in which the Sealant Layer has Three Layers when the Battery Packaging Material is Unsealed after the Ambient Temperature Reaches a Set Temperature T° C. Fixed Between 100° C. And 160° C.

Where the battery packaging material of the present invention is a battery packaging material which is used in a battery configured to ensure that when the battery is heated to a set temperature T° C. fixed between 100° C. and 160° C., the packaging material is not unsealed until the ambient temperature reaches the temperature T° C., and after the ambient temperature reaches the temperature T° C., the packaging material is quickly unsealed, the aspect in which the sealant layer has three layers is as described below.

In the battery packaging material according to the present invention, the sealant layer includes in order a first sealant layer containing an acid-modified polyolefin, a second sealant layer containing at least one of a polyolefin and an acid-modified polyolefin, and a third sealant layer containing a polyolefin, the first sealant layer being situated on the metal layer side, the third sealant layer being situated at the innermost layer, and the first sealant layer 4a, the second sealant layer 4b and the third sealant layer 4c satisfy the following formulae (1) to (3):

$$-10 \leq T_{m1} - T \leq -5 \quad (1)$$

$$5 \leq T_{m2} - T \leq 10 \quad (2)$$

$$-5 \leq T_{m3} - T \leq 5 \quad (3)$$

wherein $T_{m1}$ is a melting point (° C.) of the first sealant layer;
$T_{m2}$ is a melting point (° C.) of the second sealant layer;
$T_{m3}$ is a melting point (° C.) of the third sealant layer; and
T is a set temperature (° C.) fixed between 100° C. and 160° C. The set temperature T° C. is preferably 140 to 160° C.

(First Sealant Layer)

In this aspect, the first sealant layer is a layer containing an acid-modified polyolefin and situated on the metal layer side. The resin that forms the first sealant layer is the same as that in the two-layer aspect in the item A above.

The first sealant layer contains an acid-modified polyolefin, and also is configured to satisfy the following formula (1).

$$-10 \leq T_{m1} - T \leq -5 \quad (1)$$

T: set temperature (° C.) fixed between 100° C. and 160° C.

$T_1$: melting point (° C.) of first sealant layer

In this way, the melting point $T_{m1}$ of the first sealant layer is set to a value lower than the set temperature T in a predetermined range, whereby when the battery is exposed to a high temperature before the ambient temperature reaches the set temperature T° C., the first sealant layer turns into a molten state, so that at least a part of the sealant layer 4 can be delaminated from the interface between the metal layer 3 and the sealant layer 4. At least a part of the sealant layer 4 which is delaminated from the metal layer 3 is extended under internal pressure, and swollen while a hermetically sealed state is maintained, and thereafter fine cleavages (pinholes etc.) are generated in the swollen sealant layer 4 in 30 minutes or less after the ambient temperature reaches the temperature T° C., so that a gas in the battery can be gently released.

The melting point $T_{m1}$ of the first sealant layer is a value obtained by performing measurement in the same manner as described above.

The first sealant layer may contain a slipping agent as necessary as described above.

The thickness of the first sealant layer is, for example, 5 to 40 μm, preferably 10 to 35 μm, further preferably 15 to 30 μm.

(Second Sealant Layer)

The second sealant layer is a layer which contains at least one of a polyolefin and an acid-modified polyolefin and which is disposed between the first sealant layer and the third sealant layer. The polyolefin and acid-modified polyolefin to be used for formation of the second sealant layer may be the same as the polyolefin and acid-modified polyolefin shown as an example for the sealant layer 4.

The second sealant layer may be formed of only one of a polyolefin and an acid-modified polyolefin, or may contain a different resin component as necessary as long as the above-mentioned melting point is secured. When a different resin component is included in the second sealant layer, the content of at least one of the polyolefin and the acid-modified polyolefin in the second sealant layer is, for example, 10 to 95% by mass, preferably 30 to 90% by mass, further preferably 50 to 80% by mass while it is not particularly limited as long as the effect of the present invention is not hindered.

The second sealant layer contains at least one of a polyolefin and an acid-modified polyolefin, and also is configured to satisfy the following formula (2).

$$-5 \leq T_{m2} - T \leq 10 \tag{2}$$

T: set temperature (° C.) fixed between 100° C. and 160° C.

$T_{m2}$: melting point (° C.) of second sealant layer

In this way, the melting point $T_{m2}$ of the second sealant layer is set to a temperature equal to or higher than the melting point $T_{m1}$ of the first sealant layer and set to a temperature within ±5° C. from the set temperature T, whereby even when before the ambient temperature reaches the set temperature T° C., the battery is exposed to a high temperature, and thus the first sealant layer turns into a molten state, so that at least a part of the sealant layer 4 is delaminated from the interface between the metal layer 3 and the sealant layer 4, the second sealant layer functions to maintain a hermetically sealed state while being swollen under internal pressure, and after the ambient temperature reaches the set temperature T° C., fine cleavages (pinholes etc.) are quickly generated, so that a gas in the battery can be gently released. Further, since the melting point $T_{m2}$ of the second sealant layer is set to a temperature which is equal to or higher than the melting point $T_{m1}$ of the first sealant layer and which is equal to or higher than the melting point $T_{m3}$ of the third sealant layer, excellent insulation quality can be imparted to the battery packaging material even when it is heated to the set temperature T° C.

The method for calculating the melting point $T_{m2}$ of the second sealant layer is the same as the method for calculating the melting point $T_{m1}$ of the first sealant layer.

The melting point of the resin component depends on a molecular weight, a constituent monomer type and ratio, and so on, and therefore the molecular weight, the constituent monomer type and ratio, and so on of each of a polyolefin to be blended in the second sealant layer and a different resin component to be blended in the second sealant layer as necessary are appropriately set so as to satisfy the range of the melting point of the second sealant layer.

The second sealant layer may contain a slipping agent as necessary similarly to the first sealant layer. When the second sealant layer contains a slipping agent, moldability of the battery packaging material can be improved. Further, in the present invention, when the second sealant layer contains a slipping agent, not only moldability but also insulation quality of the battery packaging material can be improved. The detailed mechanism in which the insulation quality of the battery packaging material is improved when the second sealant layer contains a slipping agent is not necessarily evident, but may be considered in the same manner as in the case of the first sealant layer. The type and amount of a slipping agent contained in the second sealant layer may be the same as the type and amount of the slipping agent in the first sealant layer.

The thickness of the second sealant layer is, for example, 5 to 40 µm, preferably 10 to 35 µm, further preferably 15 to 30 µm.

(Third Sealant Layer)

The third sealant layer is a layer which contains a polyolefin and which is laminated on the first sealant layer and situated at the innermost layer of the battery packaging material. The polyolefin to be used for formation of the third sealant layer may be the same as that shown as an example for the sealant layer 4.

The third sealant layer may be formed of only a polyolefin, or may contain a resin component other than the polyolefin as necessary as long as the above-mentioned melting point is secured. When a resin component other than a polyolefin is included in the third sealant layer, the content of the polyolefin in the third sealant layer is, for example, 10 to 95% by mass, preferably 30 to 90% by mass, further preferably 50 to 80% by mass while it is not particularly limited as long as the effect of the present invention is not hindered.

Examples of the resin component that can be included as necessary in addition to a polyolefin in the third sealant layer include acid-modified polyolefins. Specific examples of the acid-modified polyolefin may be the same as those shown as an example for the sealant layer 4. When a resin component other than a polyolefin is included in the third sealant layer, the content of the resin component is appropriately set within the range of not hindering the purpose of the present invention. For example, when an acid-modified polyolefin is included in the third sealant layer, the content of the acid-modified polyolefin in the third sealant layer is normally 5 to 60% by mass, preferably 10 to 50% by mass, further preferably 20 to 40% by mass.

The third sealant layer contains a polyolefin, and also is configured to satisfy the following formula (3).

$$-5 \leq T_{m3} - T \leq 5 \tag{3}$$

T: set temperature (° C.) fixed between 100° C. and 160° C.

$T_{m3}$: melting point (° C.) of third sealant layer

In this way, the melting point $T_{m3}$ of the third sealant layer is set to a temperature equal to or higher than the melting point $T_{m1}$ of the first sealant layer and set to a temperature within ±5° C. from the set temperature T, whereby even when before the ambient temperature reaches the set temperature T° C., the battery is exposed to a high temperature, and thus at least a part of the sealant layer 4 is delaminated from the interface between the metal layer 3 and the sealant layer 4, so that the sealant layer 4 is swollen in a hermetically sealed state, occurrence of rapid unsealing due to cohesive fracture resulting from progress of cracking in the sealant layer 4 is suppressed, and fine cleavages (pinholes etc.) are generated, so that after the ambient temperature reaches the temperature T° C., a gas in the battery can be quickly and gently released. When the melting point $T_{m3}$ of the third sealant layer is set to a temperature higher than the set temperature T by more than 5° C., there is the tendency that it becomes difficult to perform heat-sealing satisfactorily, so that the sealing strength varies, or the sealant layer 4 cannot be quickly unsealed although the ambient temperature reaches the set temperature T° C.

The method for calculating the melting point $T_{m3}$ of the third sealant layer is the same as the method for calculating the melting point $T_{m1}$ of the first sealant layer.

As described above, the melting point of the resin component depends on a molecular weight, a constituent monomer type and ratio, and so on, and therefore the molecular weight, the constituent monomer type and ratio, and so on of each of a polyolefin to be blended in the third sealant layer and a different resin component to be blended in the third sealant layer as necessary are appropriately set so as to satisfy the range of the melting point of the third sealant layer.

The third sealant layer may contain a slipping agent as necessary similarly to the first sealant layer. A slipping agent may be applied on a surface of the third sealant layer on a side opposite to the second sealant layer. When the third sealant layer contains a slipping agent, and when a slipping agent is applied on a surface of the third sealant layer, the moldability of the battery packaging material can be improved.

Further, when the third sealant layer contains a slipping agent, not only moldability but also insulation quality of the battery packaging material can be improved. In the present invention, it is preferred that at least one of the first sealant layer, the second sealant layer and the third sealant layer contains a slipping agent for improving the insulation quality of the battery packaging material. The detailed mechanism in which the insulation quality of the battery packaging material is improved when the third sealant layer contains a slipping agent is not necessarily evident, but may be considered in the same manner as in the case of the first sealant layer. Particularly, a large external force is easily applied to the third sealant layer during heat-sealing because it is situated at the innermost layer of the battery packaging material. Thus, when the third sealant layer situated at the innermost layer contains the slipping agent, the moldability and insulation quality of the battery packaging material can be effectively improved. The type and amount of a slipping agent contained in the third sealant layer may be the same as the type and amount of the slipping agent in the first sealant layer. When a slipping agent is applied on the surface of the third sealant layer, the type of the slipping agent may be the same as the type of the slipping agent in the first sealant layer. The application amount of the slipping agent is not particularly limited, and is, for example, about 0.01 to 100 mg/m², preferably about 0.1 to 10 mg/m².

The thickness of the third sealant layer is, for example, 5 to 40 µm, preferably 10 to 35 µm, further preferably 15 to 30 µm.

(Relationship Among Melting Points of First Sealant Layer, Second Sealant Layer and Third Sealant Layer)

The first sealant layer and the second sealant layer satisfy the above-mentioned melting points, respectively, and resultantly satisfy the relationship of $10 \le (T_{m2}-T_{m1}) \le 20$.

The first sealant layer and the third sealant layer satisfy the above-mentioned melting points, respectively, and resultantly satisfy the relationship of $0 \le (T_{m3}-T_{m1}) \le 15$.

(Thickness of Sealant Layer 4)

When the sealant layer 4 has three layers, the thickness of the sealant layer 4 is determined on the basis of the thickness of each of the first sealant layer, the second sealant layer and the third sealant layer, and is, for example, 15 to 120 µm, preferably 60 to 80 µm, further preferably 30 to 60 µm.

C. First Aspect in which the Battery Packaging Material is Unsealed at a Low Temperature The preferred first aspect in which the battery packaging material is unsealed at a low temperature in the present invention is as described below.

In the battery packaging material according to the present invention, the sealant layer 4 includes in order a first sealant layer 4a containing an acid-modified polyolefin, and a second sealant layer 4b, the first sealant layer 4a is situated on the metal layer 3 side and the second sealant layer 4b is situated at the innermost layer in the sealant layer 4, the first sealant layer 4a has a melting point $T_{m1}$ of 100 to 160° C., and the first sealant layer 4a has a softening point $T_{s1}$ of 60 to 150° C. The unsealing temperature is normally 150° C. or lower.

(First Sealant Layer)

In the first aspect in which the battery packaging material is unsealed at a low temperature, the first sealant layer 4a is a layer containing an acid-modified polyolefin and situated on the metal layer side. The acid-modified polyolefin to be used for formation of the first sealant layer 4a may be the same as that shown above as an example for the sealant layer 4.

The first sealant layer 4a may be formed of only an acid-modified polyolefin, or may contain a resin component other than the acid-modified polyolefin as necessary as long as the later-described melting point and softening point are secured. It is preferred that the first sealant layer 4a contains at least one of a noncrystalline polyolefin and a thermoplastic elastomer as a resin component other than an acid-modulated polyolefin for ensuring that the first sealant layer 4a has a melting point and a softening point as described later. In the present invention, the noncrystalline polyolefin refers to a polyolefin having substantially no melting point with the crystallinity degree reduced by using an atactic polymer having a low tacticity. In the present invention, the melting point of a polyolefin refers to an endothermic peak temperature in differential scanning calorimetry (DSC).

The noncrystalline polyolefin is not particularly limited as long as it is a noncrystalline resin containing at least an olefin as a monomer unit. The polyolefin may have an acyclic or cyclic structure. Specific examples of the acyclic polyolefin include polyethylene such as low-density polyethylene, medium-density polyethylene, high-density polyethylene and linear low-density polyethylene; noncrystalline polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. These polyolefins may be used alone, or may be used in combination of two or more thereof. The noncrystalline polyolefin may be acid-modified by subjecting the polyolefin to graft polymerization with an unsaturated carboxylic acid.

Examples of the different resin component that can be included as necessary include thermoplastic elastomers. The thermoplastic elastomer may be the same as the resin component, which has properties as an elastomer, as shown as an example for the sealant layer 4.

When a resin component other than an acid-modified polyolefin is included in the first sealant layer 4a, the content of the resin component is appropriately set within the range of not hindering the purpose of the present invention. For example, when at least one of a noncrystalline polyolefin and a thermoplastic elastomer is included in the first sealant layer 4a, the content of at least one of the noncrystalline polyolefin and the thermoplastic elastomer in the first sealant layer 4a is normally 5 to 80% by mass, preferably 10 to 70% by mass, further preferably 20 to 60% by mass.

In the first aspect in which the battery packaging material is unsealed at a low temperature, the first sealant layer 4a contains an acid-modified polyolefin, has a melting point $T_{m1}$ of 100 to 160° C., and the softening point $T_{s1}$ of the first sealant layer 4a is set to a low temperature of 60 to 150° C., whereby when the battery is heated, the first sealant layer 4a is softened, so that at least a part of the interface between the metal layer 3 and the sealant layer 4 or the inside of the sealant layer 4 can be delaminated as shown in, for example, FIGS. 3, 4, 7 and 8. Thereafter, the ambient temperature reaches a certain temperature fixed according to heat resistance etc. required for various kinds of batteries, and thus fine cleavages (pinholes etc.) are generated at the delaminated part of the sealant layer 4, so that a gas in the battery can be gently released. When the delaminated part is extended under internal pressure, and swollen while a hermetically sealed state is maintained until fine cleavages are generated in the delaminated part, a gas in the battery can be more gently released. The melting point $T_{m1}$ of the first sealant layer 4a is preferably about 105 to 150° C., more preferably about 110 to 140° C. for more gently releasing a gas in the battery. The softening point $T_{s1}$ of the first sealant layer 4a is preferably about 65 to 140° C., more preferably about 75 to 120° C.

The melting point $T_{m1}$ of the first sealant layer 4a is a value obtained by performing measurement in the same manner as described above.

The softening point $T_{s1}$ of the first sealant layer 4a is a value obtained by performing measurement in accordance with the Vicat softening temperature test method in JIS K7206. When the first sealant layer 4a is formed of a blend resin containing a plurality of resin components, the softening point $T_{s1}$ thereof is determined by adding together the values of softening point×blending ratio of constituent components in the blend resin.

The melting point and the softening point of the resin component depend on a molecular weight, a constituent monomer type and ratio, and so on, and therefore the molecular weight, the constituent monomer type and ratio, and so on of each of an acid-modified polyolefin to be blended in the first sealant layer 4a and a different resin component to be blended in the first sealant layer 4a are necessary are appropriately set so as to satisfy the range of the melting point and the softening point of the first sealant layer 4a. For example, by mixing an acid-modified polyolefin with at least one of a noncrystalline polyolefin and a thermoplastic elastomer as described above, or mixing an acid-modified polyolefin having a high melting point and an acid-modified polyolefin having a low melting point, the softening point $T_{s1}$ can be lowered to 60 to 150° C. while the melting point $T_{m1}$ of the first sealant layer 4a is kept at 100 to 160° C.

The thickness of the first sealant layer 4a is, for example, 5 to 40 μm, preferably 10 to 35 μm, further preferably 15 to 30 μm.

(Second Sealant Layer)

In the first aspect in which the battery packaging material is unsealed at a low temperature, the second sealant layer 4b is a layer laminated on the first sealant layer 4a and situated at the innermost layer of the battery packaging material. In the battery packaging material, the second sealant layers are heat-sealed with each other to hermetically seal the battery element. Preferably, the second sealant layer 4b contains a polyolefin for improving the sealability of the sealant layer 4. The polyolefin to be used for formation of the second sealant layer 4b is not particularly limited, and examples thereof include polyethylene such as low-density polyethylene, medium-density polyethylene, high-density polyethylene and linear low-density polyethylene; crystalline or noncrystalline polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyolefins having at least propylene as a constituent monomer are preferred, and random copolymers of propylene-ethylene, terpolymers of propylene-ethylene-butene and homopolymers of propylene are further preferred from the viewpoint of heat resistance. These polyolefins may be used alone, or may be used in combination of two or more thereof.

The second sealant layer 4b may be formed of only a polyolefin, or may contain a resin component other than the polyolefin. When a resin component other than a polyolefin is included in the second sealant layer 4b, the content of the polyolefin in the second sealant layer 4b is, for example, 10 to 95% by mass, preferably 30 to 90% by mass, further preferably 50 to 80% by mass while it is not particularly limited as long as the effect of the present invention is not hindered.

Examples of the resin component other than a polyolefin, which can be included in the second sealant layer 4b, include acid-modified polyolefins. Specific examples of the acid-modified polyolefin are the same as those shown as an example for the first sealant layer 4a. When a resin component other than a polyolefin is included in the second sealant layer 4b, the content of the resin component is appropriately set within the range of not hindering the purpose of the present invention. For example, when an acid-modified polyolefin is included in the second sealant layer 4b, the content of the acid-modified polyolefin in the second sealant layer 4b is normally 5 to 60% by mass, preferably 10 to 50% by mass, further preferably 20 to 40% by mass.

In the present invention, it is preferred that the melting point $T_{m2}$ of the second sealant layer 4b and the melting point $T_{m1}$ of the first sealant layer 4a satisfy the following relationship:

$$T_{m2} \geq T_{m1}.$$

That is, the melting point $T_{m2}$ of the second sealant layer 4b is equal to or higher than the melting point $T_{m1}$ of the first sealant layer 4a, and thus as shown in, for example, the part B of each of FIGS. 3, 4, 7 and 8, the delaminated part of the sealant layer 4 is formed into a bag shape (inner bag), so that the battery element can be suitably kept hermetically sealed. When the ambient temperature reaches an unsealing temperature, then the battery packaging material quickly turns into the state shown in, for example, the part C of each of FIGS. 3, 4, 7 and 8, and fine cleavages such as pinholes are generated in the delaminated region of the sealant layer 4, so that the battery packaging material turns into an unsealed state under more gentle conditions. In this connection, it is further preferred that the melting point $T_{m2}$ of the second sealant layer 4b and the melting point $T_{m1}$ of the first sealant layer 4a satisfy the following relationship:

$$T_{m2} \geq T_{m1} \geq +5.$$

The method for calculating the melting point $T_{m2}$ and the softening point $T_{s2}$ of the second sealant layer 4b is the same as the method for calculating the melting point $T_{m1}$ of the first sealant layer 4a.

The melting point $T_{m2}$ of the second sealant layer 4b is not particularly limited, but is preferably 105 to 150° C., more preferably 110 to 140° C. for ensuring that when the battery is heated, the delaminated part of the sealant layer 4 is formed into a bag shape (inner bag) to suitably keep the battery element hermetically sealed until the ambient temperature reaches an unsealing temperature, and after the ambient temperature reaches the unsealed temperature, the battery element is made unsealed under more gentle conditions. The softening point $T_{s2}$ of the second sealant layer 4b is not particularly limited, but is preferably 65 to 140° C., more preferably 70 to 120° C. for the same reason as described above.

As described above, the melting point of the resin component depends on a molecular weight, a constituent monomer type and ratio, and so on, and therefore the molecular weight, the constituent monomer type and ratio, and so on of the resin component to be blended in the second sealant layer 4b are appropriately set so that the battery packaging material is gently unsealed by, for example, satisfying the range of the melting point or softening point of the second sealant layer 4b.

The thickness of the second sealant layer 4b is, for example, 5 to 40 μm, preferably 10 to 35 μm, further preferably 15 to 30 μm.

(Third Sealant Layer Etc.)

In the first aspect, the sealant layer 4 of the battery packaging material according to the present invention may further include, between the first sealant layer 4a and the second sealant layer 4b, a third sealant layer 4c, a fourth sealant layer 4d, etc. in this order from the first sealant layer 4a side. The sealant layer 4 may be configured to have three or more layers by further including the third sealant layer 4c etc. between the first sealant layer 4a and the second sealant layer 4b. Preferably, a layer such as the third sealant layer 4c which is provided between the first sealant layer 4a and the second sealant layer 4b contains at least one of a polyolefin and an acid-modified polyolefin for improving the sealability of the sealant layer 4. Examples of the polyolefin to be used for formation of the third sealant layer 4c etc. include polyolefins that are the same as those shown as an example for the second sealant layer 4b. Examples of the acid-modified polyolefin to be used for formation of the third sealant layer 4c etc. include acid-modified polyolefins that are the same as those shown as an example for the first sealant layer 4a.

The melting point of the third sealant layer 4c etc. is not particularly limited, but is preferably 100 to 160° C. for ensuring that when the battery is heated, the delaminated part of the sealant layer 4 is formed into a bag shape (inner bag) to suitably keep the battery element hermetically sealed until the ambient temperature reaches an unsealing temperature, and after the ambient temperature reaches the unsealed temperature, the battery element is made unsealed under more gentle conditions. The softening point of the third sealant layer etc. is not particularly limited, but is preferably 60 to 150° C. for the same reason as described above.

The thickness of a layer such as the third sealant layer 4c, which is provided between the first sealant layer 4a and the second sealant layer 4b is, for example, 5 to 40 μm, preferably 10 to 35 μm, further preferably 15 to 30 μm.

(Total Thickness of Sealant Layer 4)

The total thickness of the sealant layer 4 is determined on the basis of the thickness of each of the first sealant layer 4a, the second sealant layer 4b, and the third sealant layer 4c provided as necessary, and is, for example, 15 to 120 μm, preferably 60 to 80 μm, further preferably 30 to 60 μm.

D. Second Aspect in which the Battery Packaging Material is Unsealed at a Low Temperature The preferred second aspect in which the battery packaging material is unsealed at a low temperature in the present invention is as described below.

In the battery packaging material according to the present invention, the sealant layer 4 includes in order the first sealant layer 4a containing an acid-modified polyolefin, and the second sealant layer 4b, the first sealant layer 4a is situated on the metal layer 3 side and the second sealant layer 4b is situated at the innermost layer in the sealant layer 4, and the first sealant layer 4a contains at least one of a polyethylene and an acid-modified polyethylene. The unsealing temperature is normally 150° C. or lower.

(First Sealant Layer)

In the second aspect in which the battery packaging material is unsealed at a low temperature, it is preferred that the first sealant layer 4a contains at least one of polyethylene and acid-modified polyethylene in addition to an acid-modified polyolefin. Accordingly, the softening point can be lowered while the melting point of the first sealant layer 4a is kept in a certain range, and thus when the battery is heated, the first sealant layer 4a is softened, so that at least a part of the interface between the metal layer 3 and the sealant layer 4 or the inside of the sealant layer 4 can be delaminated as shown in, for example, FIGS. 3, 4, 7 and 8. Thereafter, the ambient temperature reaches a certain temperature fixed according to heat resistance etc. required for various kinds of batteries, and thus fine cleavages (pinholes etc.) are generated at the delaminated part of the sealant layer 4, so that a gas in the battery can be gently released. When the delaminated part is extended under internal pressure, and swollen while a hermetically sealed state is maintained until fine cleavages are generated in the delaminated part, a gas in the battery can be more gently released.

The acid-modified polyolefin may be the same as that shown as an example for the first sealant layer 4a in the first aspect. The polyethylene is not particularly limited, and examples thereof include low-density polyethylene, medium-density polyethylene, high-density polyethylene and linear low-density polyethylene. The weight average molecular weight of the polyethylene is not particularly limited, but is preferably 10000 to 1000000, more preferably 20000 to 500000. The acid-modified polyethylene is not particularly limited, and examples thereof include those that are acid-modified by subjecting the polyolefin to graft polymerization with an unsaturated carboxylic acid. The weight average molecular weight of the acid-modified polyethylene is not particularly limited, but is preferably 10000 to 1000000, more preferably 20000 to 500000. In the present invention, the weight average molecular weight is a value obtained by performing measurement by gel permeation chromatography (GPC) under the condition of using polystyrene as a standard sample. For each of polyethylene and acid-modified polyethylene, one kind thereof may be used alone, or two or more kinds thereof may be used in combination.

The sum of the contents of polyethylene and acid-modified polyethylene in the first sealant layer 4a, although not particularly limited as long as the effect of the present invention is exhibited, is preferably 5% by mass or more, more preferably 10 to 90% by mass, further preferably 15 to 85% by mass for ensuring that when the battery is heated, the delaminated part of the sealant layer 4 is formed into a bag shape (inner bag) to suitably keep the battery element hermetically sealed until the ambient temperature reaches a set temperature, and after the ambient temperature reaches the set temperature, the battery element is made unsealed under more gentle conditions.

The first sealant layer 4a may be formed of only an acid-modified polyolefin and at least one of polyethylene and acid-modified polyethylene, or may contain a resin component other than the foregoing resin as necessary. Examples of the resin component that can be included as necessary include the noncrystalline polyolefins and thermoplastic elastomers shown as an example in the first aspect.

The melting point $T_{m1}$ of the first sealant layer 4a is not particularly limited, but is preferably 100 to 160° C., more preferably 105 to 150° C., further preferably 110 to 140° C. for ensuring that when the battery is heated, the delaminated part of the sealant layer 4 is formed into a bag shape (inner bag) to suitably keep the battery element hermetically sealed until the ambient temperature reaches a certain temperature, and after the ambient temperature reaches the certain temperature, the battery element is made unsealed under more gentle conditions. The softening point $T_{s1}$ of the first sealant layer 4a is not particularly limited, but is preferably 60 to 150° C., more preferably 65 to 140° C., further preferably 75 to 120° C. for the same reason as in the case of the melting point. The melting point $T_{m1}$ of the first sealant layer 4a and the softening point $T_{s1}$ of the first sealant layer 4a are each a value calculated in the same manner as in the first aspect.

(Second Sealant Layer)

The second sealant layer 4b in the second aspect may be the same as the second sealant layer 4b in the first aspect. In the second aspect, the melting point $T_{m2}$ of the second sealant layer 4b is not particularly limited, but is preferably 100 to 160° C., more preferably 105 to 150° C., further preferably 110 to 140° C. for ensuring that when the battery is heated, the delaminated part of the sealant layer 4 is formed into a bag shape (inner bag) to suitably keep the battery element hermetically sealed until the ambient temperature reaches an unsealing temperature, and after the ambient temperature reaches the unsealing temperature, the battery element is made unsealed under more gentle conditions. The softening point $T_{s2}$ of the second sealant layer 4b is not particularly limited, but is preferably 60 to 150° C., more preferably 65 to 140° C., further preferably 70 to 120° C. for the same reason as described above. The melting point $T_{m2}$ of the second sealant layer 4b and the softening point $T_{s2}$ of the second sealant layer 4b are each calculated in the same manner as described above.

As described above, the melting point of the resin component depends on a molecular weight, a constituent monomer type and ratio, and so on, and therefore the molecular weight, the constituent monomer type and ratio, and so on of the resin component to be blended in the second sealant layer 4b are appropriately set so that the battery packaging material is gently unsealed by, for example, satisfying the range of the melting point or softening point of the second sealant layer 4b.

(Third Sealant Layer Etc.)

In the second aspect, the third sealant layer 4c etc. may be the same as that in the first aspect described above.

E. Third Aspect in which the Battery Packaging Material is Unsealed at a Low Temperature The preferred third aspect in which the battery packaging material is unsealed at a low temperature in the present invention is as described below.

In the battery packaging material according to the present invention, the sealant layer 4 includes in order a first sealant layer containing an acid-modified polyolefin, and a second sealant layer, the first sealant layer 4a is situated on the metal layer 3 side and the second sealant layer 4b is situated at the innermost layer in the sealant layer 4, and the first sealant layer 4a contains at least one selected from the group consisting of an ethylene-vinyl acetate copolymer, an acrylic resin, a styrene polymer and a terpene phenol resin. The unsealing temperature is normally 150° C. or lower.

(First Sealant Layer)

In the third aspect in which the battery packaging material is unsealed at a low temperature, it is preferred that the first sealant layer 4a contains, in addition to an acid-modified polyolefin, at least one selected from the group consisting of an ethylene-vinyl acetate copolymer, an acrylic resin, a styrene polymer and a terpene phenol resin. Accordingly, the softening point can be lowered while the melting point of the first sealant layer 4a is kept in a certain range, and thus when the battery is exposed to a high temperature before the ambient temperature reaches a set temperature T° C., the first sealant layer 4a is softened, so that at least a part of the interface between the metal layer 3 and the sealant layer 4 or the inside of the sealant layer 4 can be delaminated as shown in, for example, FIGS. 3, 4, 7 and 8. Thereafter, fine cleavages (pinholes etc.) are generated in the swollen sealant layer 4, so that a gas in the battery can be gently released. When the delaminated part of the sealant layer 4 is extended under internal pressure, and swollen while a hermetically sealed state is maintained until fine cleavages are generated in at least the delaminated part of the sealant layer 4, a gas in the battery can be more gently released. Details of the reason for this are not necessarily evident, but it is thought that since each of the ethylene-vinyl acetate copolymer, the acrylic resin, the styrene polymer and the terpene phenol resin is an adhesive resin having high adhesion with the acid-modified polyolefin that forms the sealant layer 4 and the metal that forms the metal layer 3, such gentle unsealing can be performed. Further, when the first sealant layer 4a contains at least one selected from the group consisting of an ethylene-vinyl acetate copolymer, an acrylic resin, a styrene polymer and a terpene phenol resin, the sealing strength when the sealant layers 4 are heat-sealed with each other is increased, and the lamination strength between the metal layer 3 and the sealant layer 4 is increased. The reason for this is not necessarily evident, but it is thought that since as described above, each of these resins is an adhesive resin having high adhesion with the acid-modified polyolefin that forms the sealant layer 4 and the metal that forms the metal layer 3, the sealing strength and the lamination strength are increased.

The ethylene-vinyl acetate copolymer may be an acid-modified ethylene-vinyl acetate copolymer that is acid-modified with a carboxylic acid or the like. The acrylic resin is not particularly limited as long as it is obtained by homopolymerizing or copolymerizing an acrylic acid ester, a methacrylic acid ester, an acrylic acid, a methacrylic acid or the like. The styrene polymer may be a homopolymer of styrene, or may be a copolymer of styrene and a different monomer. The terpene phenol resin is not particularly limited as long as it is obtained by copolymerizing a terpene monomer with phenol. For each of the ethylene-vinyl acetate copolymer, the acrylic resin, the styrene polymer and the terpene phenol resin in the first sealant layer 4a, one kind thereof may be used alone, or two or more kinds thereof may be used in combination. The sum of the contents of the ethylene-vinyl acetate copolymer, the acrylic resin, the styrene polymer and the terpene phenol resin in the first sealant layer 4a is not particularly limited, but is preferably 5% by mass or more, more preferably 10 to 90% by mass, further preferably 15 to 85% by mass for ensuring that when the battery is heated, the delaminated part of the sealant layer 4 is formed into a bag shape (inner bag) to suitably keep the battery element hermetically sealed until the ambient temperature reaches a set temperature, and after the ambient temperature reaches the set temperature, the battery element is made unsealed under more gentle conditions, and for further increasing the above-mentioned sealing strength and lamination strength.

(Second Sealant Layer)

In the second aspect, the second sealant layer 4b may be the same as that in the first aspect described above. In the third aspect, it is preferred that the melting point $T_{m2}$ of the second sealant layer 4b and the melting point $T_{m1}$ of the first sealant layer 4a satisfy the following relationship:

$$T_{m2} \geq T_{m1}.$$

That is, the melting point $T_{m2}$ of the second sealant layer 4b is equal to or higher than the melting point $T_{m1}$ of the first sealant layer 4a, and thus as shown in, for example, the part B of each of FIGS. 3, 4, 7 and 8, the delaminated part of the sealant layer 4 is formed into a bag shape (inner bag), so that the battery element can be suitably kept hermetically sealed. When the ambient temperature reaches an unsealing temperature, then the battery packaging material quickly turns into the state shown in, for example, the part C of each of FIGS. 3, 4, 7 and 8, and fine cleavages such as pinholes are generated in the delaminated region of the sealant layer 4, so that the battery packaging material turns into an unsealed state under more gentle conditions. In this connection, it is further preferred that the melting point $T_{m2}$ of the second sealant layer 4b and the melting point $T_{m1}$ of the first sealant layer 4a satisfy the following relationship:

$$T_{m2} \geq T_{m1}+5.$$

The melting point $T_{m2}$ of the second sealant layer 4b and the softening point $T_{s2}$ of the second sealant layer 4b in the second aspect are each calculated in the same manner as described above.

The melting point $T_{m2}$ of the second sealant layer 4b is not particularly limited, but is preferably 100 to 160° C., more preferably 105 to 150° C., further preferably 110 to 140° C. for ensuring that when the battery is heated, the delaminated part of the sealant layer 4 is formed into a bag shape (inner bag) to suitably keep the battery element hermetically sealed until the ambient temperature reaches an unsealing temperature, and after the ambient temperature reaches the unsealing temperature, the battery element is made unsealed under more gentle conditions. The softening point $T_{s2}$ of the second sealant layer 4b is not particularly limited, but is preferably 60 to 150° C., more preferably 65 to 140° C., further preferably 70 to 120° C. for the same reason as described above.

(Third Sealant Layer Etc.)

In the third aspect, the third sealant layer 4c etc. may be the same as that in the first aspect described above.

F. Aspect in which an Insulating Layer is Provided Between the Metal Layer and the Sealant Layer

[Insulating Layer 6]

In the present invention, an insulating layer 6 may be provided between the metal layer 3 and the sealant layer 4 as shown in FIG. 9. As described later, a battery packaging material including the insulating layer 6 can also be used in a battery configured to ensure that when the battery is heated to a set temperature T° C. fixed between 100° C. and 160° C., the packaging material is not unsealed until the ambient temperature reaches the temperature T° C., and after the ambient temperature reaches the temperature T° C., the packaging material is quickly unsealed.

The insulating layer 6 is formed of a resin composition containing an acid-modified polyolefin resin and a curing agent. In the battery packaging material according to the present invention, the insulating layer 6 formed of such a specific resin composition is provided between the metal layer 3 and the sealant layer 4, and thus even when very small contaminants such as debris of an electrode active material and an electrode tab exist between the battery element and the sealant layer 4, the insulation quality and durability of the battery packaging material is improved.

The acid-modified polyolefin resin that forms the insulating layer 6 is not particularly limited, but is preferably at least one of an acid-modified polyolefin resin modified with an unsaturated carboxylic acid or an acid anhydride thereof, and an acid-modified polyolefin resin modified with an unsaturated carboxylic acid or an acid anhydride thereof and a (meth)acrylic acid ester. Here, the acid-modified polyolefin resin modified with an unsaturated carboxylic acid or an acid anhydride thereof is obtained by modifying a polyolefin resin with an unsaturated carboxylic acid or an acid anhydride thereof. The acid-modified polyolefin resin modified with an unsaturated carboxylic acid or an acid anhydride thereof and a (meth)acrylic acid ester is obtained by modifying a polyolefin resin using an unsaturated carboxylic acid or an acid anhydride thereof in combination with a (meth)acrylic acid ester.

The polyolefin resin to be modified is not particularly limited as long as it is a resin containing at least an olefin as a monomer unit. The polyolefin resin can be formed from, for example, at least one of a polyethylene-based resin and a polypropylene-based resin, and is preferably formed from a polypropylene-based resin. The polyethylene-based resin can be formed from, for example, at least one of homo-polyethylene and an ethylene copolymer. The polypropylene-based resin can be formed from, for example, at least one of homo-polypropylene and a propylene copolymer. Examples of the propylene copolymer include copolymers of propylene and other olefins, such as ethylene-propylene copolymers, propylene-butene copolymers and ethylene-propylene-butene copolymers. The ratio of propylene units contained in the polypropylene-based resin is preferably about 50 mol % to 100 mol %, more preferably about 80 mol % to 100 mol % for further improving the insulation quality and durability of the battery packaging material. The ratio of ethylene units contained in the polyethylene-based resin is preferably about 50 mol % to 100 mol %, more preferably about 80 mol % to 100 mol % for further improving the insulation quality and durability of the battery packaging material. The ethylene copolymer and the propylene copolymer may each be either a random copolymer or a block copolymer. The ethylene copolymer and the propylene copolymer may each be either crystalline or noncrystalline, or may each be a copolymer or mixture of the crystalline and noncrystalline copolymers. The polyolefin resin may be formed of one homopolymer or copolymer, or may be formed of two or more homopolymers or copolymers.

Examples of the unsaturated carboxylic acid include acrylic acid, methacrylic acid, maleic acid, itaconic acid, fumaric acid and crotonic acid. As the acid anhydride, acid anhydrides of the unsaturated carboxylic acids shown above as an example are preferred, and maleic anhydride and itaconic anhydride are more preferred. In modification of the polyolefin resin, only one unsaturated carboxylic acid may be used, or two or more unsaturated carboxylic acids may be used.

The (meth)acrylic acid ester is, for example, an esterified product of (meth)acrylic acid and an alcohol with a carbon number of 1 to 30, preferably an esterified product of (meth)acrylic acid and an alcohol with a carbon number of 1 to 20. Specific examples of the (meth)acrylic acid ester include methyl (meth)acrylate, ethyl (meth)acrylate, propyl (meth)acrylate, butyl (meth)acrylate, hexyl (meth)acrylate, octyl (meth)acrylate, decyl (meth)acrylate, lauryl (meth) acrylate, octyl (meth)acrylate, dodecyl (meth)acrylate and stearyl (meth)acrylate. In modification of the polyolefin resin, only one (meth)acrylic acid ester may be used, or two or more (meth)acrylic acid esters may be used.

The ratio of the unsaturated carboxylic acid or an acid anhydride thereof in the acid-modified polyolefin resin is preferably about 0.1% by mass to 30% by mass, more preferably about 0.1% by mass to 20% by mass. When the ratio of the unsaturated carboxylic acid or an acid anhydride thereof in the acid-modified polyolefin resin falls within the above-mentioned range, the insulation quality and durability of the battery packaging material can be improved.

The ratio of the (meth)acrylic acid ester in the acid-modified polyolefin resin is preferably about 0.1% by mass to 40% by mass, more preferably about 0.1% by mass to 30% by mass. When the ratio of the (meth)acrylic acid ester in the acid-modified polyolefin resin falls within the above-mentioned range, the insulation quality and durability of the battery packaging material can be improved.

The weight average molecular weight of the acid-modified polyolefin resin is preferably about 6000 to 200000, more preferably about 8000 to 150000. When the weight average molecular weight of the acid-modified polyolefin resin falls within the above-mentioned range, affinity of the insulating layer 6 to the metal layer 3 and the sealant layer 4 can be stabilized, and therefore adhesion between the metal layer 3 and the sealant layer 4 can be stabilized over a long period of time. Further, heat resistance can be improved, so that the insulation quality and durability of the battery packaging material can be further improved. The weight average molecular weight of the acid-modified polyolefin resin is a value obtained by performing measurement by gel permeation chromatography (GPC) under the condition of using polystyrene as a standard sample.

For the acid-modified polyolefin resin, the method for modifying a polyolefin resin is not particularly limited, and for example, an unsaturated carboxylic acid or an acid anhydride thereof, or a (meth)acrylic acid ester may be copolymerized with a polyolefin resin. Copolymerization in this case is random copolymerization, block copolymerization, graft copolymerization (graft modification) or the like, with graft copolymerization being preferred.

The curing agent is not particularly limited as long as it cures the acid-modified polyolefin resin. Examples of the curing agent include those that are shown as an example for the adhesive layer 5 described later.

The curing agent may be formed of two or more compounds for increasing the mechanical strength of the insulating layer 6, etc.

In the resin composition, the content of the curing agent is preferably in a range of 0.1 part by mass to 50 parts by mass, more preferably in a range of 0.1 part by mass to 30 parts by mass based on 100 parts by mass of the acid-modified polyolefin resin. In the resin composition, the content of the curing agent is preferably in a range of 1 equivalent to 30 equivalents, more preferably in a range of 1 equivalent to 20 equivalents in terms of a reactive group in the curing agent based on 1 equivalent of carboxyl groups in the acid-modified polyolefin resin. Accordingly, the insulation quality and durability of the battery packaging material can be improved.

By adding an olefin-based rubber-like additive or a hydrocarbon-based wax to the insulating layer 6, higher flexibility can be imparted to the insulating layer 6 to suppress collapse in case of catching contaminants due to stress distribution during compression and to prevent generation of fine cracks during stretching. Examples of the olefin-based rubber-like additive include α-olefin copolymers such as TAFMER P, TAFMER A, TAFMER H, TAFMER XM, TAFMER BL and TAFMER PN from Mitsui Chemicals, Inc, Incorporated and TAFTHREN from Sumitomo Chemical Company, Limited. Examples of the hydrocarbon-based wax include paraffins.

In the production process of batteries, very small contaminants such as debris of an electrode active material and an electrode tab may stick to the surface of the sealant layer, and accordingly thin parts and through-holes may be generated in the sealant layer, leading to deterioration of insulating quality. On the other hand, the battery packaging material according to the present invention is provided with the insulating layer 6 which is formed of a resin composition containing an acid-modified polyolefin resin and a curing agent as described above and which exhibits high heat resistance and mechanical strength at the time of application of heat during heat-sealing, and has high flexibility, so that generation of fine cracks due to stress associated with bending or the like can be suppressed. Therefore, even when fine cracks that are easily generated at thin parts, through-holes that are generated by contaminants etc., voids resulting from foaming of the sealant layer 4 which occurs in the case where the sealant layer 4 is heat-sealed while catching an electrolytic solution, or the like are formed in the sealant layer 4, the electrolytic solution can be prevented from coming into direct contact with the metal layer by the insulating layer 6, so that the metal layer 3 is protected. Even when the sealant layer 4 catches contaminants etc., deterioration of the insulation quality of the battery packaging material by contaminants can be prevented by the insulating layer 6 having high heat resistance and high mechanical strength and flexibility.

The insulating layer 6 is formed of a resin composition containing an acid-modified polyolefin resin and a curing agent, and also is configured to satisfy the relationship of the following formula (1).

$$-10 \leq T_A - T \leq -5 \tag{1}$$

T: set temperature (° C.) fixed between 100° C. and 160° C.

$T_A$: melting point (° C.) of insulating layer

In this way, the melting point $T_A$ of the insulating layer 6 is set to a value lower than the set temperature T in a predetermined range, whereby when the battery is exposed to a high temperature before the ambient temperature reaches the set temperature T° C., the insulating layer 6 turns into a molten state, so that at least a part of the insulating layer 6 can be delaminated from the interface between the metal layer 3 and the insulating layer 6. At least a part of the insulating layer 6 which is delaminated from the metal layer 3 is extended under internal pressure together with the sealant layer 4 described later, and swollen while a hermetically sealed state is maintained, and thereafter fine cleavages (pinholes etc.) are generated in the swollen insulating layer 6 and sealant layer 4 in 30 minutes or less after the ambient temperature reaches the temperature T° C., so that a gas in the battery can be gently released. The temperature T is preferably a temperature (° C.) fixed between 140° C. and 160° C.

The melting point $T_A$ of the insulating layer 6 is a value calculated in the same manner as in the case of the melting point $T_{m1}$ of the first sealant layer 4a described above.

The melting point of the resin depends on a molecular weight, a constituent monomer type and ratio, and so on, and therefore the molecular weight, the constituent monomer type and ratio, and so on of an acid-modified polyolefin resin to be blended in the insulating layer 6 are appropriately set so as to satisfy the range of the melting point of the insulating layer 6.

The thickness of the insulating layer 6 may be, for example, about 0.1 μm to 20 μm, preferably about 0.5 μm to 15 μm while it is not particularly limited as long as it is a thickness suitable for the battery packaging material. The battery packaging material according to the present invention is molded into various shapes in conformity to the shape of the battery, and therefore required to have a certain degree of flexibility. When in the battery packaging material, the thickness of the insulating layer 6 falls within the above-mentioned range, insulation quality and durability can be further improved while the flexibility of the battery packaging material is retained.

The insulating layer 6 may have a multilayer structure having two or more layers. Hereby, insulation quality can be maintained by second and third insulating layers even when thin parts and through-holes are formed in the first insulating layer as well as the sealant layer 4.

[Sealant Layer where Insulating Layer is Present]

When the battery packaging material according to the present invention includes the insulating layer 6, the sealant layer 4 includes a first sealant layer 4a containing a polyolefin resin. The sealant layer 4 may be formed of a plurality of layers, and as necessary, the sealant layer 4 may include, in order from the first sealant layer 4a side toward the metal layer 3 side, a second sealant layer 4b containing at least one of an acid-modified polyolefin resin and a polyolefin resin, a third sealant layer 4c containing at least one of an acid-modified polyolefin resin and a polyolefin resin, etc. When the sealant layer 4 is formed of a plurality of layers, it has a layer structure in which the first sealant layer 4a containing a polyolefin resin is situated at the innermost layer of the battery packaging material at the time of assembling a battery.

(First Sealant Layer)

The first sealant layer 4a is a layer containing a polyolefin resin and situated at the innermost layer of the battery packaging material. The polyolefin resin to be used for formation of the first sealant layer 4a is not particularly limited as long as the above-mentioned melting point is satisfied, and examples thereof include those shown above as an example.

The first sealant layer 4a may be formed of only a polyolefin resin, or may contain a resin other than the polyolefin resin as necessary. When a resin other than a polyolefin resin is included in the first sealant layer 4a, the content of the polyolefin in the first sealant layer 4a is, for example, 10 to 95% by mass, preferably 30 to 90% by mass, further preferably 50 to 80% by mass while it is not particularly limited as long as the effect of the present invention is not hindered.

Examples of the resin that can be included as necessary in addition to a polyolefin resin in the first sealant layer 4a include acid-modified polyolefin resins. Examples of the acid-modified polyolefin resin include those shown above as an example. Examples of the unsaturated carboxylic acid or acid anhydride thereof to be used for modification include those shown above as an example.

When a resin other than a polyolefin resin is included in the first sealant layer 4a, the content of the resin is appropriately set within the range of not hindering the purpose of the present invention. For example, when an acid-modified polyolefin resin is included in the first sealant layer 4a, the content of the acid-modified polyolefin resin in the first sealant layer 4a is normally 5 to 60% by mass, preferably 10 to 50% by mass, further preferably 20 to 40% by mass.

The first sealant layer 4a contains a polyolefin resin, and also is configured to satisfy the following formula (2).

$$-5 \leq T_{m1} - T \leq 5 \tag{2}$$

T: set temperature (° C.) fixed between 100° C. and 160° C.

$T_{m1}$: melting point (° C.) of first sealant layer

In this way, the melting point $T_{m1}$ of the first sealant layer 4a is set to a temperature equal to or higher than the melting point $T_A$ of the insulating layer 6 and set to a temperature within ±5° C. from the set temperature T, whereby even when before the ambient temperature reaches the set temperature T° C., the battery is exposed to a high temperature, and thus at least a part of the insulating layer 6 is delaminated from the interface between the metal layer 3 and the insulating layer 6, so that the insulating layer 6 and the sealant layer 4 are swollen in a hermetically sealed state, occurrence of rapid unsealing due to cohesive fracture resulting from progress of cracking in the insulating layer 6 and the sealant layer 4 is suppressed, and fine cleavages (pinholes etc.) are generated, so that after the ambient temperature reaches the temperature T° C., a gas in the battery can be quickly and gently released. When the melting point $T_{m1}$ of the first sealant layer 4a is set to a temperature higher than the set temperature T by more than 5° C., there is the tendency that it becomes difficult to perform heat-sealing satisfactorily, so that the sealing strength varies, or the sealant layer 4 cannot be quickly unsealed although the ambient temperature reaches the set temperature T° C.

The method for calculating the melting point $T_{m1}$ of the first sealant layer 4a is the same as the method for calculating the melting point $T_A$ of the insulating layer 6.

The melting point of the resin depends on a molecular weight, a constituent monomer type and ratio, and so on, and therefore the molecular weight, the constituent monomer type and ratio, and so on of each of a polyolefin resin to be blended in the first sealant layer 4a and a different resin to be blended in the first sealant layer 4a as necessary are appropriately set so as to satisfy the range of the melting point of the first sealant layer 4a.

The thickness of the first sealant layer 4a is, for example, 5 to 40 μm, preferably 10 to 35 μm, further preferably 15 to 30 μm.

(Relationship Between Melting Points of Insulating Layer and First Sealant Layer)

The insulating layer 6 and the first sealant layer 4a satisfy the above-mentioned melting points, respectively, and resultantly satisfy the relationship of $0 \leq (T_{m1} - T_A) \leq 15$.

(Second Sealant Layer)

The second sealant layer 4b is a layer which is provided between the first sealant layer 4a and the insulating layer 6 as necessary when the sealant layer 4 is formed of a plurality of layers. The second sealant layer 4b contains at least one of a polyolefin resin and an acid-modified polyolefin. Examples of the polyolefin resin and the acid-modified polyolefin to be used for formation of the second sealant layer include polyolefin resins and acid-modified polyolefin resins that are the same as those of the first sealant layer 4a, respectively.

The second sealant layer 4b may be formed of only one of an acid-modified polyolefin resin and a polyolefin resin, or may contain a different resin as necessary as long as the above-mentioned melting point is secured. When the second sealant layer 4b contains an acid-modified polyolefin, the content of the acid-modified polyolefin resin in the second sealant layer 4b is, for example, 5 to 95% by mass, preferably 10 to 90% by mass, further preferably 20 to 80% by mass while it is not particularly limited as long as the effect of the present invention is not hindered. When the second sealant layer 4b contains a polyolefin resin, the content of the polyolefin resin in the second sealant layer 4b is, for example, 5 to 95% by mass, preferably 10 to 90% by mass, further preferably 20 to 80% by mass while it is not particularly limited as long as the effect of the present invention is not hindered.

The second sealant layer 4b is configured to satisfy the following formula (3).

$$5 \leq T_{m2} - T \leq 10 \quad (3)$$

T: set temperature (° C.) fixed between 100° C. and 160° C.

$T_{m2}$: melting point (° C.) of second sealant layer

In this way, the melting point $T_{m2}$ of the second sealant layer is set to a temperature equal to or higher than the melting point $T_A$ of the insulating layer and set to a temperature higher than the set temperature T by 5° C. to 10° C., whereby even when before the ambient temperature reaches the set temperature T° C., the battery is exposed to a high temperature, and thus the insulating layer 6 turns into a molten state, so that at least a part of the insulating layer 6 is delaminated from the interface between the metal layer 3 and the insulating layer 6, the second sealant layer 4b functions to maintain a hermetically sealed state while being swollen under internal pressure, and after the ambient temperature reaches the set temperature T° C., fine cleavages (pinholes etc.) are quickly generated, so that a gas in the battery can be gently released. Further, since the melting point $T_{m2}$ of the second sealant layer 4b is set to a temperature which is equal to or higher than the melting point $T_A$ of the insulating layer 6 and which is equal to or higher than the melting point $T_{m1}$ of the first sealant layer, excellent insulation quality can be imparted to the battery packaging material even when the battery packaging material is heated to the set temperature T° C.

The method for calculating the melting point $T_{m2}$ of the second sealant layer 4b is the same as the method for calculating the melting point $T_A$ of the insulating layer 6.

The melting point of the resin depends on a molecular weight, a constituent monomer type and ratio, and so on, and therefore the molecular weight, the constituent monomer type and ratio, and so on of each of a an acid-modified polyolefin to be blended in the second sealant layer 4b and a different resin to be blended in the second sealant layer 4b as necessary are appropriately set so as to satisfy the range of the melting point of the second sealant layer 4b.

The thickness of the second sealant layer 4b is, for example, 5 to 40 µm, preferably 10 to 35 µm, further preferably 15 to 30 µm.

(Relationship Between Melting Points of Insulating Layer and Second Sealant Layer)

The insulating layer 6 and the second sealant layer 4b satisfy the above-mentioned melting points, respectively, and resultantly satisfy the relationship of $$10 \leq (T_{m2} - T_A) \leq 20.$$

(Third Sealant Layer)

The third sealant layer 4c is a layer which is provided between the second sealant layer 4b and the insulating layer 6 as necessary when the sealant layer 4 is formed of a plurality of layers. The third sealant layer 4c is formed of the same resin as that of the second sealant layer 4b. The melting point, thickness and the like of the third sealant layer 4c may be the same as the melting point, thickness and the like of the second sealant layer 4b.

(Thickness of Sealant Layer 4 where Insulating Layer is Present)

The thickness of the sealant layer 4 where the insulating layer 6 is present is determined on the basis of the thickness of each of the first sealant layer 4a, and the second sealant layer, the third sealant layer etc. provided as necessary, and is, for example, 15 to 120 µm, preferably 60 to 80 µm, further preferably 30 to 60 µm.

[Adhesive Layer 5]

In the battery packaging material according to the present invention, an adhesive layer 5 may be further provided between the metal layer 3 and the sealant layer 4 as shown in FIG. 2 for the purpose of, for example, strongly bonding the metal layer 3 and the sealant layer 4. The adhesive layer 5 may be formed of one layer, or may be formed of a plurality of layers.

The adhesive layer 5 is formed from a resin capable of bonding the metal layer 3 and the sealant layer 4. The resin that forms the adhesive layer 5 is not particularly limited as long as it is capable of bonding the metal layer 3 and the sealant layer 4, and examples of the preferred resin include the above-mentioned acid-modified polyolefin, polyester resins, fluorine-based resins, polyether-based resins, polyurethane-based resins, epoxy-based resins, phenol resin-based resins, polyamide-based resins, polyolefin-based resins, polyvinyl acetate-based resins, cellulose-based resins, (meth)acryl-based resins, polyimide-based resins, amino resins, rubbers and silicon-based resins. The resins that form the adhesive layer 5 may be used alone, or may be used in combination of two or more thereof.

The adhesive layer 5 may be formed of only at least one of these resins, or may contain a resin component other than these resins as necessary. When a resin component other than these resins is included in the adhesive layer 5, the content of the acid-modified polyolefin, polyester resin, fluorine-based resin, polyether-based resin, polyurethane-based resin, epoxy-based resin, phenol resin-based resin, polyamide-based resin, polyolefin-based resin, polyvinyl acetate-based resin, cellulose-based resin, (meth)acryl-based resin, polyimide-based resin, amino resin, rubber and silicon-based resin in the sealant layer 4 is, for example, 10 to 95% by mass, preferably 30 to 90% by mass, further preferably 50 to 80% by mass while it is not particularly limited as long as the effect of the present invention is not hindered.

Preferably, the adhesive layer 5 further contains a curing agent. When the adhesive layer 5 contains a curing agent, the mechanical strength of the adhesive layer 5 is increased, so that the insulation quality of the battery packaging material can be effectively improved. The curing agents may be used alone, or may be used in combination of two or more thereof.

The curing agent is not particularly limited as long as it cures an acid-modified polyolefin, a polyester resin, a fluorine-based resin, a polyether-based resin, a polyurethane-based resin, an epoxy-based resin, a phenol resin-based resin, a polyamide-based resin, a polyolefin-based resin, a polyvinyl acetate-based resin, a cellulose-based resin, a (meth)acryl-based resin, a polyimide-based resin, an amino resin, a rubber or a silicon-based resin. Examples of the curing agent include polyfunctional isocyanate compounds, carbodiimide compounds, epoxy compounds and oxazoline compounds.

The polyfunctional isocyanate compound is not particularly limited as long as it is a compound having two or more isocyanate groups. Specific examples of the polyfunctional isocyanate compound include isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymers of these compounds with other polymers.

The carbodiimide compound is not particularly limited as long as it is a compound having at least one carbodiimide group (—N=C=N—). The carbodiimide compound is preferably a polycarbodiimide compound having at least two carbodiimide groups. Specific examples of the particularly preferred carbodiimide compound include polycarbodiimide compounds having a repeating unit represented by the following general formula (5):

[Chemical Formula 5]

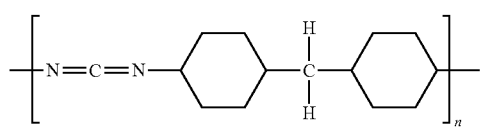

[in the general formula (5), n is an integer of 2 or greater];
polycarbodiimide compounds having a repeating unit represented by the following general formula (6):

[Chemical Formula 6]

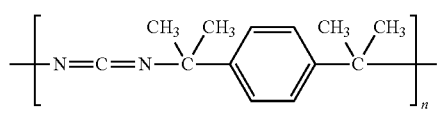

[in the general formula (6), n is an integer of 2 or greater]; and
polycarbodiimide compounds represented by the following general formula (7):

[Chemical Formula 7]

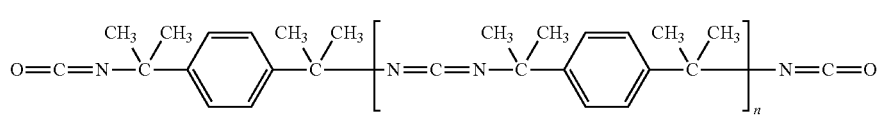

[in the general formula (7), n is an integer of 2 or greater]. In the general formulae (4) to (7), n is normally an integer of 30 or smaller, preferably an integer of 3 to 20.

The epoxy compound is not particularly limited as long as it is a compound having at least one epoxy group. Examples of the epoxy compound include epoxy resins such as bisphenol A diglycidyl ether, modified bisphenol A diglycidyl ether, novolak glycidyl ether, glycerin polyglycidyl ether and polyglycerin polyglycidyl ether.

The oxazoline compound is not particularly limited as long as it is a compound having an oxazoline backbone. Specific examples of the oxazoline compound include EPOCROS Series from Nippon Shokubai Co., Ltd.

The curing agent may be formed of two or more compounds for increasing the mechanical strength of the adhesive layer 5, etc.

In the adhesive layer 5, the content of the curing agent is preferably in a range of 0.1 part by mass to 50 parts by mass, more preferably in a range of 0.1 part by mass to 30 parts by mass based on 100 parts by mass of the acid-modified polyolefin, polyester resin, fluorine-based resin, polyether-based resin, polyurethane-based resin, epoxy-based resin, phenol resin-based resin, polyamide-based resin, polyolefin-based resin, polyvinyl acetate-based resin, cellulose-based resin, (meth)acryl-based resin, polyimide-based resin, amino resin, rubber or silicon-based resin. In the adhesive layer 5, the content of the curing agent is preferably in a range of 1 equivalent to 30 equivalents, more preferably in a range of 1 equivalent to 20 equivalents in terms of a reactive group in the curing agent based on 1 equivalent of carboxyl groups in the resins such as an acid-modified polyolefin resin. Accordingly, the insulation quality and durability of the battery packaging material can be improved.

When the adhesive layer 5 contains a curing agent, the adhesive layer 5 may be formed of a two-liquid curable adhesive resin, or may be formed of a one-liquid curable adhesive resin. Further, the adhesion mechanism of the adhesive is not particularly limited, and may be any one of a chemical reaction type, a solvent volatilization type, a heat melting type, a heat pressing type, an electron beam curing type such as that of UV or EB, and so on.

The melting point $T_{m2}$ of the adhesive layer 5 is preferably 90 to 245° C., more preferably 100 to 230° C. for more effectively exhibiting the sealing property and unsealing property of the battery packaging material according to the present invention. The softening point $T_{s2}$ of the adhesive layer 5 is preferably 70 to 180° C., more preferably 80 to 150° C. for the same reason as described above.

The method for calculating the melting point and softening point $T_{s2}$ of the adhesive layer 5 is the same as the method for calculating the melting point and the softening point of the sealant layer 4.

The thickness of the adhesive layer 5 is not particularly limited, but is preferably 0.01 µm or more, more preferably 0.05 to 20 µm. When the thickness of the adhesive layer 5 is less than 0.01 µm, it may be difficult to stably bond the metal layer 3 and the sealant layer 4 to each other.

4. Method for Producing Battery Packaging Material

While the method for producing a battery packaging material according to the present invention is not particularly limited as long as a laminate in which layers each having a predetermined composition are laminated is obtained, for example the following method is shown as an example.

First, a laminate with the base material layer 1, the adhesive layer 2 as necessary, and the metal layer 3 laminated in this order (hereinafter, the laminate may be described as a "laminate A") is formed. Specifically, the laminate A, when it has the adhesive layer 2, is formed by laminating the base material layer 1, the adhesive layer 2, and the metal layer 3 with the surface subjected to a chemical conversion treatment as necessary using a thermal lamination method, a sand lamination method, a dry lamination method, a melt extrusion method, a co-extrusion method, a combination thereof or the like. By performing an aging treatment, a hydration treatment, a heating treatment, an electron beam treatment, an ultraviolet treatment or the like in formation of the laminate A, stability of bonding of the base material layer 1 and the metal layer 3 by the adhesive layer 2 can be improved. Examples of the method for forming the laminate A by laminating the base material layer 1 directly on the metal layer 3 include methods in which lamination is performed using a thermal lamination method, a solution coating method, a melt extrusion method, a co-extrusion method, a combination thereof, or the like. Here, by performing an aging treatment, a hydration treatment, a heating treatment, an electron beam treatment, an ultraviolet treatment or the like, stability of bonding of the base material layer 1 and the metal layer 3 can be improved.

For example, formation of the laminate A by a dry lamination method can be performed in the following manner: a resin that forms the adhesive layer 2 is dissolved or dispersed in water or an organic solvent, the top of the base material layer 1 is coated with the resulting solution or dispersion, water or the organic solvent is dried to form the adhesive layer 2 on the base material layer 1, and the metal layer 3 is then heated and press-bonded.

For example, formation of the laminate A by a thermal lamination method can be performed in the following manner: a multilayer film in which the base material layer 1 and the adhesive layer 2 are laminated is provided beforehand, the metal layer 3 is superimposed on the adhesive layer 2, and thermal press-bonding is performed using a heating roll while the adhesive layer 2 is held between the base material layer 1 and the metal layer 3. Formation of the laminate A by a thermal lamination method may also be performed in the following manner: a multilayer film in which the metal layer 3 and the adhesive layer 2 are laminated is provided beforehand, the base material layer 1 is superimposed on the heated metal layer 3 and adhesive layer 2, and thermal press-bonding is performed while the adhesive layer 2 is held between the base material layer 1 and the metal layer 3.

The multilayer film which is provided beforehand in the thermal lamination method and in which the base material layer 1 and the adhesive layer 2 are laminated is formed in the following manner: an adhesive that forms the adhesive layer 2 is laminated by melt extrusion or solution coating (liquid coating) on a resin film that forms the base material layer 1, and dried, and baking is then performed at a temperature equal to or higher than the melting point of the adhesive that forms the adhesive layer 2. By performing baking, bonding strength between the metal layer 3 and the adhesive layer 2 is increased. The multilayer film which is provided beforehand in the thermal lamination method and in which the metal layer 3 and the adhesive layer 2 are laminated is similarly formed in the following manner: an adhesive that forms the adhesive layer 2 is laminated by melt extrusion or solution coating on a metal foil that forms the metal layer 3, and dried, and baking is then performed at a temperature equal to or higher than the melting point of the adhesive that forms the adhesive layer 2.

For example, formation of the laminate A by a sand lamination method can be performed in the following manner: an adhesive that forms the adhesive layer 2 is melt-extruded onto the upper surface of the metal layer 3, so that a resin film that forms the base material layer 1 is bonded to the metal layer. Here, it is desirable that the resin film be bonded to perform temporary bonding, and then heated again to perform main bonding. In the sand lamination method, the adhesive layer 2 may be made multilayered with different types of resins. In this case, the laminate may be formed in the following manner: a multilayer film in which the base material layer 1 and the adhesive layer 2 are laminated is provided beforehand, and an adhesive that forms the adhesive layer 2 is melt-extruded onto the upper surface of the metal layer 3, and laminated to the multilayer resin film by a thermal lamination method. Accordingly, the adhesive layer 2 that forms the multilayer film and the adhesive layer 2 laminated on the upper surface of the metal layer 3 are bonded together to form the two-layer adhesive layer 2. When the adhesive layer 2 is made multilayered with different types of resins, the laminate may be formed in the following manner: a multilayer film in which the metal layer 3 and the adhesive layer 2 are laminated is provided beforehand, an adhesive that forms the adhesive layer 2 is melt-extruded onto the base material layer 1, and this is laminated to the adhesive layer 2 on the metal layer 3. Accordingly, the adhesive layer 2 formed of two different adhesives is formed between the multilayer resin film and the base material layer 1.

Then, the sealant layer 4 is laminated on the metal layer 3 of the laminate A. The sealant layer 4 can be laminated on the metal layer 3 of the laminate A by a co-extrusion method, a thermal lamination method, a sand lamination method, a coating method, a combination thereof or the like. For example, when the adhesive layer 5 is not provided, the sealant layer 4 can be formed on the metal layer 3 using a melt extrusion method, a thermal lamination method, a coating method or the like. When the adhesive layer 5 is provided, the adhesive layer 5 can be formed on the metal layer 3 using a melt extrusion method, a thermal lamination method, a coating method or the like, followed by forming the sealant layer 4 by a similar method. A co-extrusion method may be carried out in which the adhesive layer 5 and the sealant layer 4 are simultaneously melt-extruded onto the metal layer 3. A sand lamination method may also be carried out in which the adhesive layer 5 is melt-extruded onto the metal layer 3, and the film-shaped sealant layer 4 is bonded thereto. When the sealant layer 4 is formed of two layers, for example, there is a method in which the adhesive layer 5 and one of the sealant layers 4 are co-extruded onto the metal layer 3, and the other one of the sealant layers 4 is then bonded thereto by a thermal lamination method. There is also a method in which the adhesive layer 5 and one of the sealant layers 4 are co-extruded onto the metal layer 3, and the other one of the film-shaped sealant layers 4 is bonded thereto. When the sealant layer 4 is made to have three or more layers, the sealant layer 4 can be formed using additionally a melt extrusion method, a thermal lamination method, a coating method or the like.

A laminate including the base material layer 1, the adhesive layer 2 formed as necessary, the metal layer 3, the surface of which is subjected to a chemical conversion treatment as necessary, the adhesive layer 5 formed as necessary and the sealant layer 4 in this order is formed in the manner described above. The laminate may be further subjected to a heating treatment by heat roll contact, hot air, application of near- or far-infrared rays, dielectric heating, thermal resistance heating or the like for enhancing the adhesion of the adhesive layer 2. As conditions for such a heating treatment, for example, the temperature is 150 to 250° C., and the time is 1 to 10 hours.

In the battery packaging material according to the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

When the battery element is packaged using the battery packaging material according to the present invention, two battery packaging materials used may be the same, or may be different. When the battery element is packaged using two different battery packaging materials, specific examples of the laminated structure of each battery packaging material include the following structures. One battery packaging material: base material layer 1 (nylon layer)/adhesive layer 2 (two-liquid curable polyester resin layer)/metal layer 3 (aluminum foil layer)/adhesive layer 5 (acid-modified polypropylene layer)/sealant layer 4 (polypropylene layer), and the other battery packaging material: base material layer 1 (acryl-urethane-coated layer)/metal layer 3 (stainless steel layer)/adhesive layer 5 (fluorine-based resin layer)/sealant layer 4 (polypropylene).

5. Characteristics and Use of Battery Packaging Material

The battery packaging material according to the present invention ensures that a battery element can be kept hermetically sealed until the pressure or temperature in a battery increases to a certain level, and at the time when the battery turns into a state in which the pressure or temperature in the battery persistently increases, the battery can be quickly and gently unsealed to suppress excessive expansion of the battery packaging material, uncontrollable battery reaction, firing and the like. Particularly, in the battery packaging material according to the present invention, when before the pressure or temperature in the battery increases to a certain level, the battery packaging material delaminates at least at a part of the interface between the metal layer 3 and the outside surface of the sealant layer 4, and an inner bag is formed at the delaminated part, and thereafter the inner bag is cleaved to unseal the packaging material, the battery packaging material can be more gently unsealed, so that excessive expansion of the battery packaging material, uncontrollable battery reaction, firing and the like can be more effectively suppressed. More specifically, for example, the battery packaging material according to the present invention can have characteristics in which when the battery packaging material is heated at a temperature rise rate of 5° C./min from room temperature (25° C.) at atmospheric pressure with a hermetically sealed space formed by heat-sealing the sealant layers 4 with each other, the packaging material is not unsealed until the ambient temperature reaches a certain temperature (set temperature T° C.) within a range of 100 to 160° C., and thereafter the packaging material is gently unsealed. For example, the battery packaging material according to the present invention can have characteristics in which the packaging material is not unsealed until the ambient temperature reaches the certain temperature under the heating conditions described below, and after the ambient temperature reaches the unsealing temperature, the packaging material is gently unsealed.

<Heating Conditions>

(1) A recess portion having a depth of 3 mm, a length of 35 mm and a width of 50 mm is formed at the central part of a battery packaging material cut to a shape having a length of 80 mm and a width of 150 mm, and the battery packaging material is molded so as to have an edge portion on the periphery of the recess portion.

(2) Edge portions are superimposed one on another in such a manner that the sealant layer 4 of the battery packaging material molded as described above and the sealant layer 4 of another unmolded battery packaging material face each other, and the edge portions are heat-sealed (at 175° C., surface pressure: 1.4 MPa, 3 seconds) to form the battery packaging material into a case shape having a hermetically sealed internal space (pressure: 1 atm).

(3) The battery packaging material formed into a case shape as described above is put in an oven at atmospheric pressure, and heated to a set temperature T° C. between 100° C. and 160° C. at a temperature rise rate of 5° C./minute, and after the ambient temperature reaches the set temperature T° C., the set temperature T° C. is maintained.

In the specific aspects shown in the above items A to F, the battery packaging material can have characteristics in which the packaging material is not unsealed until the ambient temperature reaches the certain temperature under the heating conditions described below, and after the ambient temperature reaches the unsealing temperature, the packaging material is gently unsealed. The set temperature to be fixed is set preferably between 140° C. and 160° C., and the set temperature varies depending on a type, a use, a safety standard or the like of the battery to be packaged. For example, depending on a safety standard, the set temperature T of some batteries is fixed to 140° C., and the set temperature T of other batteries is fixed to 160° C. The battery packaging material according to the present invention is provided as a packaging material having a sealing property and an unsealing property that are appropriate to the set temperature required by a battery to be applied. The time taken for making the battery packaging material unsealed after the ambient temperature reaches the temperature T° C. required in the battery is determined within the range of being able to secure safety, and varies depending on a type and use of the battery, a temperature rise rate, and the like, but is normally 60 minutes or less, further preferably 30 minutes or less, and the battery packaging material can satisfy the above-mentioned time.

<Heating Conditions>

(1) A recess portion having a depth of 3 mm, a length of 35 mm and a width of 50 mm is formed at the central part of a battery packaging material cut to a shape having a length of 80 mm and a width of 150 mm, and the battery packaging material is molded so as to have an edge portion on the periphery of the recess portion. Two battery packaging materials molded into such a shape are provided.

(2) Edge portions are superimposed one on another in such a manner that the sealant layers of the two battery packaging materials molded as described above face each other, and the edge portions are heat-sealed (at 175° C., 3 seconds, surface pressure: 1.4 MPa) to form the battery packaging material into a case shape having a hermetically sealed internal space (pressure: 1 atm).

(3) The battery packaging material formed into a case shape as described above is put in an oven that can be evacuated, the oven is set so that the pressure in the oven is 0 atm, the battery packaging material is heated to a set temperature T°

C. fixed between 100° C. and 160° C. at a temperature rise rate of 3° C./minute, and after the ambient temperature reaches the set temperature T° C., the set temperature T° C. is maintained.

In the first to third aspects in which the battery packaging material is unsealed at a low temperature, the heating temperature in the heating condition (3) is a temperature maintained until the battery packaging material is unsealed, and when the battery packaging material is not unsealed at the time when the ambient temperature reaches the temperature of, for example, 150° C., and a time until the battery packaging material is unsealed after the ambient temperature reaches the temperature of 150° C. is measured with the temperature of 150° C. being maintained. In this test, the upper limit of the heating temperature is not limited to 150° C., and after the battery packaging material is heated to an arbitrarily set unsealing temperature (e.g. a temperature between 100° C. and 160° C.), a time until the battery packaging material is unsealed after the ambient temperature reaches such a temperature may be measured to evaluate characteristics with this temperature being maintained.

In the battery packaging material according to the present invention, the lamination strength between the metal layer 3 and the sealant layer 4 at 25° C. is preferably 3 (N/15 mm) or more, more preferably 4 to 20 (N/15 mm) for more effectively exhibiting the sealing property and unsealing property of the battery packaging material according to the present invention. When the lamination strength at 25° C. is excessively low, the battery packaging material may be unsealed before the ambient temperature reaches the set temperature. The lamination strength between the metal layer 3 and the sealant layer 4 at 80° C. is preferably 2.5 (N/15 mm) or more, more preferably 3 to 20 (N/15 mm) for the same reason as described above. When the lamination strength at 80° C. is excessively low, the battery packaging material may be unsealed at a temperature below 80° C. Further, the lamination strength between the metal layer 3 and the sealant layer 4 at 125° C. is preferably 2.5 (N/15 mm) or less, more preferably 0.1 to 2.2 (N/15 mm) for the same reason as described above. When the lamination strength at 125° C. is excessively high, the battery packaging material is not quickly unsealed even when the set temperature is exceeded, and the battery packaging material is rapidly unsealed at the time when the temperature and the internal pressure become very high, so that an electrolytic solution and a battery element in the battery may run off.

In the battery packaging material according to the present invention, the sealing strength of a part that is heat-sealed with sealant layers 4 facing each other at 25° C. (heat-sealing conditions: 190° C., surface pressure 1.0 MPa, 3 seconds) is preferably 30 (N/15 mm) or more, more preferably 40 to 200 (N/15 mm) for the same reason as described above. When the sealing strength at 25° C. is excessively low, the battery packaging material may be unsealed before the ambient temperature reaches the set temperature. In the battery packaging material according to the present invention, the sealing strength of a part that is heat-sealed with sealant layers 4 facing each other at 125° C. (heat-sealing conditions: 190° C., surface pressure 1.0 MPa, 3 seconds) is preferably 20 (N/15 mm) or less, more preferably 5 to 16 (N/15 mm) for the same reason as described above. When the sealing strength at 125° C. is excessively high, the battery packaging material is not quickly unsealed even when the set temperature is exceeded, and the battery packaging material is rapidly unsealed at the time when the temperature and the internal pressure become very high, so that an electrolytic solution and a battery element in the battery may run off.

Further, in a bag-shaped packaging material obtained by performing heat-sealing (heat-sealing conditions: 190° C., surface pressure 1.0 MPa, 3 seconds) with sealant layers 4 facing each other in the battery packaging material according to the present invention, the lamination strength between the metal layer and the sealant layer after the battery packaging material is left standing at 85° C. for 24 hours with the bag-shaped packaging material containing an electrolytic solution in its internal space is preferably 0.1 (N/15 mm) or more, more preferably 0.2 (N/15 mm) or more at 85° C. for the same reason as described above. When the lamination strength where the battery packaging material is in contact with the electrolytic solution is excessively low, delamination may occur between the metal layer 3 and the sealant layer 4 due to heat generated during storage of the battery at a high temperature or in charge-discharge of the battery, resulting in insufficient strength of the battery packaging material.

The battery packaging material according to the present invention has the above-mentioned unsealing property, and is gently unsealed at the time of unsealing owing to fine cleavages. Thus, the battery packaging material according to the present invention can be suitably used as a packaging material in a battery configured to ensure that when the battery is heated to a set temperature T° C., the packaging material is not unsealed until the ambient temperature reaches the temperature T° C., and after the ambient temperature reaches the temperature T° C., the packaging material is quickly unsealed. The set temperature T to be fixed in the battery is set, for example, between 100° C. and 160° C., preferably between 120° C. and 150° C., and the set temperature varies depending on a type, a use, a safety standard or the like of the battery to be packaged. For example, depending on a safety standard, the set temperature T of some batteries is fixed to 100° C., and the set temperature T of other batteries is fixed to 160° C. The battery packaging material according to the present invention is provided as a packaging material having a sealing property and an unsealing property that are appropriate to the set temperature required by a battery to be applied. The time taken for making the battery packaging material unsealed after the ambient temperature reaches the temperature T° C. required in the battery is determined within the range of being able to secure safety, and varies depending on a type and use of the battery, a temperature rise rate, and the like, but is normally 60 minutes or less, further preferably 30 minutes or less, and the battery packaging material according to the present invention can satisfy the above-mentioned time.

The battery packaging material according to the present invention can be used for hermetically sealing and storing battery elements such as a positive electrode, a negative electrode and an electrolyte, and is provided with a space for storing the battery elements. The space is formed by, for example, press-molding a laminated sheet cut to a rectangular shape.

More specifically, a battery element including at least a positive electrode, a negative electrode and an electrolyte is covered with the battery packaging material according to the present invention such that a flange portion (region where sealant layers 4 are in contact with each other) can be formed on the periphery of the battery element while a metal terminal connected to each of the positive electrode and the negative electrode protrudes to outside, and sealant layers 4 at the flange portion are heat-sealed with each other to hermetically seal the battery element, thereby providing a battery using a battery packaging material. When the battery element is stored using the battery packaging material according to the present invention, the battery packaging material according to the present invention is used such that the sealant layer 4 is on the inner side (surface in contact with the battery element).

The battery packaging material according to the present invention may be used for either a primary battery or a secondary battery, but is preferably used for a secondary battery. The type of secondary battery to which the battery packaging material according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred objects to which the battery packaging material according to the present invention is applied include lithium ion batteries and lithium ion polymer batteries.

EXAMPLES

The present invention will be described in detail below by showing examples and comparative examples. It is to be noted that the present invention is not particularly limited to examples.

Examples 1 to 17 and Comparative Examples 1 to 4

Production of Battery Packaging Material

A metal layer 3 formed of an aluminum foil (thickness: 40 μm) subjected to a chemical conversion treatment at both surfaces was laminated on a base material layer 1 formed of a biaxially stretched nylon film (thickness: 25 μm) using a dry lamination method. Specifically, a two-liquid urethane adhesive (polyester-based main agent and isocyanate-based curing agent) was applied to one surface of the aluminum foil, so that an adhesive layer 2 (thickness: 4 μm) was formed on the metal layer 3. The adhesive layer 2 on the metal layer 3 and the base material layer 1 were then bonded to each other under pressure and heating, and an aging treatment was performed at 60° C. for 24 hours to prepare a laminate of base material layer 1/adhesive layer 2/metal layer 3. The chemical conversion treatment of the aluminum foil used as the metal layer 3 was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry weight), and performing baking for 20 seconds under such conditions that the film temperature was 180° C. or higher.

Then, a sealant layer 4 was laminated on the metal layer 3 in Examples 1 to 3, and an adhesive layer 5 and the sealant layer 4 were laminated on the metal layer 3 in Examples 4 to 17 using methods as described in Table 1, respectively. The configurations of the adhesive layer 5 and the sealant layer 4 are as shown in Table 1. For the melting points of the adhesive layer 5 and the sealant layer 4, values obtained by measuring a melting point of a resin by differential scanning calorimetry (DSC method) are shown. For the softening points of the adhesive layer 5 and the sealant layer 4, values obtained by measuring a softening point of a resin using a thermo-mechanical analysis (TMA) are shown. When resins were blended, the melting points and softening points of the resins were measured, and weighed and averaged based on a mass ratio to calculate the melting point and softening point of each layer. Thus, a battery packaging material including a laminate with a base material layer 1, an adhesive layer 2, a metal layer 3, an adhesive layer 5 (not present in Examples 1 to 3) and a sealant layer 4 laminated in this order was obtained.

[Evaluation of Sealing Property and Unsealing Property of Battery Packaging Material]

Each battery packaging material was cut to a size of 80 mm×150 mm, and then cold-molded to a depth of 3.0 mm at 0.4 MPa using a mold (female mold) having an opening size of 35 mm×50 mm and a mold (male mold) corresponding thereto, so that a recess portion was formed at the central part of the battery packaging material. A stainless plate of 32 mm×48 mm×3 mm was placed in the recess portion as a battery element in a simulated manner, and the recess portion was then filled with 3 g of an electrolytic solution (composed of a mixed liquid of 1 M LiPF$_6$ with ethylene carbonate, diethyl carbonate and dimethyl carbonate (volume ratio: 1:1:1). Next, another unmolded battery packaging material was placed on the top of the recess portion with the sealant layers facing each other, and the peripheral edge portion was heat-sealed to prepare a simulated battery. As conditions for heat-sealing, the temperature was 175° C., the surface pressure was 1.4 MPa, and the time was 3 seconds. The obtained simulated battery was put in an oven, and heated to 150° C. at a temperature rise rate of 5° C./minute from room temperature (25° C.) at atmospheric pressure. Further, the battery was held for 60 minutes after the ambient temperature reached the temperature of 150° C. Evaluation of the unsealing property of the simulated battery was performed by visually observing a temperature at which an inner bag was formed in the simulated battery, a temperature at which the inner bag was cleaved, and a time until the battery packaging material was unsealed after the ambient temperature reached the temperature of 150° C. in the case where the inner bag was not cleaved at the time when the ambient temperature reached the temperature of 150° C. A location where delamination occurred was visually observed. The temperature was measured using a thermocouple mounted on the outside of the simulated battery. The results are shown in Table 2.

[Measurement of Lamination Strength]

At each of the temperatures shown in Table 2, each of the above-mentioned cut battery packaging materials was delaminated at the interface between the metal layer and the sealant layer over a length of 10 mm at a speed of 50 mm/minute using a tensile tester (AGS-50D (trade name) manufactured by Shimadzu Corporation), and the maximum strength at the time of delamination was defined as a lamination strength.

[Determination of Electrolytic Solution Resistance]

Each battery packaging material was cut to a size of 80 mm×150 mm, and then cold-molded to a depth of 3.0 mm at 0.4 MPa using a mold (female mold) having an opening size of 35 mm×50 mm and a mold (male mold) corresponding thereto, so that a recess portion was formed at the central part of the battery packaging material. The recess portion was filled with 3 g of the electrolytic solution, and another battery packaging material was placed on the top of the recess portion with the sealant layers facing each other, and the peripheral edge portion was heat-sealed. As conditions for heat-sealing, the temperature was 190° C., the surface pressure was 1.0 MPa, and the time was 3 seconds. This was stored at 85° C. for 1 day, and then unsealed, and whether or not delamination occurred between the metal layer and the sealant layer was visually checked. The results are shown in Table 2.

[Measurement of Sealing Strength]

Battery packaging materials were placed one on another with the sealant layers facing each other, then heat-sealed at 190° C. and a surface pressure of 1.0 MPa for 3 seconds, and then left standing for 2 minutes at each of the temperatures shown in Table 2, the sealant layer at the heat-sealed part was then delaminated over a length of 10 mm at a speed of 30 mm/minute using a tensile tester (AGS-50D (trade name) manufactured by Shimadzu Corporation), and the maximum strength at the time of delamination was defined as a sealing strength. The results are shown in Table 2.

TABLE 1

| | Adhesive layer 5 | | | Sealant layer 4 | | |
|---|---|---|---|---|---|---|
| | Types of resins and thicknesses (μm) of layers | Melting points $Tm_2$ of layers (°C.) | Softening points $Ts_2$ of layers (°C.) | Types of resins and thicknesses (μm) of layers | Melting points $Tm_1$ of layers (°C.) | Softening points $Ts_1$ of layers (°C.) |
| Example 1 | — | — | — | Blend of acid-modified PP (A) and acid-modified PE (A) (60) | 126 | 86 |
| | A film-shaped sealant layer was bonded to a metal layer by a thermal lamination method, and a heating treatment was then performed at 190° C. for 5 seconds. | | | | | |
| Example 2 | — | — | — | Blend of fluorine-based resin (A) and acid-modified PE (A) (60) | 140 | 100 |
| | A film-shaped sealant layer was bonded to a metal layer by a thermal lamination method, and a heating treatment was then performed at 190° C. for 5 seconds. | | | | | |
| Example 3 | — | — | — | Blend of acid-modified polyester and acid-modified PE (A) (60) | 130 | 80 |
| | A film-shaped sealant layer was bonded to a metal layer by a thermal lamination method, and a heating treatment was then performed at 190° C. for 5 seconds. | | | | | |
| Example 4 | Acid-modified PP (B) (10) | 130 | 80 | PP (E) (5)/PP (F) (30)/PP (E) (5) | 140/160/140 | 70/90/70 |
| | An adhesive layer was formed on a metal layer by melt extrusion method and a film-shaped sealant layer was then laminated by a sand lamination method. Next, the obtained laminate was subjected to a heating treatment at 190° C. for 5 seconds. | | | | | |
| Example 5 | Blend of acid-modified PP (A) and acid-modified PE (A) (15) | 126 | 86 | PP (A) (15) | 160 | 110 |
| | An adhesive layer and a sealant layer were laminated on a metal layer by a melt co-extrusion method, and a heating treatment was then performed at 190° C. for 5 seconds. | | | | | |
| Example 6 | Blend of acid-modified PP (C) and acid-modified PE (B) (5) | 156 | 117 | Blend of PP (B) and LLDPE (35) | 126 | 86 |
| | An adhesive layer and a sealant layer were laminated on a metal layer by a melt co-extrusion method, and a heating treatment was then performed at 190° C. for 5 seconds. | | | | | |
| Example 7 | Blend of acid-modified PP (D) and acid-modified PE (A) (10) | 156 | 80 | PP (E) (10)/PP (F) (20) | 140/160 | 70/90 |
| | An adhesive layer and one of sealant layers (PP (E)) were laminated on a metal layer by a melt co-extrusion method, and the other one of the film-shaped sealant layers (PP (F)) was then laminated by a thermal lamination method. | | | | | |
| Example 8 | Blend of acid-modified PP (E) and acid-modified PE (C) (40) | 138 | 80 | PP (A) (5) | 160 | 110 |
| | An adhesive layer and a sealant layer were laminated on a metal layer by a melt co-extrusion method, and a heating treatment was then performed at 190° C. for 5 seconds. | | | | | |
| Example 9 | Blend of acid-modified PP (E) and acid-modified PE (D) (80) | 116 | 65 | PP (A) (5) | 163 | 90 |
| | An adhesive layer and a sealant layer were laminated on a metal layer by a melt co-extrusion method, and a heating treatment was then performed at 190° C. for 5 seconds. | | | | | |
| Example 10 | Blend or acid-modified PP (A) and acid-modified PE (A) (5)/PP (B) (10) | 126/140 | 86/90 | PP (E) (5)/PP (F) (20)/PP (E) (5) | 140/160/140 | 70/90/70 |
| | An adhesive layer was laminated on a metal layer by a melt extrusion method, and a film-shaped sealant layer was then laminated by a sand lamination method. Thereafter, a heating treatment was performed at 190° C. for 5 seconds. | | | | | |
| Example 11 | Acid-modified PP (F) (4) | 140 | 80 | PP (E) (5)/PP (F) (30)/PP (E) (5) | 140/160/140 | 70/90/70 |
| | An adhesive layer was applied onto a metal layer by a melt coating method, a solvent was dried, and a film-shaped sealant layer was then laminated by press bonding under heating. Thereafter, a heating treatment was performed at 60° C. for 3 days. | | | | | |

TABLE 1-continued

| | Adhesive layer 5 | | | Sealant layer 4 | | |
|---|---|---|---|---|---|---|
| | Types of resins and thicknesses (μm) of layers | Melting points $Tm_2$ of layers (°C.) | Softening points $Ts_2$ of layers (°C.) | Types of resins and thicknesses (μm) of layers | Melting points $Tm_1$ of layers (°C.) | Softening points $Ts_1$ of layers (°C.) |
| Example 12 | Acid-modified PP (G) (2) | 150 | 50 | Acid-modified PP (B) (10)/PP (A) (30) | 138/160 | 80/105 |
| | An adhesive layer was applied onto a metal layer by a melt coating method, a solvent was dried, and a sealant layer was then laminated by a melt co-extrusion method. Thereafter, a heating treatment was performed at 190° C. for 5 seconds. | | | | | |
| Example 13 | Acid-modified PP (G) (0.1) | 150 | 50 | Blend of PP (B) and LLDPE (60) | 126 | 86 |
| | An adhesive layer was laminated on a metal layer by a melt extrusion method, and a heating treatment was then performed at 190° C. for 5 seconds, Thereafter, a film-shaped sealant layer was laminated by press bonding under heating. | | | | | |
| Example 14 | Fluorine-based resin (B) (20 | 95 | 65 | Blend of PP (B) and LLDPE (30)/PP (A) (10) | 126/160 | 86/105 |
| | An adhesive layer was applied onto a metal layer by a melt coating method, a solvent was dried, and a film-shaped sealant layer was then laminated by press bonding under heating. Thereafter, a heating treatment was performed at 60° C. for 3 days. | | | | | |
| Example 15 | Modified polyester (10) | 220 | 50 | Acid-modified PP (B) (10)/PP (A) (30) | 138/160 | 80/105 |
| | An adhesive layer and a sealant layer were laminated on a metal layer by a melt co-extrusion method. | | | | | |
| Example 16 | Acid-modified cyclic polyolefin (20) | — | 80 | blend of PP (D) and LDPE (10)/PP (C) (25)/PP (E) (5) | 120/163/140 | 80/90/70 |
| | Films for an adhesive layer and a sealant layer, each provided beforehand, were laminated on a metal layer by a thermal lamination method. | | | | | |
| Example 17 | Two-liquid curable polyurethane-based resin (polyester-based polyol resin containing a tolylene diisocyanate (TDI)-based curing agent) | 85 | 65 | PP (E) (5)/PP (F) (20)/PP (E) (5) | 140/160/140 | 70/90/70 |
| | An adhesive layer was applied onto a metal layer by a melt coating method, a solvent was dried, and a film-shaped sealant layer was then laminated by press bonding under heating. Thereafter, a heating treatment was performed at 60° C. for 3 days. | | | | | |
| Comparative Example 1 | Acid-modified PP (C) (10) | 160 | 120 | PP (A) (40) | 160 | 110 |
| | An adhesive layer was formed on a metal layer by a melt co-extrusion method, and a sealant layer was then laminated by a thermal lamination method. Thereafter, a heating treatment was performed at 190° C. for 5 seconds. | | | | | |
| Comparative Example 2 | Acid-modified PE(B) (40) | 110 | 85 | Blend of PP (B) and LLDPE (20) | 126 | 86 |
| | An adhesive layer and a sealant layer were laminated on a metal layer by a melt co-extrusion method, and a heating treatment was then performed at 190° C. for 5 seconds. | | | | | |
| Comparative Example 3 | — | — | — | Acid-modified PP (C) (60) | 160 | 120 |
| | A film-shaped sealant layer was bonded to a metal layer by a thermal lamination method, and a heating treatment was then performed at 190° C. for 5 seconds. | | | | | |
| Comparative Example 4 | Acid-modified PP (B) (15) containing 15% by mass of styrene-based elastomer | 135 | 60 | PP (E) (40) containing 25% by mass of styrene-based elastomer | 120 | 55 |
| | Films for an adhesive layer and a sealant layer, each provided beforehand, were laminated on a metal layer by a thermal lamination method. | | | | | |

The resins shown in Table 1 are as listed below.

PP(A): random polypropylene (melting point: 160° C. and softening point: 110° C.)
PP(B): random polypropylene (melting point: 140° C. and softening point: 110° C.)
PP(C): block polypropylene (melting point: 163° C. and softening point: 90° C.)
PP(D): random polypropylene (melting point: 130° C. and softening point: 70° C.)
PP(E): random polypropylene (melting point: 140° C. and softening point: 70° C.)
PP(F): block polypropylene (melting point: 160° C. and softening point: 90° C.)
LLDPE: linear low-density polyethylene (melting point: 120° C. and softening point: 75° C.)
LDLE: low-density polyethylene (melting point: 110° C. and softening point: 90° C.)
Acid-modified PP(A): carboxylic acid-modified polypropylene (melting point: 140° C. and softening point: 110° C.)
Acid-modified PP(B): carboxylic acid-modified polypropylene (melting point: 140° C. and softening point: 80° C.)
Acid-modified PP(C): carboxylic acid-modified polypropylene (melting point: 160° C. and softening point: 120° C.)
Acid-modified PP(D): carboxylic acid-modified polypropylene (melting point: 160° C. and softening point: 80° C.)
Acid-modified PP(E): carboxylic acid-modified polypropylene (melting point: 140° C. and softening point: 120° C.)
Acid-modified PP(F): carboxylic acid-modified polypropylene cured with isocyanate
Acid-modified PP(G): carboxylic acid-modified polypropylene crosslinked with oxazoline and epoxy
Acid-modified PE(A): carboxylic acid-modified linear low-density polyethylene (melting point: 120° C. and softening point: 75° C.)
Acid-modified PE(B): carboxylic acid-modified low-density polyethylene (melting point: 110° C. and softening point: 85° C.)
Acid-modified PE(C): carboxylic acid-modified low-density polyethylene (melting point: 110° C. and softening point: 102° C.)
Acid-modified PE(D): ethylene-vinyl acetate copolymer (melting point: 92° C. and softening point: 50° C.)
Fluorine-based resin (A): polychlorotrifluoroethylene (melting point: 220° C. and softening point: 85° C.)
Fluorine-based resin (B): two-liquid curable fluorine-based adhesive (fluorine-based polyol resin containing an isophorone diisocyanate (IPDI)-based curing agent (melting point: 95° C. and softening point: 65° C.)

TABLE 2

| | Evaluation of unsealing property | | Inner bag cleavage temperature/time until unsealing after temperature reaches 150° C. | Lamination strength (N/15 mm) | | | | Sealing strength (N/15 mm) | | Did delamination occur after filling of electrolytic solution? |
|---|---|---|---|---|---|---|---|---|---|---|
| | Inner bag formation temperature (° C.) | Delamination position | | 25° C. | 80° C. | 125° C. | 140° C. | 25° C. | 125° C. | |
| Example 1 | 105 | Inside of sealant layer | 140° C. | 8 | 3.8 | 0.5 | 0.2 | 120 | 15 | No |
| Example 2 | 110 | Interface between metal layer and adhesive layer | 150° C. | 7 | 4 | 1 | 0.2 | 80 | 8 | No |
| Example 3 | 110 | Inside of sealant layer | 140° C. | 8 | 6 | 1 | 0.3 | 80 | 8 | No |
| Example 4 | 135 | Inside of adhesive layer | 150° C./10 minutes | 6 | 5 | 0.8 | 0.2 | 70 | 10 | No |
| Example 5 | 105 | Inside of adhesive layer | 150° C./10 minutes | 6 | 4.5 | 0.6 | 0.1 | 80 | 9 | No |
| Example 6 | 105 | Inside of sealant layer | 145° C. | 8 | 6 | 1.5 | 0.5 | 120 | 12 | No |
| Example 7 | 150 | Around interface between adhesive layer and sealant layer | 150° C./10 minutes | 8 | 6 | 2 | 0.4 | 100 | 13 | No |
| Example 8 | 130 | Inside of adhesive layer | 150° C./15 minutes | 6 | 3.5 | 1 | 0.3 | 100 | 9 | No |
| Example 9 | 100 | Interface between metal layer and adhesive layer | 150° C./15 minutes | 6 | 3 | 0.5 | 0.3 | 90 | 6 | No |
| Example 10 | 105 | Interface between metal layer and adhesive layer | 150° C./15 minutes | 6 | 5 | 0.3 | 0.2 | 100 | 9 | No |
| Example 11 | 150 | Interface between metal layer and adhesive layer | 150° C./10 minutes | 8 | 5 | 0.7 | 0.1 | 80 | 10 | No |
| Example 12 | 150 | Around interface between adhesive layer and sealant layer | 150° C./15 minutes | 8 | 6 | 0.6 | 0.2 | 70 | 11 | No |
| Example 13 | 150 | Around interface between adhesive layer and sealant layer | 150° C./20 minutes | 7 | 7 | 0.4 | 0.1 | 75 | 8 | No |
| Example 14 | 110 | Inside of sealant layer | 150° C./10 minutes | 8 | 7.5 | 1.2 | 0.4 | 100 | 12 | No |
| Example 15 | 150 | Around interface between adhesive layer and sealant layer | 150° C./30 minutes | 5 | 4 | 1.6 | 0.6 | 45 | 18 | No |
| Example 16 | 100 | Inside of adhesive layer | 150° C./30 minutes | 6 | 3.5 | 0.3 | 0.1 | 50 | 12 | No |
| Example 17 | 105 | Interface between metal layer and adhesive layer | 150° C./12 minutes | 6 | 5 | 0.3 | 0.2 | 100 | 9 | No |
| Comparative Example 1 | — | — | 150° C./35 minutes | 8 | 7.5 | 3.2 | 0.6 | 120 | 28 | No |
| Comparative Example 2 | 85 | Interface between metal layer and adhesive layer | 140° C. | 6 | 1.5 | 0.1 | 0.1 | 80 | 4 | Yes |
| Comparative Example 3 | — | — | 150° C./65 minutes | 8 | 7.5 | 3.5 | 0.5 | 120 | 35 | No |
| Comparative Example 4 | — | Inside of sealant | 80° C. | 8 | 1.5 | 0.1 | 0.1 | 120 | 4 | No |

As shown in Table 2, in the battery packaging materials of Examples 1 to 17, when the simulated battery was heated, the battery packaging material delaminated at some part of the interface between the metal layer and the outside surface of the sealant layer (surface on the innermost layer side), and an inner bag was formed. Further, thereafter the inner bag was cleaved, and the battery packaging material was quickly and gently unsealed. On the other hand, in the case where the battery packaging materials of Comparative Examples 1 and 3 were used, the battery packaging material did not delaminate and an inner bag was not formed even when the simulated battery was heated. When the internal temperature of the simulated battery reached 150° C., the simulated battery expanded, and an electrolytic solution was erupted at once as a gas was released, so that the electrolytic solution was scattered around. In the battery packaging material of Comparative Example 2, the lamination strength at 80° C. was excessively low, so that the battery packaging material was easily delaminated by hand at the interface between the adhesive layer and the sealant layer after being filled with an electrolytic solution, and thus it could not be used as a battery packaging material. In the battery packaging material of Comparative Example 4, the lamination strength at 80° C. was excessively low, so that the battery packaging material was rapidly delaminated in the sealant layer at a low temperature of 80° C. From the above results, it is apparent that for the battery packaging material of the present invention to exhibit the unsealing mechanism in the present invention, it is preferred to adjust the compositions and melting points of the sealant layer 4, the adhesive layer 5 and the like so that the lamination strength was 3 (N/15 mm) or more at 25° C., 2.5 (N/15 mm) or more at 80° C., and 2.5 (N/15 mm) or less at 125° C., and the sealing strength was 30 (N/15 mm) or more at 25° C., and 20 (N/15 mm) or less at 125° C.

Examples 1A to 12A and Comparative Examples 1A to 5A

Production of Battery Packaging Material

A metal layer 3 formed of an aluminum foil (thickness: 40 µm) subjected to a chemical conversion treatment at both surfaces was laminated on a slipping agent-non-applied surface of a base material layer 1 with a slipping agent applied on one surface thereof, which was formed of a biaxially stretched nylon film (thickness: 25 µm), using a dry lamination method. Specifically, a two-liquid urethane adhesive (polyol compound and aromatic isocyanate-based compound) was applied to one surface of the aluminum foil, so that an adhesive layer 2 (thickness: 4 µm) was formed on the metal layer 3. The adhesive layer 2 on the metal layer 3 and the base material layer 1 were then bonded to each other under pressure and heating, and an aging treatment was performed at 40° C. for 24 hours to prepare a laminate of base material layer 1/adhesive layer 2/metal layer 3. The chemical conversion treatment of the aluminum foil used as the metal layer 3 was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry weight), and performing baking for 20 seconds under such conditions that the film temperature was 180° C. or higher.

A resin component for forming a first sealant layer and a resin component for forming a second sealant layer were then co-extruded in a molten state onto the laminate on the metal layer 3 side to laminate the first sealant layer (thickness: 25 µm) and the second sealant layer (thickness: 25 µm) on the metal layer 3. The resin components for forming the first sealant layer and the second sealant layer are as shown in Tables 2A to 4A. For the melting points of the sealant layers, values obtained by performing measurement by a DSC method are shown. Thus, a battery packaging material including a laminate with a base material layer 1, an adhesive layer 2, a metal layer 3, a first sealant layer and a second sealant layer laminated in this order was obtained.

[Evaluation of Sealing Property and Unsealing Property of Battery Packaging Material]

Each battery packaging material was cut to a size of 80 mm×150 mm, and then cold-molded to a depth of 3.0 mm at 0.4 MPa using a mold (female mold) having an opening size of 35 mm×50 mm and a mold (male mold) corresponding thereto, so that a recess portion was formed at the central part of the battery packaging material. For the battery packaging material after cold molding, whether or not pinholes were generated on a surface on the base material layer 1 side was visually checked, the result showed that pinholes were not generated in any of the battery packaging materials. Two battery packaging materials after molding were placed one on another with the sealant layers facing each other, and the edge portions at which the sealant layers were superimposed one on another were heat-sealed (at 175° C., 3 seconds, surface pressure: 1.4 MPa) to form the battery packaging material into a case shape having a hermetically sealed internal space (pressure: 1 atm). The battery packaging material thus formed into a case shape was put in an oven that can be evacuated, the oven was set so that the pressure in the oven was 0 atm, and the battery packaging material was heated to a set temperature T° C. at a temperature rise rate of 3° C./minute, and kept at T° C. for 30 minutes. The state of the battery packaging material was visually checked immediately before the ambient temperature reached the temperature T° C. and 30 minutes after the ambient temperature reached the temperature T° C. This performance evaluation was conducted while three temperatures: 140° C., 150° C. and 160° C. were employed as the set temperature.

Based on the results observed in the above-mentioned test, the sealing property and the unsealing property of each battery packaging material were evaluated in accordance with the following assessment criteria.

TABLE 1A

| | Assessment criteria |
|---|---|
| ◯ | At least a part of the sealant layer 4 was delaminated from the interface between itself and the metal layer 3, but cleavages were not generated in the sealant layer 4, and the sealant layer 4 was formed into a bag shape to keep the inner part hermetically sealed until the ambient temperature reached the set temperature T° C.<br>In 30 minutes or less after the ambient temperature reached the set temperature T° C., fine cleavages like pinholes were generated in the sealant layer 4 at the part delaminated from the metal layer 3, so that the battery packaging material turned into an unsealed state. |

TABLE 1A-continued

Assessment criteria

X (A) The battery packaging material turned into an unsealed state before the ambient temperature reached the set temperature T° C., so that cohesive fracture at the heat sealed part or root cutting of the sealant layer occurred.

X (B) Even 30 minutes after the ambient temperature reached the set temperature T° C., the battery packaging material was kept in a hermetically sealed state, and did not turn into an unsealed state.

The obtained results are shown in Tables 2A to 4A. The results show that in a battery packaging material including a first sealant layer containing an acid-modified polyolefin and a second sealant layer containing a polyolefin, when the difference ($T_{m1}$−T) between the melting point $T_{m1}$ of the first sealant layer and the set temperature T was not less than −10° C. and not more than −5° C., and the difference ($T_{m2}$−T) between the melting point $T_{m2}$ of the second sealant layer and the set temperature T was not less than −5° C. and not more than +5° C., at least a part of the sealant layer 4 was delaminated from the interface between itself and the metal layer 3, but the sealant layer 4 was formed into a bag shape to keep the inner part hermetically sealed until the ambient temperature reached the set temperature T° C., and 30 minutes after the ambient temperature reached the set temperature T° C., fine cleavages like pinholes were generated in the sealant layer 4 at the part delaminated from the metal layer 3, so that the battery packaging material could be unsealed under gentle conditions. On the other hand, when at least one of the difference ($T_{m1}$−T) between the melting point $T_{m1}$ of the first sealant layer and the set temperature T and the difference ($T_{m2}$−T) between the melting point $T_{m2}$ of the second sealant layer and the set temperature T failed to satisfy the above-mentioned conditions, the battery packaging material turned into an unsealed state before the ambient temperature reached the set temperature 1° C., so that cohesive fracture at the heat sealed part or root cutting of the sealant layer occurred, or the battery packaging material could not be turned into an unsealed state even 30 minutes after the ambient temperature reached the set temperature 1° C.

TABLE 2A

Set temperature T: 140° C.

| | Examples | | | | Comparative Examples | | | |
|---|---|---|---|---|---|---|---|---|
| | 1A | 2A | 3A | 4A | 1A | 2A | 3A | 4A |
| Resin component of first sealant layer | A | A | B | B | A | A | B | B |
| Resin component of second sealant layer | a | b | c | b | d | e | d | e |
| Difference ($T_{m1}$ − T) between melting point $T_{m1}$ of first sealant layer and set temperature T° C. | −10 | −10 | −5 | −5 | −10 | −10 | −5 | −5 |
| Difference ($T_{m2}$ − T) between melting point $T_{m2}$ of second sealant layer and set temperature T° C. | −5 | +5 | +5 | +5 | −12 | +8 | −12 | +8 |
| Results of evaluation of sealing property and unsealing property | ○ | ○ | ○ | ○ | X (B) | X (A) | X (B) | X (A) |

Meanings of the symbols of the resin components in the table are as follows.
A: terpolymer of propylene-ethylene-butene modified with maleic acid (melting point: 130° C.)
B: terpolymer of propylene-ethylene-butene modified with maleic acid (melting point: 135° C.)
a: terpolymer of propylene-ethylene-butene (melting point: 135° C.)
b: random copolymer of propylene-ethylene (melting point: 145° C.)
c: terpolymer of propylene-ethylene-butene (melting point: 145° C.)
d: terpolymer of propylene-ethylene-butene (melting point: 128° C.)
e: random copolymer of propylene-ethylene (melting point: 148° C.)

TABLE 3A

Set temperature T: 150° C.

| | Examples | | | | Comparative Examples | | | |
|---|---|---|---|---|---|---|---|---|
| | 5A | 6A | 7A | 8A | 5A | 6A | 7A | 8A |
| Resin component of first sealant layer | C | C | D | D | C | C | D | D |
| Resin component of second sealant layer | b | f | b | f | g | h | g | h |
| Difference ($T_{m1}$ − T) between melting point $T_{m1}$ of first sealant layer and set temperature T° C. | −10 | −10 | −5 | −5 | −10 | −10 | −5 | −5 |
| Difference ($T_{m2}$ − T) between melting point $T_{m2}$ of second sealant layer and set temperature T° C. | −5 | +5 | −5 | +5 | −12 | +8 | −12 | +8 |

TABLE 3A-continued

Set temperature T: 150° C.

|  | Examples | | | | Comparative Examples | | | |
|---|---|---|---|---|---|---|---|---|
|  | 5A | 6A | 7A | 8A | 5A | 6A | 7A | 8A |
| Results of evaluation of sealing property and unsealing property | ○ | ○ | ○ | ○ | X (B) | X (A) | X (B) | X (A) |

Meanings of the symbols of the resin components in the table are as follows.
C: random copolymer of propylene-ethylene modified with maleic acid (melting point: 140° C.)
D: random copolymer of propylene-ethylene modified with maleic acid (melting point: 145° C.)
b: random copolymer of propylene-ethylene (melting point: 145° C.)
f: random copolymer of propylene-ethylene (melting point: 155° C.)
g: terpolymer of propylene-ethylene-butene (melting point: 138° C.)
h: random copolymer of propylene-ethylene (melting point: 158° C.)

TABLE 4A

Set temperature T: 160° C.

|  | Examples | | | | Comparative Examples | | | |
|---|---|---|---|---|---|---|---|---|
|  | 9A | 10A | 11A | 12A | 9A | 10A | 11A | 12A |
| Resin component of first sealant layer | E | E | F | F | E | E | F | F |
| Resin component of second sealant layer | f | i | f | i | e | j | e | j |
| Difference ($T_{m1}$ – T) between melting point $T_{m1}$ of first sealant layer and set temperature T° C. | −10 | −10 | −5 | −5 | −10 | −10 | −5 | −5 |
| Difference ($T_{m2}$ – T) between melting point $T_{m2}$ of second sealant layer and set temperature T° C. | −5 | +5 | −5 | +5 | −12 | +8 | −12 | +8 |
| Results of evaluation of sealing property and unsealing property | ○ | ○ | ○ | ○ | X (B) | X (A) | X (B) | X (A) |

Meanings of the symbols of the resin components in the table are as follows.
E: random copolymer of propylene-ethylene modified with maleic acid (melting point: 150° C.)
F: random copolymer of propylene-ethylene modified with maleic acid (melting point: 155° C.)
e: random copolymer of propylene-ethylene (melting point: 148° C.)
f: random copolymer of propylene-ethylene (melting point: 155° C.)
i: homopolymer of propylene (melting point: 165° C.)
j: homopolymer of propylene (melting point: 168° C.)

Example 13A

A battery packaging material was produced in the same manner as in Examples 1A to 12A except that the following changes were made.
- A random copolymer of propylene-ethylene modified with maleic acid (MFR: 7, melting point: 140° C.) was used as a resin for forming the first sealant layer.
- A random copolymer of propylene-ethylene (MFR: 7, melting point: 147° C.) was used as a resin for forming the second sealant layer, and further, 0.025% by mass of erucic acid amide was blended as a slipping agent.
The thickness of the first sealant layer was 15 μm, and the thickness of the second sealant layer was 15 μm.

Example 14A

A battery packaging material was produced in the same manner as in Example 13A except that the thickness of the first sealant layer was 20 μm.

Example 15A

A battery packaging material was produced in the same manner as in Example 13A except that the blended amount of erucic acid amide was 0.12% by mass.

Example 16A

A battery packaging material was produced in the same manner as in Example 14A except that the blended amount of erucic acid amide was 0.12% by mass.

Example 17A

A battery packaging material was produced in the same manner as in Example 13A except that erucic acid amide was blended in the first sealant layer in an amount of 0.12% by mass.

Example 18A

A battery packaging material was produced in the same manner as in Example 14A except that erucic acid amide was blended in the first sealant layer in an amount of 0.12% by mass.

impulse application system (lithium ion battery insulation tester manufactured by Nippon Technart Inc.). First, 20 samples as described above were provided, an impulse voltage of 100 V was applied between a negative electrode terminal of each lithium ion battery and an aluminum foil, and samples having a voltage drop of 20 V or less after 99 msec passed the test. Pass ratios (%) are shown in Table 5A.

TABLE 5A

|  |  | Example 13A | Example 14A | Example 15A | Example 16A | Example 17A | Example 18A |
|---|---|---|---|---|---|---|---|
| First sealant layer | Thickness (μm) | 15 | 20 | 15 | 20 | 15 | 20 |
|  | Amount of slipping agent (% by mass) | 0 | 0 | 0 | 0 | 0.12 | 0.12 |
| Second sealant layer | Thickness (μm) | 15 | 15 | 15 | 15 | 15 | 15 |
|  | Amount of slipping agent (% by mass) | 0.025 | 0.025 | 0.12 | 0.12 | 0.025 | 0.025 |
|  | Ratio (%) of samples judged as having high insulation quality to cracks | 60 | 60 | 85 | 75 | 75 | 70 |

[Evaluation of Insulation Quality to Cracks]

The battery packaging material obtained in each of Examples 13A to 18A was cut to a sheet piece of 150 mm (MD direction)×80 mm (TD direction, lateral direction), and then cold-molded to a depth of 3.0 mm at 0.4 MPa using a mold (female mold) having an opening size of 35 mm×50 mm and a mold (male mold) corresponding thereto, so that a recess portion was formed at the central part of the sheet piece. Next, the sheet piece was folded in half in the MD direction (longitudinal direction) in such a manner that the second sealant layer was situated on the inner side, the end portion was cut in such a manner that the length in the MD direction after folding was 6.3 mm, and thus a packaging material was molded. A dummy cell (PP block of 3.0 mm×49 mm×29 mm), to which an electrode tab with a tab seal material was bonded, was placed in the recess portion of the molded packaging material, and fixed in such a manner that the tab seal material portion of the dummy cell was situated at the seal part of the packaging material. Next, the packaging material was heat-sealed on the 80 mm-side to a width of 5 mm at 170° C. and 2.0 MPa for 5 seconds in such a manner that a metal terminal would be drawn to outside from one opened side of the packaging material. Subsequently, the packaging material was heat-sealed on one of the 6.3 mm-sides to a width of 5 mm at 170° C. and 0.5 MPa for 3 seconds to prepare a pouch-type outer packaging having an opening on one side. The outer packaging was dried in a dry room for 12 hours. Next, an electrolytic solution was put in the outer packaging after drying, and the opening was hermetically sealed to a width of 3 mm. This was held at 60° C. for 5 hours, and then cooled, and the packaging material was heat-sealed on the other 6.3 mm-side to a width of 3 mm at 170° C. and 1.0 MPa for 3.0 seconds. The finally sealed part was folded at 90° C. in a direction along a molded projection portion, and then returned to the original state, and a test for evaluation of insulation quality to cracks was then conducted using an From the results shown in Table 5A, it has become evident that insulation quality of the battery packaging material to cracks is improved by blending erucic acid amide in the second sealant layer as a slipping agent. It has become evident that particularly in Examples 15A to 18A where the amount of the slipping agent in the first sealant layer or the second sealant layer is 0.012% by mass, insulation quality to cracks is very high.

[Evaluation of Moldability]

The battery packaging material obtained in each of Examples 13A to 18A was cut to a sheet piece of 90 mm (MD direction)×150 mm (TD direction, lateral direction), and then cold-molded to an arbitrary depth at 0.9 MPa from the second sealant layer side using a mold (female mold) having an opening size of 35 mm×50 mm and a mold (male mold) corresponding thereto, so that a recess portion was formed at the central part of the sheet piece. Next, whether or not pinholes were generated on the surface of the part of the second sealant layer where the recess portion was formed was visually checked. Samples having no pinholes passed the test with the number of samples being 20. The same procedure as described above was carried out while the depth of the recess portion was sequentially increased by 0.5 mm, and whether or not pinholes were generated was checked for 20 samples. For the battery packaging materials obtained in Examples 13A to 18A, depths (mm) of the recess portion for which it was determined that generation of pinholes in the second sealant layer could be suppressed are shown in Table 6A. The depth of the recess portion was calculated in the following manner. For example, where none of 20 samples has no pinholes when molding is performed in such a manner that the depth of the recess portion is 5.0 mm, and the number of samples having no pinholes is N when the depth of the recess portion is 5.5 mm, the depth (mm) of the recess portion for which it is determined generation of pinholes can be suppressed is calculated in accordance with the following equation: depth (mm) of recess portion for which it is determined generation of pinholes can be suppressed=5.0 (mm)+0.5 (mm)×(N/20).

TABLE 6A

|  |  | Example 13A | Example 14A | Example 15A | Example 16A | Example 17A | Example 18A |
|---|---|---|---|---|---|---|---|
| First sealant layer | Thickness (μm) | 15 | 20 | 15 | 20 | 15 | 20 |
| | Amount of slipping agent (% by mass) | 0 | 0 | 0 | 0 | 0.12 | 0.12 |
| Second sealant layer | Thickness (μm) | 15 | 15 | 15 | 15 | 15 | 15 |
| | Amount of slipping agent (% by mass) | 0.025 | 0.025 | 0.12 | 0.12 | 0.025 | 0.025 |
| depth (mm) of recess portion for which it was determined generation of pinholes could be suppressed | | 6.32 | 6.45 | >7.50 | 7.45 | 7.15 | 7.00 |

From the results shown in Table 6A, it has become evident that in Examples 15A to 18A where the second sealant layer contains a large amount of the slipping agent, the recess portion can be formed more deeply, and thus moldability is high, as compared to Examples 13A and 14A where the amount of the slipping agent is small. It has become evident that particularly in Examples 15A to 18A where the amount of the slipping agent in the first sealant layer or the second sealant layer is 0.12% by mass, generation of pinholes is suppressed although the depth of the recess portion exceeds 7.00 mm, and thus moldability is very high.

Examples 1Ba to 20Ba and Comparative Examples 1Ba to 18Ba

Production of Battery Packaging Material

A laminate of base material layer 1/adhesive layer 2/metal layer 3 was prepared in the same manner as in Examples 1A to 12A and Comparative Examples 1A to 5A. A resin component for forming a first sealant layer and a resin component for forming a second sealant layer were then co-extruded in a molten state onto the laminate on the metal layer 3 side to laminate the first sealant layer (thickness: 25 μm) and the second sealant layer (thickness: 25 μm) on the metal layer 3. Further, a resin component for forming a third sealant layer was melt-extruded to prepare a single-layer film, this film was superimposed on the second sealant layer, and press-bonded at 160° C., and the press-bonded product was then heated in an oven at 190° C. for 2 minutes to laminate the third sealant (thickness: 25 μm) on the second sealant layer. The resin components for forming the first sealant layer, the second sealant layer and the third sealant layer are as shown in Tables 1Ba to 5Ba. For the melting points of the sealant layers, values obtained by performing measurement by a DSC method are shown. Thus, a battery packaging material including a laminate with a base material layer 1, an adhesive layer 2, a metal layer 3, a first sealant layer, a second sealant layer and a third sealant layer laminated in this order was obtained.

[Evaluation of Sealing Property and Unsealing Property of Battery Packaging Material]

The same procedure as in Examples 1A to 12A and Comparative Examples 1A to 5A was carried out, and based on the results observed in the above-mentioned test, the sealing property and the unsealing property of each battery packaging material were evaluated in accordance with the same assessment criteria as those in Table 1A. The obtained results are shown in Tables 1Ba to 5Ba.

The results show that in a battery packaging material including in order a first sealant layer containing an acid-modified polyolefin, a second sealant layer containing an acid-modified polyolefin and a third sealant layer containing a polyolefin, when the difference ($T_{m1}-T$) between the melting point $T_{m1}$ of the first sealant layer and the set temperature T was not less than −10° C. and not more than −5° C., the difference ($T_{m2}-T$) between the melting point $T_{m2}$ of the second sealant layer and the set temperature T was not less than +5° C. and not more than +10° C., and the difference ($T_{m2}-T$) between the melting point $T_{m3}$ of the third sealant layer and the set temperature T was not less than −5° C. and not more than +5° C., at least a part of the sealant layer 4 was delaminated from the interface between itself and the metal layer 3, but the sealant layer 4 was formed into a bag shape to keep the inner part hermetically sealed until the ambient temperature reached the set temperature T° C., and 30 minutes after the ambient temperature reached the set temperature T° C., fine cleavages like pinholes were generated in the sealant layer 4 at the part delaminated from the metal layer 3, so that the battery packaging material could be unsealed under gentle conditions. On the other hand, when at least one of the difference ($T_{m1}-T$) between the melting point $T_{m1}$ of the first sealant layer and the set temperature T, the difference ($T_{m2}-T$) between the melting point $T_{m2}$ of the second sealant layer and the set temperature T and the difference ($T_{m3}-T$) between the melting point $T_{m3}$ of the third sealant layer and the set temperature T failed to satisfy the above-mentioned conditions, the battery packaging material turned into an unsealed state before the ambient temperature reached the set temperature T° C., so that cohesive fracture at the heat sealed part or root cutting of the sealant layer occurred, or the battery packaging material could not be turned into an unsealed state even 30 minutes after the ambient temperature reached the set temperature T° C.

TABLE 1Ba

Set temperature T: 140° C.

| | Examples | | | | | | | |
|---|---|---|---|---|---|---|---|---|
| | 1Ba | 2Ba | 3Ba | 4Ba | 5Ba | 6Ba | 7Ba | 8Ba |
| Resin component of first sealant layer | A | A | A | A | B | B | B | B |
| Resin component of second sealant layer | a | a | b | b | a | a | b | b |

TABLE 1Ba-continued

Set temperature T: 140° C.

| | Examples | | | | | | | |
|---|---|---|---|---|---|---|---|---|
| | 1Ba | 2Ba | 3Ba | 4Ba | 5Ba | 6Ba | 7Ba | 8Ba |
| Resin component of third sealant layer | c | c | a | a | c | c | a | a |
| Difference ($T_{m1}$ - T) between melting point $T_{m1}$ of first sealant layer and set temperature T° C. | −10 | −10 | −10 | −10 | −5 | −5 | −5 | −5 |
| Difference ($T_{m2}$ - T) between melting point $T_{m2}$ of second sealant layer and set temperature T° C. | +5 | +5 | +10 | +10 | +5 | +5 | +10 | +10 |
| Difference ($T_{m3}$ - T) between melting point $T_{m3}$ of third sealant layer and set temperature T° C. | −5 | −5 | +5 | +5 | −5 | −5 | +5 | +5 |
| Results of evaluation of sealing property and unsealing property | ○ | ○ | ○ | ○ | ○ | ○ | ○ | ○ |

Meanings of the symbols of the resin components in the table are as follows.
A: terpolymer of propylene-ethylene-butene modified with maleic acid (melting point: 130° C.)
B: terpolymer of propylene-ethylene-butene modified with maleic acid (melting point: 135° C.)
a: random copolymer of propylene-ethylene (melting point: 145° C.)
b: random copolymer of propylene-ethylene (melting point: 150° C.)
c: terpolymer of propylene-ethylene-butene (melting point: 135° C.)

TABLE 2Ba

Set temperature T: 140° C.

| | Comparative Examples | | | | | | | |
|---|---|---|---|---|---|---|---|---|
| | 1Ba | 2Ba | 3Ba | 4Ba | 5Ba | 6Ba | 7Ba | 8Ba |
| Resin component of first sealant layer | A | A | A | A | B | B | B | B |
| Resin component of second sealant layer | a | a | b | b | a | a | b | b |
| Resin component of third sealant layer | d | e | d | e | d | e | d | e |
| Difference ($T_{m1}$ - T) between melting point $T_{m1}$ of first sealant layer and set temperature T° C. | −10 | −10 | −10 | −10 | −5 | −5 | −5 | −5 |
| Difference ($T_{m2}$ - T) between melting point $T_{m2}$ of second sealant layer and set temperature T° C. | +5 | +5 | +10 | +10 | +5 | +5 | +10 | +10 |
| Difference ($T_{m3}$ - T) between melting point $T_{m3}$ of third sealant layer and set temperature T° C. | −12 | +8 | −12 | +8 | −12 | +8 | −12 | +8 |
| Results of evaluation of sealing property and unsealing property | X (B) | X (A) | X (B) | X (A) | X (B) | X (A) | X (B) | X (A) |

Meanings of the symbols of the resin components in the table are as follows.
A: terpolymer of propylene-ethylene-butene modified with maleic acid (melting point: 130° C.)
B: terpolymer of propylene-ethylene-butene modified with maleic acid (melting point: 135° C.)
a: random copolymer of propylene-ethylene (melting point: 145° C.)
b: random copolymer of propylene-ethylene (melting point: 150° C.)
d: terpolymer of propylene-ethylene-butene (melting point: 128° C.)
e: random copolymer of propylene-ethylene (melting point: 148° C.)

TABLE 3Ba

Set temperature T: 150° C.

| | Examples | | | | | | | |
|---|---|---|---|---|---|---|---|---|
| | 9Ba | 10Ba | 11Ba | 12Ba | 13Ba | 14Ba | 15AB | 16AB |
| Resin component of first sealant layer | C | C | C | C | D | D | D | D |
| Resin component of second sealant layer | f | f | g | g | f | f | g | g |
| Resin component of third sealant layer | a | a | f | f | a | a | f | f |
| Difference ($T_{m1}$ - T) between melting point $T_{m1}$ of first sealant layer and set temperature T° C. | −10 | −10 | −10 | −10 | −5 | −5 | −5 | −5 |
| Difference ($T_{m2}$ - T) between melting point $T_{m2}$ of second sealant layer and set temperature T° C. | +5 | +5 | +10 | +10 | +5 | +5 | +10 | +10 |

TABLE 3Ba-continued

Set temperature T: 150° C.

|  | Examples | | | | | | | |
| --- | --- | --- | --- | --- | --- | --- | --- | --- |
|  | 9Ba | 10Ba | 11Ba | 12Ba | 13Ba | 14Ba | 15AB | 16AB |
| Difference ($T_{m3}$ − T) between melting point $T_{m3}$ of third sealant layer and set temperature T° C. | −5 | −5 | +5 | +5 | −5 | −5 | +5 | +5 |
| Results of evaluation of sealing property and unsealing property | ○ | ○ | ○ | ○ | ○ | ○ | ○ | ○ |

Meanings of the symbols of the resin components in the table are as follows.
C: random copolymer of propylene-ethylene modified with maleic acid (melting point: 140° C.)
D: random copolymer of propylene-ethylene modified with maleic acid (melting point: 145° C.)
a: random copolymer of propylene-ethylene (melting point: 145° C.)
f: random copolymer of propylene-ethylene (melting point: 155° C.)
g: homopolymer of propylene (melting point: 160° C.)

TABLE 4Ba

Set temperature T: 150° C.

|  | Comparative Examples | | | | | | | |
| --- | --- | --- | --- | --- | --- | --- | --- | --- |
|  | 9Ba | 10Ba | 11Ba | 12Ba | 13Ba | 14Ba | 15Ba | 16Ba |
| Resin component of first sealant layer | C | C | C | C | D | D | D | D |
| Resin component of second sealant layer | f | f | g | g | f | f | g | g |
| Resin component of third sealant layer | h | i | h | i | h | i | h | i |
| Difference ($T_{m1}$ − T) between melting point $T_{m1}$ of first sealant layer and set temperature T° C. | −10 | −10 | −10 | −10 | −5 | −5 | −5 | −5 |
| Difference ($T_{m2}$ − T) between melting point $T_{m2}$ of second sealant layer and set temperature T° C. | +5 | +5 | +10 | +10 | +5 | +5 | +10 | +10 |
| Difference ($T_{m3}$ − T) between melting point $T_{m3}$ of third sealant layer and set temperature T° C. | −12 | +8 | −12 | +8 | −12 | +8 | −12 | +8 |
| Results of evaluation of sealing property and unsealing property | X (B) | X (A) | X (B) | X (A) | X (B) | X (A) | X (B) | X (A) |

Meanings of the symbols of the resin components in the table are as follows.
C: random copolymer of propylene-ethylene modified with maleic acid (melting point: 140° C.)
D: random copolymer of propylene-ethylene modified with maleic acid (melting point: 145° C.)
f: random copolymer of propylene-ethylene (melting point: 155° C.)
g: homopolymer of propylene (melting point: 160° C.)
h: terpolymer of propylene-ethylene-butene (melting point: 138° C.)
i: random copolymer of propylene-ethylene (melting point: 158° C.)

TABLE 5Ba

Set temperature T: 160° C.

|  | Examples | | | | Comparative Examples | |
| --- | --- | --- | --- | --- | --- | --- |
|  | 17Ba | 18Ba | 19Ba | 20Ba | 17Ba | 18Ba |
| Resin component of first sealant layer | E | E | F | F | E | F |
| Resin component of second sealant layer | j | j | j | j | j | j |
| Resin component of third sealant layer | f | g | f | g | e | e |
| Difference ($T_{m1}$ − T) between melting point $T_{m1}$ of first sealant layer and set temperature T° C. | −10 | −10 | −5 | −5 | −10 | −5 |
| Difference ($T_{m2}$ − T) between melting point $T_{m2}$ of second sealant layer and set temperature T° C. | +5 | +5 | +5 | +5 | +5 | +5 |
| Difference ($T_{m3}$ − T) between melting point $T_{m3}$ of third sealant layer and set temperature T° C. | −5 | 0 | −5 | 0 | −12 | −12 |

TABLE 5Ba-continued

Set temperature T: 160° C.

|  | Examples | | | | Comparative Examples | |
| --- | --- | --- | --- | --- | --- | --- |
|  | 17Ba | 18Ba | 19Ba | 20Ba | 17Ba | 18Ba |
| Results of evaluation of sealing property and unsealing property | ○ | ○ | ○ | ○ | X (B) | X (B) |

Meanings of the symbols of the resin components in the table are as follows.
E: random copolymer of propylene-ethylene modified with maleic acid (melting point: 150° C.)
F: random copolymer of propylene-ethylene modified with maleic acid (melting point: 155° C.)
e: random copolymer of propylene-ethylene (melting point: 148° C.)
f: random copolymer of propylene-ethylene (melting point: 155° C.)
g: homopolymer of propylene (melting point: 160° C.)
j: homopolymer of propylene (melting point: 165° C.)

Example 21Ba

A battery packaging material was produced in the same manner as in Examples 1Ba to 20Ba except that the following changes were made.
  A maleic acid-modified random copolymer having a MFR of 7 and a melting point of 140° C. was used as a resin for forming the first sealant layer.
  A block copolymer having a MFR of 5 and a melting point of 160° C. was used as a resin for forming the second sealant layer.
  A random copolymer having a MFR of 7 and a melting point of 147° C. was used as a resin for forming the third sealant layer, and further, 0.025% by mass of erucic acid amide was blended as a slipping agent.
  The thickness of the first sealant layer was 15 μm, the thickness of the second sealant layer was 15 μm, and the thickness of the third sealant layer was 15 μm.

Example 22Ba

A battery packaging material was produced in the same manner as in Example 21Ba except that the blended amount of erucic acid amide was 0.10% by mass.

Example 23Ba

A battery packaging material was produced in the same manner as in Example 21Ba except that the blended amount of erucic acid amide was 0.12% by mass.

[Evaluation of Insulation Quality to Cracks]

For the battery packaging materials obtained in Examples 21Ba to 23Ba, insulation quality to cracks was evaluated in the same manner as in Examples 13A to 18A. Pass ratios (%) are shown in Table 6Ba.

TABLE 6Ba

|  |  | Example 21Ba | Example 22Ba | Example 23Ba |
| --- | --- | --- | --- | --- |
| First sealant layer | Thickness (μm) | 15 | 15 | 15 |
| Second sealant layer | Thickness (μm) | 15 | 15 | 15 |
| Third sealant layer | Thickness (μm) | 15 | 15 | 15 |
|  | Amount of slipping agent (% by mass) | 0.025 | 0.10 | 100.12 |
| Ratio (%) of samples judged as having high insulation quality to cracks | | 60 | 75 | 100 |

From the results shown in Table 6Ba, it has become evident that insulation quality of the battery packaging material to cracks is improved by blending erucic acid amide in the third sealant layer as a slipping agent. It has become evident that particularly in Example 22Ba where the amount of the slipping agent is 0.10% by mass and Example 23Ba where the amount of the slipping agent is 0.12% by mass, insulation quality to cracks is very high.

[Evaluation of Moldability]

For the battery packaging materials obtained in Examples 21Ba to 23Ba, moldability was evaluated in the same manner as in Examples 13A to 18A. The results are shown in Table 7Ba.

TABLE 7Ba

|  |  | Example 21Ba | Example 22Ba | Example 23Ba |
| --- | --- | --- | --- | --- |
| First sealant layer | Thickness (μm) | 15 | 15 | 15 |
| Second sealant layer | Thickness (μm) | 15 | 15 | 15 |

TABLE 7Ba-continued

|  |  | Example 21Ba | Example 22Ba | Example 23Ba |
|---|---|---|---|---|
| Third sealant layer | Thickness (μm) | 15 | 15 | 15 |
|  | Amount of slipping agent (% by mass) | 0.025 | 0.07 | 0.12 |
|  | Lubricant applied to surface | None | None | None |
| depth (mm) of recess portion for which it was determined generation of pinholes could be suppressed |  | 5.35 | 6.50 | 7.25 |

From the results shown in Table 7Ba, it has become evident that in Examples 21Ba to 23Ba where the third sealant layer contains the slipping agent, the recess portion can be formed deeply, and thus moldability is high. It has become evident that particularly in Example 23Ba where the amount of the slipping agent in is 0.12% by mass, generation of pinholes is suppressed even although the recess portion has a very high depth of 7.25 mm, and thus moldability is extremely high.

Examples 1Bb to 20Bb and Comparative Examples 1Bb to 18Bb

Production of Battery Packaging Material

A battery packaging material including a laminate with a base material layer 1, an adhesive layer 2, a metal layer 3, a first sealant layer, a second sealant layer and a third sealant layer laminated in this order was obtained in the same manner as in Examples 1Ba to 20Ba and Comparative Examples 1Ba to 18Ba. The resin components for forming the first sealant layer, the second sealant layer and the third sealant layer are as shown in Tables 1Bb to 5Bb.
[Evaluation of Sealing Property and Unsealing Property of Battery Packaging Material]

The same procedure as in Examples 1A to 12A and Comparative Examples 1A to 5A was carried out, and based on the results observed in the above-mentioned test, the sealing property and the unsealing property of each battery packaging material were evaluated in accordance with the same assessment criteria as those in Table 1A. The obtained results are shown in Tables 1Bb to 5Bb.

The results show that in a battery packaging material including in order a first sealant layer containing an acid-modified polyolefin, a second sealant layer containing an acid-modified polyolefin and a third sealant layer containing a polyolefin, when the difference $(T_{m1}-T)$ between the melting point $T_{m1}$ of the first sealant layer and the set temperature T was not less than −10° C. and not more than −5° C., the difference $(T_{m2}-T)$ between the melting point $T_{m2}$ of the second sealant layer and the set temperature T was not less than +5° C. and not more than +10° C., and the difference $(T_{m2}-T)$ between the melting point $T_{m3}$ of the third sealant layer and the set temperature T was not less than −5° C. and not more than +5° C., at least a part of the sealant layer 4 was delaminated from the interface between itself and the metal layer 3, but the sealant layer 4 was formed into a bag shape to keep the inner part hermetically sealed until the ambient temperature reached the set temperature T° C., and 30 minutes after the ambient temperature reached the set temperature T° C., fine cleavages like pinholes were generated in the sealant layer 4 at the part delaminated from the metal layer 3, so that the battery packaging material could be unsealed under gentle conditions. On the other hand, when at least one of the difference $(T_{m1}-T)$ between the melting point $T_{m1}$ of the first sealant layer and the set temperature T, the difference $(T_{m2}-T)$ between the melting point $T_{m2}$ of the second sealant layer and the set temperature T and the difference $(T_{m3}-T)$ between the melting point $T_{m3}$ of the third sealant layer and the set temperature T failed to satisfy the above-mentioned conditions, the battery packaging material turned into an unsealed state before the ambient temperature reached the set temperature T° C., so that cohesive fracture at the heat sealed part or root cutting of the sealant layer occurred, or the battery packaging material could not be turned into an unsealed state even 30 minutes after the ambient temperature reached the set temperature T° C.

TABLE 1Bb

| Set temperature T: 140° C. | | | | | | | | |
|---|---|---|---|---|---|---|---|---|
|  | Examples | | | | | | | |
|  | 1Bb | 2Bb | 3Bb | 4Bb | 5Bb | 6Bb | 7Bb | 8Bb |
| Resin component of first sealant layer | A | A | A | A | B | B | B | B |
| Resin component of second sealant layer | C | C | D | D | C | C | D | D |
| Resin component of third sealant layer | a | a | b | b | a | a | b | b |
| Difference $(T_{m1} - T)$ between melting point $T_{m1}$ of first sealant layer and set temperature T° C. | −10 | −10 | −10 | −10 | −5 | −5 | −5 | −5 |
| Difference $(T_{m2} - T)$ between melting point $T_{m2}$ of second sealant layer and set temperature T° C. | +5 | +5 | +10 | +10 | +5 | +5 | +10 | +10 |
| Difference $(T_{m3} - T)$ between melting point $T_{m3}$ of third sealant layer and set temperature T° C. | −5 | −5 | +5 | +5 | −5 | −5 | +5 | +5 |

TABLE 1Bb-continued

Set temperature T: 140° C.

|  | Examples | | | | | | | |
| --- | --- | --- | --- | --- | --- | --- | --- | --- |
|  | 1Bb | 2Bb | 3Bb | 4Bb | 5Bb | 6Bb | 7Bb | 8Bb |
| Results of evaluation of sealing property and unsealing property | ○ | ○ | ○ | ○ | ○ | ○ | ○ | ○ |

Meanings of the symbols of the resin components in the table are as follows.
A: terpolymer of propylene-ethylene-butene modified with maleic acid (melting point: 130° C.)
B: terpolymer of propylene-ethylene-butene modified with maleic acid (melting point: 135° C.)
C: random copolymer of propylene-ethylene modified with maleic acid (melting point: 145° C.)
D: random copolymer of propylene-ethylene modified with maleic acid (melting point: 150° C.)
a: terpolymer of propylene-ethylene-butene (melting point: 135° C.)
b: random copolymer of propylene-ethylene (melting point: 145° C.)

TABLE 2Bb

Set temperature T: 140° C.

|  | Comparative Examples | | | | | | | |
| --- | --- | --- | --- | --- | --- | --- | --- | --- |
|  | 1Bb | 2Bb | 3Bb | 4Bb | 5Bb | 6Bb | 7Bb | 8Bb |
| Resin component of first sealant layer | A | A | A | A | B | B | B | B |
| Resin component of second sealant layer | C | C | D | D | C | C | D | D |
| Resin component of third sealant layer | c | d | c | d | c | d | c | d |
| Difference ($T_{m1}$ − T) between melting point $T_{m1}$ of first sealant layer and set temperature T° C. | −10 | −10 | −10 | −10 | −5 | −5 | −5 | −5 |
| Difference ($T_{m2}$ − T) between melting point $T_{m2}$ of second sealant layer and set temperature T° C. | +5 | +5 | +10 | +10 | +5 | +5 | +10 | +10 |
| Difference ($T_{m3}$ − T) between melting point $T_{m3}$ of third sealant layer and set temperature T° C. | −12 | +8 | −12 | +8 | −12 | +8 | −12 | +8 |
| Results of evaluation of sealing property and unsealing property | X (B) | X (A) | X (B) | X (A) | X (B) | X (A) | X (B) | X (A) |

Meanings of the symbols of the resin components in the table are as follows.
A: terpolymer of propylene-ethylene-butene modified with maleic acid (melting point: 130° C.)
B: terpolymer of propylene-ethylene-butene modified with maleic acid (melting point: 135° C.)
C: random copolymer of propylene-ethylene modified with maleic acid (melting point: 145° C.)
D: random copolymer of propylene-ethylene modified with maleic acid (melting point: 150° C.)
c: terpolymer of propylene-ethylene-butene (melting point: 128° C.)
d: random copolymer of propylene-ethylene (melting point: 148° C.)

TABLE 3Bb

Set temperature T: 150° C.

|  | Examples | | | | | | | |
| --- | --- | --- | --- | --- | --- | --- | --- | --- |
|  | 9Bb | 10Bb | 11Bb | 12Bb | 13Bb | 14Bb | 15Bb | 16Bb |
| Resin component of first sealant layer | E | E | E | E | C | C | C | C |
| Resin component of second sealant layer | F | F | G | G | F | F | G | G |
| Resin component of third sealant layer | b | b | e | e | b | b | e | e |
| Difference ($T_{m1}$ − T) between melting point $T_{m1}$ of first sealant layer and set temperature T° C. | −10 | −10 | −10 | −10 | −5 | −5 | −5 | −5 |
| Difference ($T_{m2}$ − T) between melting point $T_{m2}$ of second sealant layer and set temperature T° C. | +5 | +5 | +10 | +10 | +5 | +5 | +10 | +10 |
| Difference ($T_{m3}$ − T) between melting point $T_{m3}$ of third sealant layer and set temperature T° C. | −5 | −5 | +5 | +5 | −5 | −5 | +5 | +5 |
| Results of evaluation of sealing property and unsealing property | ○ | ○ | ○ | ○ | ○ | ○ | ○ | ○ |

Meanings of the symbols of the resin components in the table are as follows.
C: random copolymer of propylene-ethylene modified with maleic acid (melting point: 145° C.)
E: random copolymer of propylene-ethylene modified with maleic acid (melting point: 140° C.)
F: random copolymer of propylene-ethylene modified with maleic acid (melting point: 155° C.)
G: homopolymer of propylene modified with maleic acid (melting point: 160° C.)
b: random copolymer of propylene-ethylene-butene (melting point: 145° C.)
e: random copolymer of propylene-ethylene (melting point: 155° C.)

TABLE 4Bb

Set temperature T: 150° C.

| | Comparative Examples | | | | | | | |
|---|---|---|---|---|---|---|---|---|
| | 9Bb | 10Bb | 11Bb | 12Bb | 13Bb | 14Bb | 15Bb | 16Bb |
| Resin component of first sealant layer | E | E | E | E | C | C | C | C |
| Resin component of second sealant layer | F | F | G | G | F | F | G | G |
| Resin component of third sealant layer | f | g | f | g | f | g | f | g |
| Difference ($T_{m1}$ − T) between melting point $T_{m1}$ of first sealant layer and set temperature T° C. | −10 | −10 | −10 | −10 | −5 | −5 | −5 | −5 |
| Difference ($T_{m2}$ − T) between melting point $T_{m2}$ of second sealant layer and set temperature T° C. | +5 | +5 | +10 | +10 | +5 | +5 | +10 | +10 |
| Difference ($T_{m3}$ − T) between melting point $T_{m3}$ of third sealant layer and set temperature T° C. | −12 | +8 | −12 | +8 | −12 | +8 | −12 | +8 |
| Results of evaluation of sealing property and unsealing property | ○ | ○ | ○ | ○ | ○ | ○ | ○ | ○ |

Meanings of the symbols of the resin components in the table are as follows.
C: random copolymer of propylene-ethylene modified with maleic acid (melting point: 145° C.)
E: random copolymer of propylene-ethylene modified with maleic acid (melting point: 140° C.)
F: random copolymer of propylene-ethylene modified with maleic acid (melting point: 155° C.)
G: homopolymer of propylene modified with maleic acid (melting point: 160° C.)
f: terpolymer of propylene-ethylene-butene (melting point: 138° C.)
g: random copolymer of propylene-ethylene (melting point: 158° C.)

TABLE 5Bb

Set temperature T: 160° C.

| | Examples | | | | Comparative Examples | |
|---|---|---|---|---|---|---|
| | 17Bb | 18Bb | 19Bb | 20Bb | 17Bb | 18Bb |
| Resin component of first sealant layer | D | D | F | F | D | F |
| Resin component of second sealant layer | H | H | H | H | H | H |
| Resin component of third sealant layer | e | h | e | h | d | d |
| Difference ($T_{m1}$ − T) between melting point $T_{m1}$ of first sealant layer and set temperature T° C. | −10 | −10 | −5 | −5 | −10 | −5 |
| Difference ($T_{m2}$ − T) between melting point $T_{m2}$ of second sealant layer and set temperature T° C. | +5 | +5 | +5 | +5 | +5 | +5 |
| Difference ($T_{m3}$ − T) between melting point $T_{m3}$ of third sealant layer and set temperature T° C. | −5 | 0 | −5 | 0 | −12 | −12 |
| Results of evaluation of sealing property and unsealing property | ○ | ○ | ○ | ○ | X (B) | X (B) |

Meanings of the symbols of the resin components in the table are as follows.
D: random copolymer of propylene-ethylene modified with maleic acid (melting point: 150° C.)
F: random copolymer of propylene-ethylene modified with maleic acid (melting point: 155° C.)
H: homopolymer of propylene modified with maleic acid (melting point: 165° C.)
d: random copolymer of propylene-ethylene (melting point: 148° C.)
e: random copolymer of propylene-ethylene (melting point: 155° C.)
h: homopolymer of propylene (melting point: 160° C.)

Example 21Bb

A battery packaging material was produced in the same manner as in Examples 1Bb to 20Bb except that the following changes were made.

A maleic acid-modified random copolymer having a MFR of 7 and a melting point of 140° C. was used as a resin for forming the first sealant layer.

A maleic acid-modified block copolymer having a MFR of 5 and a melting point of 160° C. was used as a resin for forming the second sealant layer.

A random copolymer having a MFR of 7 and a melting point of 147° C. was used as a resin for forming the third sealant layer, and further, 0.025% by mass of erucic acid amide was blended as a slipping agent.

The thickness of the first sealant layer was 15 μm, the thickness of the second sealant layer was 15 and the thickness of the third sealant layer was 15 μm.

Example 22Bb

A battery packaging material was produced in the same manner as in Example 21Bb except that the blended amount of erucic acid amide was 0.10% by mass.

Example 23Bb

A battery packaging material was produced in the same manner as in Example 21Bb except that the blended amount of erucic acid amide was 0.12% by mass.

[Evaluation of Insulation Quality to Cracks]

For the battery packaging materials obtained in Examples 21Bb to 23Bb, insulation quality to cracks was evaluated in the same manner as in Examples 13A to 18A. Pass ratios (%) are shown in Table 6Bb.

TABLE 6Bb

|  |  | Example 21Bb | Example 22Bb | Example 23Bb |
|---|---|---|---|---|
| First sealant layer | Thickness (μm) | 15 | 15 | 15 |
| Second sealant layer | Thickness (μm) | 15 | 15 | 15 |
| Third sealant layer | Thickness (μm) | 15 | 15 | 15 |
|  | Amount of slipping agent (% by mass) | 0.025 | 0.10 | 0.12 |
| Ratio (%) of samples judged as having high insulation quality to cracks |  | 65 | 80 | 95 |

From the results shown in Table 6Bb, it has become evident that insulation quality of the battery packaging material to cracks is improved by blending erucic acid amide in the third sealant layer as a slipping agent. It has become evident that particularly in Example 22Bb where the amount of the slipping agent is 0.10% by mass and Example 23Bb where the amount of the slipping agent is 0.12% by mass, insulation quality to cracks is very high.

[Evaluation of Moldability]

For the battery packaging materials obtained in Examples 21Bb to 23Bb, moldability was evaluated in the same manner as in Examples 13A to 18A. The results are shown in Table 7Bb.

TABLE 7Bb

|  |  | Example 21Bb | Example 22Bb | Example 23Bb |
|---|---|---|---|---|
| First sealant layer | Thickness (μm) | 15 | 15 | 15 |
| Second sealant layer | Thickness (μm) | 15 | 15 | 15 |
| Third sealant layer | Thickness (μm) | 15 | 15 | 15 |
|  | Amount of slipping agent (% by mass) | 0.025 | 0.10 | 0.12 |
|  | Lubricant applied to surface | None | None | None |
| depth (mm) of recess portion for which it was determined generation of pinholes could be suppressed |  | 5.65 | 6.80 | 7.35 |

From the results shown in Table 7Bb, it has become evident that in Examples 21Bb to 23Bb where the third sealant layer contains the slipping agent, the recess portion can be formed deeply, and thus moldability is high. It has become evident that particularly in Example 23Bb where the amount of the slipping agent in is 0.12% by mass, generation of pinholes is suppressed even although the recess portion has a very high depth of 7.35 mm, and thus moldability is extremely high.

Examples 1C to 18C and Comparative Examples 1C and 2C

Production of Battery Packaging Material

A metal layer 3 formed of an aluminum foil (thickness: 40 μm) subjected to a chemical conversion treatment at both surfaces was laminated on a base material layer 1 formed of a biaxially stretched nylon film (thickness: 25 μm) using a dry lamination method. Specifically, a two-liquid urethane adhesive (polyol compound and aromatic isocyanate-based compound) was applied to one surface of the aluminum foil, so that an adhesive layer 2 (thickness: 4 μm) was formed on the metal layer 3. The adhesive layer 2 on the metal layer 3 and the base material layer 1 were then bonded to each other under pressure and heating, and an aging treatment was performed at 40° C. for 24 hours to prepare a laminate of base material layer 1/adhesive layer 2/metal layer 3. The chemical conversion treatment of the aluminum foil used as the metal layer 3 was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry weight), and performing baking for 20 seconds under such conditions that the film temperature was 180° C. or higher.

A resin component for forming a first sealant layer and a resin component for forming a second sealant layer were then co-extruded in a molten state onto the laminate on the metal layer 3 side to laminate the first sealant layer and the second sealant layer on the metal layer 3. In Examples 11C and 18C, a multilayer CPP film (unstretched film of PP) including the third sealant layer and the second sealant layer was formed on the first sealant layer by the sand lamination method, and in Examples 13C and 17C, a multilayer CPP (unstretched film of PP) including the third sealant layer, the fourth sealant layer and the second sealant layer was laminated on the first sealant layer by a sand lamination method. The resin components for forming the sealant layers are as shown in Table 2C. For the melting points of the sealant layers, values obtained by performing measurement by a DSC method are shown. Thus, a battery packaging material including a laminate with a base material layer 1, an adhesive layer 2, a metal layer 3 and a sealant layer 4 laminated in this order was obtained.

[Evaluation of Sealing Property and Unsealing Property of Battery Packaging Material]

The battery packaging material obtained in each of Examples 1C to 18C and Comparative Examples 1C to 2C was cut to a size of 80 mm×150 mm, and then cold-molded to a depth of 3.0 mm at 0.4 MPa using a mold (female mold) having an opening size of 35 mm×50 mm and a mold (male mold) corresponding thereto, so that a recess portion was formed at the central part of the battery packaging material.

For the battery packaging material after cold molding, whether or not pinholes were generated on a surface on the base material layer 1 side was visually checked, the result showed that pinholes were not generated in any of the battery packaging materials. Two battery packaging materials after molding were placed one on another with the sealant layers facing each other, and the edge portions at which the sealant layers were superimposed one on another were heat-sealed (at 175° C., 3 seconds, surface pressure: 1.4 MPa) to form the battery packaging material into a case shape having a hermetically sealed internal space (pressure: 1 atm). The battery packaging material thus formed into a case shape was put in an oven that can be evacuated, the oven was set so that the pressure in the oven was 0 atm, and the battery packaging material was heated to 150° C. at a temperature rise rate of 3° C./minute. When the battery packaging material was not unsealed at 150° C., the temperature of 150° C. was maintained. The temperature (delamination temperature) at which delamination occurred between the metal layer and the sealant layer in the battery packaging material, the time until the battery packaging material delaminated after the ambient temperature reached the delamination temperature, the unsealing temperature at which the battery packaging material was unsealed, and the time until the battery packaging material was unsealed after the ambient temperature reached the unsealing temperature were visually checked.

Based on the results observed in the above-mentioned test, the sealing property and the unsealing property of each battery packaging material were evaluated in accordance with the following assessment criteria.

TABLE 1C

|  | Assessment criteria |
|---|---|
| ○ | At least a part of the sealant layer was delaminated, but cleavages were not generated in the sealant layer, and the sealant layer was formed into a bag shape to keep the inner part hermetically sealed until the ambient temperature reached the unsealing temperature.<br>Immediately after the ambient temperature reached the unsealing temperature, fine cleavages like pinholes were generated in the sealant layer at the delaminated part, so that the battery packaging material gently turned into an unsealed state. |
| Δ | The battery packaging material was unsealed in the same mechanism as in the case of the assessment ○, but the battery packaging material was not unsealed until the ambient temperature reached temperature of 150° C., at which bursting/firing might occur due to a short circuit when a battery was assembled, and the battery packaging material was unsealed in 30 minutes or less after the ambient temperature reached the temperature of 150° C. |
| X (A) | Even after the ambient temperature reached the temperature of 150° C., the battery packaging material was kept in a hermetically sealed state, and did not turn into an unsealed state. |
| X (B) | The battery packaging material was rapidly unsealed at the unsealing temperature, so that cohesive fracture at the heat sealed part or root cutting of the sealant layer occurred. |

TABLE 2C

| | First sealant layer | | | Second to fourth sealant layers | | | | | Evaluation of sealing property (Delamination temperature and time until delamination occurs after ambient temperature reaches delamination temperature) | Evaluation of unsealing property (Unsealing temperature and time until unsealing occurs after ambient temperature reaches unsealing temperature) | Assessment of unsealing Properly |
|---|---|---|---|---|---|---|---|---|---|---|---|
| | Resin composition Parenthesized value represents an amount in parts by mass | Melting point (° C.) | Softening point (° C.) | Thickness (μm) | Resin composition Parenthesized value represents an amount in parts by mass or a thickness (μm) of each layer in multiple layers | Melting points of layers (° C.) | Softening points of layers (° C.) | Total thickness (μm) | | | |
| Example 1C | PPa (A) | 160 | 145 | 0.1 | PP (D) | 160 | 150 | 40 | Delaminated 20 minutes after reaching 150° C. | Unsealed 30 minutes after reaching 150° C. | Δ |
| Example 2C | PPa (A) (100) + PP (A) (20) | 160 | 135 | 10 | PP (E) | 155 | 145 | 30 | Delaminated immediately after reaching 148° C. | Unsealed immediately after reaching 150° C. | ◯ |
| Example 3C | PPa (A) (100) + noncrystalline PP (25) | 160 | 130 | 20 | PP (D) single-layer CPP | 160 | 150 | 20 | Delaminated immediately after reaching 145° C. | Unsealed immediately after reaching 150° C. | ◯ |
| Example 4C | PPa (A) (100) + EPR 160 (260) | 160 | 120 | 10 | PP (D) | 160 | 150 | 30 | Delaminated immediately after reaching 145° C. | Unsealed immediately after reaching 150° C. | ◯ |
| Example 5C | PPa (A) (75) + PPa (B) (75) + PP (A) (100) + PP (B) (50) | 152 | 111 | 10 | PP (E) | 155 | 145 | 30 | Delaminated immediately after reaching 142° C. | Unsealed immediately after reaching 148° C. | ◯ |
| Example 6C | PPa (B) | 140 | 130 | 0.1 | PP (D) single-layer CPP | 160 | 150 | 40 | Delaminated immediately after reaching 140° C. | Unsealed 25 minutes after reaching 145° C. | Δ |
| Example 7C | PPa (B) (100) + EPR 140 (1000) | 140 | 125 | 10 | PP (D) | 160 | 150 | 30 | Delaminated immediately after reaching 145° C. | Unsealed immediately after reaching 150° C. | ◯ |
| Example 8C | PPa (B) (100) + PP (B) (50) | 140 | 115 | 20 | PP (D) | 160 | 150 | 20 | Delaminated immediately after reaching 135° C. | Unsealed immediately after reaching 145° C. | ◯ |
| Example 9C | PPa (B) (100) + PP (A) (33) + EPR 140 (33) + PP (C) (45) | 140 | 112 | 20 | PP (D) (100 + PP (E) (100) | 158 | 148 | 20 | Delaminated immediately after reaching 130° C. | Unsealed immediately after reaching 140° C. | ◯ |
| Example 10C | PPa (B) (100) + acid-modified COC (150) | 140 | 100 | 10 | PP (E) | 155 | 145 | 30 | Delaminated immediately after reaching 120° C. | Unsealed immediately after reaching 130° C. | ◯ |
| Example 11C | PPa (B) (100) + noncrystalline PP (500) + EPR 140 (100) + PP (B) (100) | 140 | 86 | 10 | PP (D) (8 μm) + PP (E) (22 μm) multilayer CPP (Third sealant layer/ second sealant layer) | 160/155 | 150/145 | 30 | Delaminated immediately after reaching 119° C. | Unsealed immediately after reaching 124° C. | ◯ |

TABLE 2C-continued

| | First sealant layer | | | Second to fourth sealant layers | | | | Evaluation of sealing property (Delamination temperature and time until delamination occurs after ambient temperature reaches delamination temperature) | Evaluation of unsealing property (Unsealing temperature and time until unsealing occurs after ambient temperature reaches unsealing temperature) | Assessment of unsealing Property |
|---|---|---|---|---|---|---|---|---|---|---|
| | Resin composition Parenthesized value represents an amount in parts by mass | Melting point (° C.) | Softening point (° C.) | Thickness (μm) | Resin composition Parenthesized value represents an amount in parts by mass or a thickness (μm) of each layer in multiple layers | Melting points of layers (° C.) | Softening points of layers (° C.) | Total thickness (μm) | | | |
| Example 12C | PPa (A) (100) + noncrystalline PP (500) | 140 | 80 | 10 | PP (D) | 160 | 150 | 30 | Delaminated immediately after reaching 115° C. | Unsealed immediately after reaching 125° C. | ○ |
| Example 13C | PP (A) (50) + PPa (C) (50) + PP (A) (100) + PP (C) (60) + MDPE (80) | 140 | 95 | 10 | PP (C) (3 μm)/ PP (E) (24 μm)/PP (C) (3 μm) multilayer CPP (Third sealant layer/ fourth sealant layer/ second sealant layer) | 125/155/ 125 | 115/145/ 115 | 30 | Delaminated immediately after reaching 120° C. | Unsealed immediately after reaching 125° C. | ○ |
| Example 14C | PPa (C) | 125 | 115 | 10 | PP (D) | (160) | 150 | 30 | Delaminated immediately after reaching 120° C. | Unsealed immediately after reaching 135° C. | ○ |
| Example 15C | PPa (C) (100) + PP (C) (75) | 125 | 100 | 30 | PP (D) | 160 | 150 | 5 | Delaminated immediately after reaching 115° C. | Unsealed immediately after reaching 125° C. | ○ |
| Example 16C | PPa (C) (100) + MDPE (300) | 125 | 85 | 40 | PP (D) | 160 | 150 | 40 | Delaminated immediately after reaching 110° C. | Unsealed immediately after reaching 120° C. | ○ |
| Example 17C | PPa (C) (100) + acid-modified MDPE (700) | 125 | 80 | 10 | PP (C) (3 μm)/ PP (E) (24 μm)/ PP (C) (3 μm) multilayer CPP (Third sealant layer/ fourth sealant layer/ second sealant layer) | 125/160/ 125 | 115/150/ 115 | 30 | Delaminated immediately after reaching 105° C. | Unsealed immediately after reaching 115° C. | ○ |
| Example 18C | PPa (C) (100) + noncrystalline PP (800) | 125 | 75 | 20 | PP (D) (8 μm) + PP (E) (22 μm) multilayer CPP (Third sealant layer/ second sealant layer) | 160/155 | 150/145 | 30 | Delaminated immediately after reaching 103° C. | Unsealed immediately after reaching 108° C. | ○ |
| Comparative Example 1C | PPa (D) | 160 | 156 | 20 | PP (E) | 155 | 145 | 30 | Neither delaminated nor unsealed 5 hours after reaching 150° C. | | X |
| Comparative Example 2C | EVA | 90 | 50 | 20 | PP (E) | 155 | 145 | 30 | Delaminated immediately after reaching 80° C. | Unsealed immediately after reaching 90° C. | X |

Meanings of the symbols of the resin components in Table 2C are as follows.

PPa(A): maleic acid-modified random polypropylene (melting point: 160° C. and softening point: 145° C.)
PPa(B): maleic acid-modified random polypropylene (melting point: 140° C. and softening point: 130° C.)
PPa(C): maleic acid-modified random polypropylene (melting point: 125° C. and softening point: 115° C.)
PPa(D): maleic acid-modified homopolypropylene (melting point: 160° C. and softening point: 156° C.)
PP(A): random polypropylene (melting point: 160° C. and softening point: 85° C.)
PP(B): random polypropylene (melting point: 140° C. and softening point: 85° C.)
PP(C): random polypropylene (melting point: 125° C. and softening point: 80° C.)
PP(D): homopolypropylene (melting point: 160° C. and softening point: 150° C.)
PP(E): random polypropylene (melting point: 155° C. and softening point: 145° C.)
PP(F): homopolypropylene (melting point: 160° C. and softening point: 156° C.)
Noncrystalline PP: noncrystalline polypropylene (softening point: 70° C.)
EVA: ethylene-vinyl acetate copolymer (melting point: 90° C. and softening point: 50° C.)
EPR140: propylene-based elastomer (melting point: 140° C. and softening point: 125° C.)
EPR160: propylene-based elastomer (melting point: 160° C. and softening point: 110° C.)
Acid-modified COC: acid-modified cyclic olefin copolymer (softening point: 80° C.)
MDPE: medium-density polyolefin (melting point: 125° C. and softening point: 75° C.)
Acid-modified MDPE: carboxylic acid-modified medium-density polyolefin (melting point: 125° C. and softening point: 75° C.)

The obtained results are shown in Table 2C. The results show that in the battery packaging materials of Examples 1C to 18C where the first sealant layer had a melting point of 100 to 160° C. and a softening point of 60 to 150° C., at least a part of the sealant layer was delaminated, but cleavages were not generated, and the sealant layer was formed into a bag shape to keep the inner part hermetically sealed until the ambient temperature reached the unsealing temperature. After the ambient temperature reached the unsealing temperature, fine cleavages like pinholes were generated in the sealant layer at the delaminated part, so that the battery packaging material gently turned into an unsealed state. On the other hand, in the battery packaging material of Comparative Example 1C where the melting point of the first sealant layer satisfied the range of 100 to 160° C., but the softening point of the first sealant layer did not satisfy the range of 60 to 150° C., delamination and unsealing did not occur even after elapse of 5 hours after the ambient temperature reached the temperature of 150° C., and thus there was the concern that if the temperature continuously increased, the separator of the battery element would be melted to cause uncontrollable battery reaction or firing due to a short circuit between the positive electrode and the negative electrode, leading to bursting or explosion of the battery. In Comparative Example 2C where an ethylene-vinyl acetate copolymer (EVA) was used in the first sealant layer, the battery packaging material was rapidly unsealed at a low temperature of 90° C., so that cohesive fracture at the heat sealed part or root cutting of the sealant layer occurred.

Examples 1D to 16D and Comparative Examples 1D and 2D

Production of Battery Packaging Material

A battery packaging material including a laminate with a base material layer 1, an adhesive layer 2, a metal layer 3 and a sealant layer 4 laminated in this order was obtained in the same manner as in Examples 1C to 18C and Comparative Examples 1C and 2C. In Examples 11D and 16D, a multilayer CPP film (unstretched film of PP) including the third sealant layer and the second sealant layer was formed on the first sealant layer by the sand lamination method, and in Examples 13D and 15D, a multilayer CPP (unstretched film of PP) including the third sealant layer, the fourth sealant layer and the second sealant layer was laminated on the first sealant layer by a sand lamination method. The resin components for forming the sealant layers are as shown in Table 1D.

[Evaluation of Sealing Property and Unsealing Property of Battery Packaging Material]

The same procedure as in Examples 1C to 18C and Comparative Examples 1C and 2C was carried out, and based on the results observed in the above-mentioned test, the sealing property and the unsealing property of each battery packaging material were evaluated in accordance with the same assessment criteria as those in Table 1C. The obtained results are shown in Table 1 D.

TABLE 1D

| | First sealant layer | | | | Second to fourth sealant layers | | | | Evaluation of sealing property (Delamination) | Evaluation of unsealing property (Unsealing) | Assessment of unsealing Properly |
|---|---|---|---|---|---|---|---|---|---|---|---|
| | Resin composition Parenthesized value represents an amount in parts by mass | Melting point (° C.) | Softening point (° C.) | Thickness (μm) | Resin composition Parenthesized value represents an amount in parts by mass or a thickness (μm) of each layer in multiple layers | Melting points of layers (° C.) | Softening points of layers (° C.) | Total thickness (μm) | temperature and time until delamination occurs after ambient temperature reaches delamination temperature | temperature and time until unsealing occurs after ambient temperature reaches unsealing temperature | |
| Example 1D | PPa (A) | 160 | 145 | 0.1 | PP (D) | 160 | 150 | 40 | Delaminated 20 minutes after reaching 150° C. | Unsealed 30 minutes after reaching 150° C. | Δ |
| Example 2D | PPa (A) (100) + acid-modified LLDPE (50) | 147 | 117 | 5 | PP (E) | 155 | 145 | 30 | Delaminated immediately after reaching 145° C. | Unsealed immediately after reaching 145° C. | ○ |
| Example 3D | PPa (A) (100) + LDPE (200) | 140 | 128 | 10 | PP (D) single-layer CPP | 160 | 150 | 20 | Delaminated immediately after reaching 145° C. | Unsealed immediately after reaching 150° C. | ○ |
| Example 4D | PPa (A) (100) + acid-modified LDPE (100) + acid-modified COC (100) | 130 | 102 | 20 | PP (D) | 160 | 150 | 20 | Delaminated immediately after reaching 118° C. | Unsealed immediately after reaching 148° C. | ○ |
| Example 5D | PPa (A) (100) + PP (B) (100) + acid-modified MDPE (100) + LDPE (150) | 128 | 94 | 30 | PP (E) | 155 | 145 | 10 | Delaminated immediately after reaching 115° C. | Unsealed immediately after reaching 145° C. | ○ |
| Example 6D | PPa (A) (100) + noncrystalline PP (100) + LDPE (200) + EPR 140 (10) | 121 | 95 | 10 | PP (D) single-layer CPP | 160 | 150 | 30 | Delaminated immediately after reaching 110° C. | Unsealed 25 minutes after reaching 150° C. | Δ |
| Example 7D | PPa (B) | 140 | 130 | 5 | PP (D) | 160 | 150 | 30 | Delaminated immediately after reaching 150° C. | Unsealed 10 minutes after reaching 150° C. | ○ |
| Example 8D | PPa (B) (100) + acid-modified LLDPE (30) | 135 | 114 | 10 | PP (D) | 160 | 150 | 30 | Delaminated immediately after reaching 130° C. | Unsealed immediately after reaching 145° C. | ○ |
| Example 9D | PPa (B) (100) + acid-modified LDPE (200) + acid-modified LLDPE (800) | 118 | 70 | 20 | PP (D) (100) + PP (E) (100) | 158 | 148 | 20 | Delaminated immediately after reaching 105° C. | Unsealed immediately after reaching 140° C. | ○ |

TABLE 1D-continued

| | First sealant layer | | | | Second to fourth sealant layers | | | | Evaluation of sealing property (Delamination temperature and time) | | Evaluation of unsealing property (Unsealing temperature and time) | | Assessment of unsealing Properly |
|---|---|---|---|---|---|---|---|---|---|---|---|---|---|
| | Resin composition Parenthesized value represents an amount in parts by mass | Melting point (° C.) | Softening point (° C.) | Thickness (μm) | Resin composition Parenthesized value represents an amount in parts by mass or a thickness (μm) of each layer in multiple layers | Melting points of layers (° C.) | Softening points of layers (° C.) | Total thickness (μm) | until delamination occurs after ambient temperature reaches delamination temperature | | until unsealing occurs after ambient temperature reaches unsealing temperature | | |
| Example 10D | PPa (B) (100) + PP (C) (50) + EPR 140 (100) + LDPE (200) | 121 | 101 | 10 | PP (E) | 155 | 145 | 30 | Delaminated immediately after reaching 110° C. | | Unsealed immediately after reaching 130° C. | | ○ |
| Example 11D | PPa (B) (100) + LDPE (400) + acid-modified HDPE (200) + noncrystalline PP (100) | 114 | 95 | 10 | PP (D) (8 μm) + PP (E) (22 μm) multilayer CPP (Third sealant layer/second sealant layer) | 160/155 | 150/145 | 30 | Delaminated immediately after reaching 115° C. | | Unsealed immediately after reaching 124° C. | | ○ |
| Example 12D | PPa (B) (50) + PPa (C) (50) + PP (D) (50) + acid-modified MDPE (200) | 135 | 101 | 10 | PP (D) | 160 | 150 | 30 | Delaminated immediately after reaching 125° C. | | Unsealed immediately after reaching 135° C. | | ○ |
| Example 13D | PPa (C): | 125 | 115 | 30 | PP (C) (3 μm)/PP (E) (24 μm)/PP (C) (3 μm) multilayer CPP (Third sealant layer/second sealant layer/fourth sealant layer) | 125/155/125 | 115/145/115 | 30 | Delaminated immediately after reaching 120° C. | | Unsealed immediately after reaching 125° C. | | ○ |
| Example 14D | PPa (C) (100) + acid-modified LDPE (50) | 117 | 103 | 40 | PP (D) | 160 | 150 | 5 | Delaminated immediately after reaching 115° C. | | Unsealed immediately after reaching 135° C. | | ○ |
| Example 15D | PPa (C) (100) + acid-modified LLDPE (600) + MDPE (50) + HDPE (20) | 121 | 70 | 10 | PP (C) (3 μm)/PP (D) (24 μm) multilayer CPP (Third sealant layer/fourth sealant layer/second sealant layer) | 125/160/125 | 115/150/115 | 30 | Delaminated immediately after reaching 105° C. | | Unsealed immediately after reaching 125° C. | | ○ |
| Example 16D | PPa (C) (100) + acid-modified MDPE (100) + PP (C) (100) + LDPE (200) | 115 | 86 | 20 | PP (D) (8 μm) + PP (E) (22 μm) multilayer CPP (Third sealant layer/second sealant layer) | 160/155 | 150/145 | 30 | Delaminated immediately after reaching 110° C. | | Unsealed immediately after reaching 120° C. | | ○ |
| Comparative Example 1D | PPa (D) | 160 | 156 | 20 | PP (E) | 155 | 145 | 20 | Neither delaminated nor unsealed 5 hours after reaching 150° C. | | | | X |
| Comparative Example 2D | EVA | 90 | 50 | 20 | PP (E) | 155 | 145 | 20 | Delaminated immediately after reaching 80° C. | | Unsealed immediately after reaching 90° C. | | X |

Meanings of the symbols of the resin components in Table 1D are as follows.

PPa(A): maleic acid-modified random polypropylene (melting point: 160° C. and softening point: 145° C.)
PPa(B): maleic acid-modified random polypropylene (melting point: 140° C. and softening point: 130° C.)
PPa(C): maleic acid-modified random polypropylene (melting point: 125° C. and softening point: 115° C.)
PPa(D): maleic acid-modified homopolypropylene (melting point: 160° C. and softening point: 156° C.)
PP(A): random polypropylene (melting point: 160° C. and softening point: 85° C.)
PP(B): random polypropylene (melting point: 140° C. and softening point: 85° C.)
PP(C): random polypropylene (melting point: 125° C. and softening point: 80° C.)
PP(D): homopolypropylene (melting point: 160° C. and softening point: 150° C.)
PP(E): random polypropylene (melting point: 155° C. and softening point: 145° C.)
PP(F): homopolypropylene (melting point: 160° C. and softening point: 156° C.)
EVA: ethylene-vinyl acetate copolymer (melting point: 90° C. and softening point: 50° C.)
EPR140: propylene-based elastomer (melting point: 160° C. and softening point: 110° C.) Noncrystalline PP: noncrystalline polypropylene (softening point: 70° C.)
Acid-modified COC: acid-modified cyclic olefin copolymer (softening point: 80° C.)
LDPE: low-density polyolefin (melting point: 100° C. and softening point: 80° C.)
Acid-modified LDPE: carboxylic acid-modified low-density polyolefin (melting point: 100° C. and softening point: 80° C.)
LLDPE: linear low-density polyolefin (melting point: 120° C. and softening point: 60° C.)
Acid-modified LLDPE: carboxylic acid-modified linear low-density polyolefin (melting point: 120° C. and softening point: 60° C.)
MDPE: medium-density polyolefin (melting point: 125° C. and softening point: 75° C.)
Acid-modified MDPE: carboxylic acid-modified medium-density polyolefin (melting point: 125° C. and softening point: 75° C.)
HDPE: medium-density polyolefin (melting point: 130° C. and softening point: 120° C.)
Acid-modified HDPE: carboxylic acid-modified medium-density polyolefin (melting point: 130° C. and softening point: 120° C.)

The results show that in the battery packaging materials of Examples 1D to 16D where the first sealant layer contained at least one of polyethylene and acid-modified polyethylene in addition to an acid-modified polyolefin, at least a part of the sealant layer was delaminated, but cleavages were not generated, and the sealant layer was formed into a bag shape to keep the inner part hermetically sealed until the ambient temperature reached the unsealing temperature. After the ambient temperature reached the unsealing temperature, fine cleavages like pinholes were generated in the sealant layer at the delaminated part, so that the battery packaging material gently turned into an unsealed state. On the other hand, in the battery packaging material of Comparative Example 1 where the first sealant layer contained an acid-modified polyolefin, but did not contain either polyethylene nor acid-modified polyethylene, delamination and unsealing did not occur even after elapse of 5 hours after the ambient temperature reached the temperature of 150° C., and thus there was the concern that if the temperature continuously increased, the separator of the battery element would be melted to cause uncontrollable battery reaction or firing due to a short circuit between the positive electrode and the negative electrode, leading to bursting or explosion of the battery. In Comparative Example 2 where an ethylene-vinyl acetate copolymer (EVA) was used in the first sealant layer, the battery packaging material was rapidly unsealed at a low temperature of 90° C., so that cohesive fracture at the heat sealed part or root cutting of the sealant layer occurred.

Examples 1E to 13E and Comparative Examples 1E to 5E

Production of Battery Packaging Material

A battery packaging material including a laminate with a base material layer 1, an adhesive layer 2, a metal layer 3 and a sealant layer 4 laminated in this order was obtained in the same manner as in Examples 1C to 18C and Comparative Examples 1C and 2C. In Examples 9E and 13E, a multilayer CPP film (unstretched film of PP) including the third sealant layer and the second sealant layer was formed on the first sealant layer by the sand lamination method, and in Examples 12E and Comparative Example 3E, a multilayer CPP (unstretched film of PP) including the third sealant layer, the fourth sealant layer and the second sealant layer was laminated on the first sealant layer by a sand lamination method. The resin components for forming the sealant layers are as shown in Table 1E.

[Evaluation of Sealing Property and Unsealing Property of Battery Packaging Material]

The same procedure as in Examples 1C to 18C and Comparative Examples 1C and 2C was carried out, and based on the results observed in the above-mentioned test, the sealing property and the unsealing property of each battery packaging material were evaluated in accordance with the same assessment criteria as those in Table 1C. The obtained results are shown in Table 1E.

[Measurement of Sealing Strength]

Battery packaging materials were placed one on another with the sealant layers facing each other, then heat-sealed at 190° C. and a surface pressure of 1.0 MPa for 3 seconds, and then left standing for 2 minutes at 25° C., the sealant layer at the heat-sealed part was then delaminated over a length of 10 mm at a speed of 30 mm/minute using a tensile tester (AGS-50D (trade name) manufactured by Shimadzu Corporation), and the maximum strength at the time of delamination was defined as a sealing strength (N/15 mm). The results are shown in Table 1E.

[Measurement of Lamination Strength]

At 25° C., each of the above-mentioned cut battery packaging materials was delaminated at the interface between the metal layer and the sealant layer over a length of 10 mm at a speed of 50 mm/minute using a tensile tester (AGS-50D (trade name) manufactured by Shimadzu Corporation), and the maximum strength at the time of delamination was defined as a lamination strength (N/15 mm). The results are shown in Table 1E.

TABLE 1E

| | First sealant layer | | | | Second to fourth sealant layers | | | | Evaluation of sealing property (Delamination) | | Evaluation of unsealing property (Unsealing | | Sealing strength (N/15 mm) | Lamination strength (N/15 mm) |
|---|---|---|---|---|---|---|---|---|---|---|---|---|---|---|
| | Resin composition Parenthesized value represents an amount in parts by mass | Melting point (° C.) | Softening point (° C.) | Thickness (μm) | Resin composition Parenthesized value represents an amount in parts by mass or a thickness (μm) of each layer in multiple layers | Melting points of layers (° C.) | Softening points of layers (° C.) | Total thickness (μm) | temperature and time until delamination occurs | after ambient temperature reaches delamination temperature) | temperature and time until unsealing occurs | after ambient temperature reaches unsealing temperature) | Assessment of unsealing property | | |
| Example 1E | PPa (A) (100) + acid-modified EVA (B) (10) | 154 | 139 | 5 | PP (E) | 155 | 145 | 30 | Delaminated 15 minutes after reaching 150° C. | Delaminated 25 minutes after reaching 150° C. | △ | 90 | 8 |
| Example 2E | PPa (A) (100) + EVA (B) (20) + acid-modified LLDPE (20) | 144 | 124 | 10 | PP (D) single-layer CPP | 160 | 150 | 20 | Delaminated 10 minutes after reaching 150° C. | Delaminated 15 minutes after reaching 150° C. | △ | 95 | 8 |
| Example 3E | PPa (A) (100) + EVA (B) (100) + acrylic resin (50) | 125 | 100 | 20 | PP (D) | 160 | 150 | 20 | Unsealed immediately after reaching 135° C. | Unsealed immediately after reaching 145° C. | ○ | 100 | 9 |
| Example 4E | PPa (A) (100) + EVA (100) + noncrystalline PP (200) + EPR 140 (50) | 128 | 93 | 10 | PP (D) single-layer CPP | 160 | 150 | 30 | Delaminated immediately after reaching 110° C. | Unsealed immediately after reaching 125° C. | ○ | 90 | 9 |
| Example 5E | PPa (A) (100) + acid-modified EVA (A) (50) + LLDPE (200) + LDPE (150) | 121 | 88 | 30 | PP (E) | 155 | 145 | 10 | Delaminated immediately after reaching 115° C. | Unsealed immediately after reaching 125° C. | ○ | 100 | 8 |
| Example 6E | PPa (B) (100) + acid-modified EVA (A) (10) + acid-modified LLDPE (50) | 131 | 103 | 10 | PP (D) | 160 | 150 | 30 | Delaminated immediately after reaching 130° C. | Unsealed immediately after reaching 140° C. | ○ | 90 | 8 |
| Example 7E | PPa (B) (100) + acrylic resin (20) + acid-modified LDPE (50) | 127 | 109 | 20 | PP (D) (100) + PP (E) (100) | 158 | 148 | 20 | Delaminated immediately after reaching 120° C. | Unsealed immediately after reaching 135° C. | ○ | 90 | 9 |
| Example 8E | PPa (B) (100) + EVA (C) (20) + TP (50) + LDPE (200) | 113 | 95 | 10 | PP (E) | 155 | 145 | 30 | Delaminated immediately after reaching 110° C. | Unsealed immediately after reaching 125° C. | ○ | 100 | 8 |
| Example 9E | PPa (B) (100) + EVA (B) (400) + styrene polymer (5) + noncrystalline PP (100) | 100 | 87 | 10 | PP (D) (8 μm) + PP (E) (22 μm) multilayer CPP (Third sealant layer/second sealant layer) | 160/155 | 150/145 | 30 | Delaminated immediately after reaching 115° C. | Unsealed immediately after reaching 120° C. | ○ | 100 | 9 |
| Example 10E | PPa (B) (100) + EVA (B) (400) + acrylic resin (5) + styrene polymer (5) | 99 | 90 | 10 | PP (D) | 160 | 150 | 30 | Delaminated immediately after reaching 105° C. | Unsealed immediately after reaching 115° C. | ○ | 95 | 9 |
| Example 11E | PPa (C) (100) + EVA (A) (3) + EVA (B) (3) + EVA (C)(3) | 122 | 111 | 30 | PP (D) | 160 | 150 | 5 | Delaminated immediately after reaching 115° C. | Unsealed immediately after reaching 125° C. | ○ | 80 | 8 |

TABLE 1E-continued

| | First sealant layer | | | | Second to fourth sealant layers | | | | | Evaluation of sealing property (Delamination) | | Evaluation of unsealing property (Unsealing) | | Assessment of unsealing property | Sealing strength (N/15 mm) | Lamination strength (N/15 mm) |
|---|---|---|---|---|---|---|---|---|---|---|---|---|---|---|---|---|
| | Resin composition Parenthesized value represents an amount in parts by mass | Melting point (° C.) | Softening point (° C.) | Thickness (µm) | Resin composition Parenthesized value represents an amount in parts by mass or a thickness (µm) of each layer in multiple layers | Melting points of layers (° C.) | Softening points of layers (° C.) | Total thickness (µm) | after ambient temperature reaches delamination temperature | temperature and time until delamination occurs | after ambient temperature reaches unsealing temperature | temperature and time until unsealing occurs | | | |
| Example 12E | PPa (C) (100) + EVA (C) (200) + LLDPE (200) + acrylic resin (20) | 122 | 73 | 10 | PP (C) (3 µm)/PP (D) (24 µm)/PP (C) (3 µm) multilayer CPP (Third sealant layer/fourth sealant layer/second sealant layer) | 125/160/125 | 115/150/115 | 30 | Delaminated immediately after reaching 105° C. | Unsealed immediately after reaching 115° C. | | | ○ | 90 | 9 |
| Example 13E | PPa (C) (100) + acid-modified EVA (C) (1000) + PP (C) (100) + LDPE (200) | 113 | 68 | 10 | PP (D) (8 µm) + PP (E) (22 µm) multilayer CPP (Third sealant layer/second sealant layer) | 160/155 | 150/145 | 30 | Delaminated immediately after reaching 100° C. | Unsealed immediately after reaching 110° C. | | | ○ | 90 | 8 |
| Comparative Example 1E | PPa (A) | 160 | 145 | 0.1 | PP (D) | 160 | 150 | 40 | Delaminated 20 minutes after reaching 150° C. | Unsealed 30 minutes after reaching 150° C. | | | △ | 80 | 6 |
| Comparative Example 2E | PPa (B) | 140 | 130 | 5 | PP (D) | 160 | 150 | 30 | Delaminated 10 minutes after reaching 150° C. | Unsealed 20 minutes after reaching 150° C. | | | △ | 70 | 6 |
| Comparative Example 3E | PPa (C): | 125 | 115 | 10 | PP (C) (3 µm)/PP (E) (24 µm)/PP (C) (3 µm) multilayer CPP (Third sealant layer/fourth sealant layer/second sealant layer) | 125/155/125 | 115/145/115 | 30 | Delaminated immediately after reaching 120° C. | Unsealed immediately after reaching 135° C. | | | ○ | 75 | 6 |
| Comparative Example 4E | PPa (D) | 160 | 156 | 20 | PP (E) | 155 | 145 | 20 | Neither delaminated nor unsealed 5 hours after reaching 150° C. | | | | X | 75 | 6 |
| Comparative Example 5E | EVA (A) | 90 | 50 | 20 | PP (E) | 155 | 145 | 20 | Delaminated immediately after reaching 80° C. | Unsealed immediately after reaching 90° C. | | | X | 60 | 5 |

Meanings of the symbols of the resin components in Table 1E are as follows.

PPa(A): maleic acid-modified random polypropylene (melting point: 160° C. and softening point: 145° C.)
PPa(B): maleic acid-modified random polypropylene (melting point: 140° C. and softening point: 130° C.)
PPa(C): maleic acid-modified random polypropylene (melting point: 125° C. and softening point: 115° C.)
PPa(D): maleic acid-modified homopolypropylene (melting point: 160° C. and softening point: 156° C.)
PP(A): random polypropylene (melting point: 160° C. and softening point: 85° C.)
PP(B): random polypropylene (melting point: 140° C. and softening point: 85° C.)
PP(C): random polypropylene (melting point: 125° C. and softening point: 80° C.)
PP(D): homopolypropylene (melting point: 160° C. and softening point: 150° C.)
PP(E): random polypropylene (melting point: 155° C. and softening point: 145° C.)
PP(F): homopolypropylene (melting point: 160° C. and softening point: 156° C.)
EPR140: propylene-based elastomer (melting point: 140° C. and softening point: 125° C.)
EVA (A): ethylene-vinyl acetate copolymer (melting point: 90° C. and softening point: 50° C.)
Acid-modified EVA (A): carboxylic acid-modified ethylene-vinyl acetate copolymer (melting point: 90° C. and softening point: 50° C.)
EVA (B): ethylene-vinyl acetate copolymer (melting point: 90° C. and softening point: 80° C.)
Acid-modified EVA (B): carboxylic acid-modified ethylene-vinyl acetate copolymer (melting point: 90° C. and softening point: 80° C.)
EVA (C): ethylene-vinyl acetate copolymer (melting point: none and softening point: 60° C.)
Acid-modified EVA (C): carboxylic acid-modified ethylene-vinyl acetate copolymer (melting point: none and softening point: 60° C.)
Acrylic resin: polymethacrylic acid ester (melting point: none and softening point: 80° C.)
TP: terpene phenol copolymer (melting point: none and softening point: 100° C.)
Styrene polymer: atactic polystyrene (melting point: none and softening point: 100° C.)
Noncrystalline PP: noncrystalline polypropylene (melting point: none and softening point: 70° C.)
LDPE: low-density polyolefin (melting point: 100° C. and softening point: 80° C.)
Acid-modified LDPE: carboxylic acid-modified low-density polyolefin (melting point: 100° C. and softening point: 80° C.)
LLDPE: linear low-density polyolefin (melting point: 120° C. and softening point: 60° C.)
Acid-modified LLDPE: carboxylic acid-modified linear low-density polyolefin (melting point: 120° C. and softening point: 60° C.)

The results show that in the battery packaging materials of Examples 1E to 13E where in addition to an acid-modified polyolefin, an ethylene-vinyl acetate copolymer, an acid-modified ethylene-vinyl acetate copolymer, noncrystalline polypropylene, an acrylic resin or a styrene polymer as an adhesive resin was used in the first sealant layer, at least a part of the sealant layer was delaminated, but cleavages were not generated, and the sealant layer was formed into a bag shape to keep the inner part hermetically sealed until the ambient temperature reached the unsealing temperature. After the ambient temperature reached the unsealing temperature, fine cleavages like pinholes were generated in the sealant layer at the delaminated part, so that the battery packaging material gently turned into an unsealed state. Further, the battery packaging materials of Examples 1E to 13E had high sealing strength and lamination strength. On the other hand, the battery packaging materials of Comparative Examples 1E to 3E where the first sealant layer contained an acid-modified polyolefin, but an adhesive resin as described above was not used had low sealing strength and lamination strength. In the battery packaging material of Comparative Example 4 where an acid-modified polyolefin having a high melting point was used, and an adhesive resin as described above was not used, delamination and unsealing did not occur even after elapse of 5 hours after the ambient temperature reached the temperature of 150° C., and thus there was the concern that if the temperature continuously increased, the separator of the battery element would be melted to cause uncontrollable battery reaction or firing due to a short circuit between the positive electrode and the negative electrode, leading to bursting or explosion of the battery. In Comparative Example 5 where only an ethylene-vinyl acetate copolymer was used in the first sealant layer, the battery packaging material was rapidly unsealed at a low temperature of 90° C., so that cohesive fracture at the heat sealed part or root cutting of the sealant layer occurred.

Examples 1F to 6F and Comparative Examples 1F to 5F

Production of Battery Packaging Material

A laminate with a base material layer 1, an adhesive layer 2 and a metal layer 3 laminated in this order was obtained in the same manner as in Examples 1C to 18C and Comparative Examples 1C and 2C.

A resin composition containing an acid-modified polyolefin resin and a curing agent as described in Table 2F was then applied in a thickness of 5 μm, and dried for forming an insulating layer 6 on the laminate on the metal layer 3 side. Next, a resin intended to form a first sealant layer 4a and having a melting point as described in Table 2F was extruded in a molten state from above the dried resin composition to laminate the first sealant layer 4a (thickness: 30 μm) on the insulating layer 6. Further, the obtained laminate was heated at 190° C. for 2 minutes to obtain a battery packaging material including a laminate with a base material layer 1, an adhesive layer 2, a metal layer 3, an insulating layer 6 and a first sealant layer 4a laminated in this order. For the melting points of the resins for forming the insulating layer 6 and the first sealant layer 4a, values obtained by performing measurement by a DSC method are shown.

<Evaluation of Sealing Property and Unsealing Property of Battery Packaging Material>

The same procedure as in Examples 1A to 12A and Comparative Examples 1A to 5A was carried out, and based on the results observed in the above-mentioned test, the sealing property and the unsealing property of each battery packaging material were evaluated in accordance with the following assessment criteria. The results are shown in Table 2F.

TABLE 1F

| | Assessment criteria |
|---|---|
| ○ | At least a part of the insulating layer 6 was delaminated from the interface between itself and the metal layer 3, but cleavages were not generated in the insulating layer 6 and the first sealant layer 4a, and the first sealant layer 4a was formed into a bag shape to keep the inner part hermetically sealed until the ambient temperature reached the set temperature T° C. In 30 minutes or less after the ambient temperature reached the set temperature T° C., fine cleavages like pinholes were generated in the insulating layer 6 and the first sealant layer 4a at the part delaminated from the metal layer 3, so that the battery packaging material turned into an unsealed state. |
| X | The battery packaging material turned into an unsealed state before the ambient temperature reached the set temperature T° C., so that cohesive fracture at the heat sealed part or root cutting of the sealant layer occurred. Otherwise, even 30 minutes after the ambient temperature reached the set temperature T° C., the battery packaging material was kept in a hermetically sealed state, and did not turn into an unsealed state. |

<Evaluation of Durability>

The battery packaging material obtained in each of Examples 1F to 6F was cut to a size of 60 mm (MD direction, longitudinal direction)×150 mm (TD direction, lateral direction). Next, the cut battery packaging material was folded in half with the sealant layers facing each other in the TD direction, and heat-sealed on one side with the sealant layers facing each other in the TD direction and on one of the sides in the MD direction to prepare a bag-shaped battery packaging material opened at one side in the TD direction. As conditions for heat-sealing, the temperature was 190° C., the surface pressure was 1.0 MPa, and the heating and pressurization time was 3 seconds. Next, 3 g of an electrolytic solution was injected from the opening, and the opening was heat-sealed to a width of 7 mm under the same conditions as described above. The electrolytic solution was obtained by mixing lithium phosphate hexafluoride with a solution formed by mixing ethylene carbonate, diethyl carbonate and dimethyl carbonate at a volume ratio of 1:1:1. Next, the battery packaging material was left standing in a thermostatic bath at 85° C. for 24 hours while a part of the battery packaging material where the opening was situated faced upward.

Next, each battery packaging material was taken out from the thermostatic bath, and the battery packaging material was unsealed to remove the electrolytic solution. Next, the folded part of the battery packaging material was cut to a strip with a width of 15 mm to obtain a test piece. The first sealant layer 4a and the metal layer 3 of the obtained test piece were drawn at a speed of 50 mm/minute using a tensile tester (AGS-50D (trade name) manufactured by Shimadzu Corporation), so that the peeling strength (N/15 mm) of the test piece was measured (peeling strength after durability test). For a test piece obtained by cutting the battery packaging material obtained in each of Examples 1F to 6F to a width of 15 mm, the peeling strength was measured (peeling strength before durability test) in the same manner as described above. The results are shown in Table 2F.

<Evaluation of Insulation Quality to Caught Contaminants)

The battery packaging material obtained in each of Examples 1F to 6F was cut to a size of 40 mm (width)×100 mm (length) to obtain a test piece. Next, the test piece was folded with the short sides facing each other, and disposed in such a manner that the surfaces of the first sealant layers 4a of the test piece faced each other. Next, a wire of 25 μmφ was inserted between the mutually facing surfaces of the first sealant layers 4a. Next, in this state, the sealant layers were heat-sealed with each other in a direction orthogonal to the length direction of the battery packaging material using a heat sealer including a flat heat plate having a width of 7 mm on both upper and lower sides. Next, a terminal of a tester was connected to each of the surfaces of base material layer on both sides in such a manner that a part of the battery packaging material where the wire was inserted was situated at the center. Next, a voltage of 100 V was applied between the testers, and a time (seconds) until a short circuit occurred was measured. For three battery packaging materials (n=3) obtained in each of Examples 1F to 6F, a time (seconds) until a short circuit occurred was measured. ○ was given when the time was 10 seconds or more for all the three battery packaging materials, and x was given when the time was less than or equal to 10 seconds for at least one of the three battery packaging materials. The results are shown in Table 2F.

<Evaluation of Insulation Quality to Cracks>

The battery packaging material obtained in each of Examples 1F to 6F was cut to a sheet piece of 60 mm (MD direction)×60 mm (TD direction, lateral direction). Next, the sheet piece was folded in half in the MD direction (longitudinal direction), and heat-sealed at opposite sides to a width of 7 mm to prepare a pouch-type outer packaging having an opening at one side. Next, a lithium ion battery body including a cell was enclosed in the obtained outer packaging from the opened side in such a manner that a metal terminal was drawn to outside, an electrolytic solution was put in the outer packaging, and the opening was hermetically sealed to a width of 3 mm while the metal terminal was sandwiched, thereby preparing a lithium ion battery. As conditions for performing heat-sealing at this time, the surface pressure was 2.0 MPa, the sealing temperature was 170° C., and the sealing time was 5.0 seconds. Next, a test for evaluation of insulation quality to cracks was then conducted using an impulse application system (lithium ion battery insulation tester manufactured by Nippon Technart Inc.). Five lithium ion batteries as described above were provided for each of Examples 1F to 6F, and an impulse voltage of 100 V was applied between a negative electrode terminal of each lithium ion battery and an aluminum foil. ○ was given when there was no voltage drop after 99 msec in all the five lithium ion batteries, and x was given when there was a voltage drop after 99 msec in at least one of the five lithium ion batteries. The results are shown in Table 2F.

TABLE 2F

| | Insulating layer | | | | | | First sealant layer |
|---|---|---|---|---|---|---|---|
| | Acid-modified polyolefin-based resin | | | | | | |
| | Molecular weight (weight average) | Melting point $T_A$ (° C.) | Polyolefin-based resin | Ratio of maleic anhydride (% by mass) | Ratio of acrylic acid ester (% by mass) | Curing agent | Modified polypropylene/curing agent (mass ratio) | Melting point $T_1$ (° C.) of polyolefin-based resin |
| Comparative Example 1F | 50000 | 130 | Ethylene-propylene | 6 | 5 | Oxazoline | 10/1 | 128 |
| Comparative Example 2F | 50000 | 130 | Ethylene-propylene | 6 | 5 | Oxazoline | 10/1 | 148 |
| Example 1F | 50000 | 130 | Ethylene-propylene | 6 | 5 | Oxazoline | 10/1 | 135 |
| Example 2F | 50000 | 130 | Ethylene-propylene | 6 | 5 | Oxazoline | 10/1 | 145 |
| Comparative Example 3F | 130000 | 140 | Propylene | 5 | 4 | MDI | 10/1 | 138 |
| Comparative Example 4F | 130000 | 140 | Propylene | 5 | 4 | MDI | 10/1 | 158 |
| Example 3F | 130000 | 140 | Propylene | 5 | 4 | MDI | 10/1 | 145 |
| Example 4F | 130000 | 140 | Propylene | 5 | 4 | MDI | 10/1 | 155*1 |
| Example 5F | 130000 | 140 | Propylene | 5 | 4 | MDI | 10/1 | 155 |
| Comparative Example 5F | 40000 | 150 | Propylene | 3 | 3 | Oxazoline | 10/1 | 148 |
| Example 6F | 40000 | 150 | Propylene | 3 | 3 | Oxazoline | 10/1 | 155 |

| | | | Evaluation of durability | | Evaluation of insulation quality | | | Evaluation of unsealing property |
|---|---|---|---|---|---|---|---|---|
| | $T_A - T$ (° C.) | $Tm_1 - T$ (° C.) | Peeling strength before durability test (N/15 mm) | Peeling strength after durability test (N/15 mm) | Evaluation of insulation quality to caught contaminants | Evaluation of insulation quality to cracks | Set temperature T (° C.) | Results of evaluation of sealing property and unsealing property |
| Comparative Example 1F | −10 | −12 | | | | | 140 | X |
| Comparative Example 2F | −10 | 8 | | | | | 140 | X |
| Example 1F | −10 | −5 | 8.7 | 9.1 | ○ | ○ | 140 | ○ |
| Example 2F | −10 | 5 | 8.5 | 8.3 | ○ | ○ | 140 | ○ |
| Comparative Example 3F | −10 | −12 | | | | | 150 | X |
| Comparative Example 4F | −10 | 8 | | | | | 150 | X |
| Example 3F | −10 | −5 | 7.7 | 8.4 | ○ | ○ | 150 | ○ |
| Example 4F | −10 | 5 | 8.2 | 8.0 | ○ | ○ | 150 | ○ |
| Example 5F | −10 | 5 | 7.2 | 7.5 | ○ | ○ | 150 | ○ |
| Comparative Example 5F | −10 | −12 | | | | | 160 | X |
| Example 6F | −10 | −5 | 6.8 | 6.5 | ○ | ○ | 160 | ○ |

In Examples 1F to 6F where in a battery packaging material including in order an insulating layer formed of a resin composition containing an acid-modified polyolefin resin and a curing agent, and a first sealant layer 4a containing a polyolefin resin, the difference ($T_A$−T) between the melting point $T_A$ of the insulating layer and the set temperature T was not less than −10° C. and not more than −5° C., and the difference ($T_{m1}$−T) between the melting point $T_{m1}$ of the first sealant layer 4a and the set temperature T was not less than −5° C. and not more than +5° C., at least a part of the insulating layer 6 was delaminated from the interface between itself and the metal layer 3, but the insulating layer 6 and the first sealant layer 4a were formed into a bag shape to keep the inner part hermetically sealed until the ambient temperature reached the set temperature T° C., and 30 minutes after the ambient temperature reached the set temperature T° C., fine cleavages like pinholes were generated in the insulating layer 6 and the first sealant layer 4a at the part delaminated from the metal layer 3, so that the battery packaging material could be unsealed under gentle conditions. On the other hand, in Comparative Examples 1F to 6F where the difference ($T_{m1}$−T) between the melting point $T_{m1}$ of the first sealant layer 4a and the set temperature T failed to satisfy the range of not less than −5° C. and not more than +5° C., the battery packaging material turned into an unsealed state before the ambient temperature reached the set temperature T° C., so that cohesive fracture at the heat sealed part or root cutting of the sealant layer occurred, or the battery packaging material could not be turned into an unsealed state even 30 minutes after the ambient temperature reached the set temperature T° C.

On the other hand, the battery packaging material of Examples 1F to 6F, each of which included an insulating layer formed of a resin composition containing an acid-modified polyolefin resin and a curing agent, had high insulation performance to both caught contaminants and cracks, had a reduced change in peeling strength before and after the durability test, and were excellent in durability.

Examples 7F to 15F and Comparative Examples 6F to 12F

Production of Battery Packaging Material

A laminate of base material layer 1/adhesive layer 2/metal layer 3 was prepared in the same manner as in Example 1F. A resin composition containing a modified polyolefin resin and a curing agent as described in Table 3F was then applied in a thickness of 5 μm, and dried for forming an insulating layer on the laminate on the metal layer 3 side. In Examples 7F, 8F, 10F, 13F to 15F and Comparative Examples 6F to 12F, a resin for forming the second sealant layer 4b and a resin for forming the first sealant layer were then co-extruded in a molten state from above the dried resin composition to laminate the second sealant layer (thickness: 20 μm) and the first sealant layer 4a (thickness: 10 μm) on the insulating layer. Further, the obtained laminate was heated at 190° C. for 2 minutes to obtain a battery packaging material including a laminate with a base material layer 1, an adhesive layer 2, a metal layer 3, an insulating layer 6, a second sealant layer 4b and a first sealant layer 4a laminated in this order.

On the other hand, in Example 9F, a resin for forming the second sealant layer 4b (thickness: 10 μm) was applied from above the dried resin composition of the insulating layer, and dried, resin for forming the first sealant layer 4a was then melt-extruded to prepare a single-layer film, this film was superimposed on the second sealant layer 4b, and press-bonded at 160° C., and the press-bonded product was then heated in an oven at 190° C. for 2 minutes to laminate the first sealant layer (thickness: 20 μm) on the second sealant layer 4b, thereby obtaining a battery packaging material including a laminate with a base material layer 1, an adhesive layer 2, a metal layer 3, an insulating layer 6, a second sealant layer 4b and a first sealant layer 4a laminated in this order.

In Example 11F, a resin for forming the second sealant layer 4b was applied from above the dried resin composition of the insulating layer, and dried, a resin for forming the first sealant layer 4a was then melt-extruded to prepare a single-layer film, this film was superimposed on the second sealant layer 4b, and press-bonded at 160° C., and the press-bonded product was then heated in an oven at 190° C. for 2 minutes to laminate the first sealant layer (thickness: 20 μm) on the second sealant layer 4b, thereby obtaining a battery packaging material including a laminate with a base material layer 1, an adhesive layer 2, a metal layer 3, an insulating layer 6, a second sealant layer 4b and a first sealant layer 4a laminated in this order.

In Example 12F, a laminated film of third sealant layer 4c (thickness: 5 μm)/second sealant layer 4b (thickness: 20 μm)/first sealant layer 4a (thickness: 5 μm), which was formed of a resin as described in Table 3F, was laminated from above the dried resin composition of the insulating layer, and bonded by thermal lamination to form a laminate. Further, the obtained laminate was heated at 190° C. for 2 minutes to obtain a battery packaging material including a laminate with a base material layer 1, an adhesive layer 2, a metal layer 3, an insulating layer 6, a third sealant layer 4c, a second sealant layer 4b and a first sealant layer 4a laminated in this order. The resins for forming the insulating layer 6, the first sealant layer 4a, the second sealant layer 4b and the third sealant layer 4c, the curing agents and so on are as shown in Table 3F. For the melting points of the resins for forming the insulating layer 6, the first sealant layer 4a, the second sealant layer 4b and the third sealant layer 4c, values obtained by performing measurement by a DSC method are shown.

<Evaluation of Sealing Property and Unsealing Property of Battery Packaging Material>

For the battery packaging materials obtained in Examples 7F to 15F and Comparative Examples 6F to 12F, the sealing property and the unsealing property were evaluated in the same manner as in Example 1F. The results are shown in Table 3F.

<Evaluation of Durability>

For the battery packaging materials obtained in Examples 7F to 13F, durability was evaluated in the same manner as in Example 1F. The results are shown in Table 3F.

<Evaluation of Insulation Quality to Caught Contaminants)

For the battery packaging materials obtained in Examples 7F to 13F, insulation quality to caught contaminants was evaluated in the same manner as in Example 1F. The results are shown in Table 3F.

<Evaluation of Insulation Quality to Cracks>

For the battery packaging materials obtained in Examples 7F to 13F, insulation quality to cracks was evaluated in the same manner as in Example 1F. The results are shown in Table 3F.

TABLE 3F

| | Insulating layer | | | | | | | Sealant layer | | |
|---|---|---|---|---|---|---|---|---|---|---|
| | Acid-modified polyolefin-based resin | | | | | | | Third sealant layer | Second sealant layer | First sealant layer |
| | Molecular weight (weight average) | Melting point $T_A$ (° C.) | Polyolifin-based resin | Ratio of maleic anhydride (% by mass) | Ratio of acrylic acid ester (% by mass) | Curing agent | Modified polypropylene/ curing agent (mass ratio) | Melting point $Tm_1$ (° C.) of polyolefin-based resin | Melting point $Tm_2$ (° C.) of polyolefin-based resin | Melting point $Tm_1$ (° C.) of polyolefin-based resin |
| Comparative Example 6F | 50000 | 130 | Ethylene-propylene | 6 | 5 | Oxazoline | 10/1 | | 145 | 128 |
| Comparative Example 7F | 50000 | 130 | Ethylene-propylene | 6 | 5 | Oxazoline | 10/1 | | 145 | 148 |
| Example 7F | 50000 | 130 | Ethylene-propylene | 6 | 5 | Oxazoline | 10/1 | | 145 | 135 |

TABLE 3F-continued

| | | | | | | | | | |
|---|---|---|---|---|---|---|---|---|---|
| Example 8F | 50000 | 130 | Ethylene-propylene | 6 | 5 | Oxazoline | 10/1 | | 150 | 145 |
| Example 9F | 50000 | 130 | Ethylene-propylene | 6 | 5 | Oxazoline | 10/1 | | 150* | 145 |
| Comparative Example 8F | 130000 | 140 | Propylene | 5 | 4 | MDI | 10/1 | | 155 | 138 |
| Comparative Example 9F | 130000 | 140 | Propylene | 5 | 4 | MDI | 10/1 | | 155 | 158 |
| Comparative Example 10F | 130000 | 140 | Propylene | 5 | 4 | MDI | 10/1 | | 160 | 138 |
| Comparative Example 11F | 130000 | 140 | Propylene | 5 | 4 | MDI | 10/1 | | 160 | 158 |
| Example 10F | 50000 | 140 | Ethylene-propylene | 5 | 4 | Oxazoline | 10/1 | | 155 | 145 |
| Example 11F | 50000 | 140 | Ethylene-propylene | 5 | 4 | Oxazoline | 10/1 | | 155* | 145 |
| Example 12F | 50000 | 140 | Ethylene-propylene | 5 | 4 | Oxazoline | 10/1 | 145 | 155 | 145 |
| Example 13F | 50000 | 140 | Ethylene-propylene | 5 | 4 | Oxazoline | 10/1 | | 160 | 155 |
| Comparative Example 12F | 40000 | 150 | Propylene | 3 | 3 | Oxazoline | 10/1 | | 165 | 148 |
| Example 14F | 40000 | 150 | Propylene | 3 | 3 | Oxazoline | 10/1 | | 165 | 155 |
| Example 15F | 40000 | 150 | Propylene | 3 | 3 | Oxazoline | 10/1 | | 165 | 160 |

| | | | | Evaluation of durability | | Evaluation of insulation quality | | Evaluation of unsealing property | |
|---|---|---|---|---|---|---|---|---|---|
| | $T_A - T$ (° C.) | $T_{m1} - T$ (° C.) | $T_{m2} - T$ (° C.) | Peeling strength before durability test (N/15 mm) | Peeling strength after durability test (N/15 mm) | Evaluation of insulation quality to caught contaminants | Evaluation of insulation quality to cracks | Set temperature T (° C.) | Results of evaluation of sealing property and unsealing property |
| Comparative Example 6F | −10 | −12 | 5 | | | | | 140 | X |
| Comparative Example 7F | −10 | 8 | 5 | | | | | 140 | X |
| Example 7F | −10 | −5 | 5 | 8.1 | 8.3 | ○ | ○ | 140 | ○ |
| Example 8F | −10 | 5 | 10 | 8.5 | 8.6 | ○ | ○ | 140 | ○ |
| Example 9F | −10 | 5 | 10 | 7.9 | 8.4 | ○ | ○ | 140 | ○ |
| Comparative Example 8F | −10 | −12 | 5 | | | | | 150 | X |
| Comparative Example 9F | −10 | 8 | 5 | | | | | 150 | X |
| Comparative Example 10F | −10 | −12 | 10 | | | | | 150 | X |
| Comparative Example 11F | −10 | 8 | 10 | | | | | 150 | X |
| Example 10F | −10 | −5 | 5 | 7.7 | 8.2 | ○ | ○ | 150 | ○ |
| Example 11F | −10 | −5 | 5 | 7.5 | 7.8 | ○ | ○ | 150 | ○ |
| Example 12F | −10 | −5 | 5 | 8.1 | 8.4 | ○ | ○ | 150 | ○ |
| Example 13F | −10 | 5 | 10 | 6.9 | 6.6 | ○ | ○ | 150 | ○ |
| Comparative Example 12F | −10 | −12 | 5 | | | | | 160 | X |
| Example 14F | −10 | −5 | 5 | | | | | 160 | ○ |
| Example 15F | −10 | 0 | 5 | | | | | 160 | ○ |

In Examples 7F to 15F where in a battery packaging material including in order an insulating layer formed of a resin composition containing an acid-modified polyolefin resin and a curing agent, a second sealant layer 4b containing a polyolefin resin or an acid-modified polyolefin resin, and a first sealant layer 4a containing a polyolefin resin, the difference ($T_A$−T) between the melting point $T_A$ of the insulating layer and the set temperature T was not less than −10° C. and not more than −5° C., the difference ($T_{m2}$−T) between the melting point $T_{m2}$ of the second sealant layer 4b and the set temperature T was not less than −10° C. and not more than −5° C., and the difference ($T_{m1}$−T) between the melting point $T_{m1}$ of the first sealant layer 4a and the set temperature T was not less than −5° C. and not more than +5° C., at least a part of the insulating layer 6 was delaminated from the interface between itself and the metal layer 3, but the insulating layer 6 and the sealant layer 4 were formed into a bag shape to keep the inner part hermetically sealed until the ambient temperature reached the set temperature T° C., and 30 minutes after the ambient temperature reached the set temperature T° C., fine cleavages like pinholes were generated in the insulating layer 6 and the sealant layer 4 at the part delaminated from the metal layer 3, so that the battery packaging material could be unsealed under gentle conditions. On the other hand, in Comparative Examples 6F to 12F where the difference ($T_{m1}$−T) between the melting point $T_{m1}$ of the first sealant layer 4a and the set temperature T failed to satisfy the range of not less than −5°

C. and not more than +5° C., the battery packaging material turned into an unsealed state before the ambient temperature reached the set temperature T° C., so that cohesive fracture at the heat sealed part or root cutting of the sealant layer 4 occurred, or the battery packaging material could not be turned into an unsealed state even 30 minutes after the ambient temperature reached the set temperature T° C.

On the other hand, the battery packaging material of Examples 7F to 13F, each of which included an insulating layer formed of a resin composition containing an acid-modified polyolefin resin and a curing agent, had high insulation performance to both caught contaminants and cracks, had a reduced change in peeling strength before and after the durability test, and were excellent in durability.

Examples 16F to 31F and Comparative Examples 13F to 15F

Production of Battery Packaging Material

A laminate of base material layer 1/adhesive layer 2/metal layer 3 was prepared in the same manner as in Example 1F. A resin composition containing a modified polyolefin resin and a curing agent as described in Table 4F was then applied in a thickness of 5 μm, and dried for forming an insulating layer on the laminate on the metal layer 3 side. A resin for forming the second sealant layer 4b and a resin for forming the first sealant layer 4a were then co-extruded in a molten state from above the dried resin composition to laminate the second sealant layer 4b (thickness: 20 μm) and the first sealant layer 4a (thickness: 10 μm) on the insulating layer. Further, the obtained laminate was heated by the following heating methods A to D to obtain a battery packaging material including a laminate with a base material layer 1, an adhesive layer 2, a metal layer 3, an insulating layer 6, a second sealant layer 4b and a first sealant layer 4a laminated in this order.

<Heating Methods>
A: heating at 190° C. for 2 minutes
B: heating at 190° C. for 2 minutes, followed by aging at 60° C. for 1 day
C: aging at 60° C. for 1 day, followed by heating at 190° C. for 2 minutes
D: aging at 80° C. for 1 day The resins for forming the insulating layer 6, the first sealant layer 4a and the second sealant layer 4b, the curing agents and so on are as shown in Table 4F. For the melting points of the resins for forming the insulating layer 6, the first sealant layer 4a and the second sealant layer 4b, values obtained by performing measurement by a DSC method are shown.

<Evaluation of Sealing Property and Unsealing Property of Battery Packaging Material>

For the battery packaging materials obtained in Examples 16F to 31F and Comparative Examples 13F to 15F, the sealing property and the unsealing property were evaluated in the same manner as in Example 1F. The results are shown in Table 4F.

<Evaluation of Durability>

For the battery packaging materials obtained in Examples 16F to 31F and Comparative Examples 13F to 15F, durability was evaluated in the same manner as in Example 1F. The results are shown in Table 4F.

<Evaluation of Insulation Quality to Caught Contaminants)

For the battery packaging materials obtained in Examples 16F to 31F and Comparative Examples 13F to 15F, insulation quality to caught contaminants was evaluated in the same manner as in Example 1F. The results are shown in Table 4F.

<Evaluation of Insulation Quality to Cracks>

For the battery packaging materials obtained in Examples 16F to 31F and Comparative Examples 13F to 15F, insulation quality to cracks was evaluated in the same manner as in Example 1F. The results are shown in Table 4F.

TABLE 4F

| | Insulating layer | | | | | | | Sealant layer | | |
| --- | --- | --- | --- | --- | --- | --- | --- | --- | --- | --- |
| | Acid-modified polyolefin-based resin | | | | | | | Second sealant layer | First sealant layer | |
| | Molecular weight (weight average) | Melting point $T_A$ (° C.) | Polyolifin-based resin | Ratio of maleic anhydride (% by mass) | Ratio of acrylic acid ester (% by mass) | Curing agent | Modified polypropylene/ curing agent (mass ratio) | Melting point $T_2$ (° C.) of polyolefin-based resin | Melting point $T_1$ (° C.) of polyolefin-based resin | Heating method |
| Comparative Example 13F | 50000 | 130 | Ethylene-propylene | 6 | 5 | None | | 145 | 135 | A |
| Example 16F | 50000 | 130 | Ethylene-propylene | 6 | 5 | Oxazoline | 10/1 | 145 | 135 | A |
| Comparative Example 14F | 130000 | 140 | Propylene | 5 | 4 | None | | 155 | 145 | A |
| Example 17F | 130000 | 140 | Propylene | 5 | 4 | MDI | 10/1 | 155 | 145 | A |
| Example 18F | 130000 | 140 | Propylene | 5 | 4 | MDI | 10/0.5 | 155 | 145 | A |
| Example 19F | 130000 | 140 | Propylene | 5 | 4 | MDI | 10/3 | 155 | 145 | A |
| Example 20F | 130000 | 140 | Propylene | 5 | 4 | MDI | 10/1 | 155 | 145 | B |
| Example 21F | 130000 | 140 | Propylene | 5 | 4 | MDI | 10/1 | 155 | 145 | C |
| Example 22F | 130000 | 140 | Propylene | 5 | 4 | MDI | 10/1 | 155 | 145 | D |
| Example 23F | 130000 | 140 | Propylene | 5 | 4 | IPDI | 10/1 | 155 | 145 | A |
| Example 24F | 130000 | 140 | Propylene | 5 | 4 | HDI | 10/1 | 155 | 145 | A |
| Example 25F | 130000 | 140 | Propylene | 5 | 4 | TDI | 10/1 | 155 | 145 | A |
| Example 26F | 130000 | 140 | Propylene | 5 | 4 | Carbodiimide | 10/0.05 | 155 | 145 | A |
| Example 27F | 130000 | 140 | Propylene | 5 | 4 | Epoxy resin | 10/1 | 155 | 145 | A |
| Example 28F | 130000 | 140 | Propylene | 5 | 4 | Oxazoline | 10/1 | 155 | 145 | A |
| Example 29F | 130000 | 140 | Propylene | 5 | 4 | Oxazoline | 10/0.5 | 155 | 145 | A |

TABLE 4F-continued

| | | | | | | | | | | |
|---|---|---|---|---|---|---|---|---|---|---|
| Example 30F | 130000 | 140 | Propylene | 5 | 4 | Oxazoline | 10/2 | 155 | 145 | A |
| Comparative Example 15F | 40000 | 150 | Propylene | 3 | 3 | None | | 165 | 155 | A |
| Example 31F | 40000 | 150 | Propylene | 3 | 3 | Oxazoline | 10/1 | 165 | 155 | A |

| | $T_A - T$ (° C.) | $Tm_1 - T$ (° C.) | $Tm_2 - T$ (° C.) | Evaluation of durability | | Evaluation of insulation quality | | Evaluation of unsealing property | Results of evaluation of sealing property and unsealing property |
|---|---|---|---|---|---|---|---|---|---|
| | | | | Peeling strength before durability test (N/15 mm) | Peeling strength after durability test (N/15 mm) | Evaluation of insulation quality to caught contaminants | Evaluation of insulation quality to cracks | Set temperature T (° C.) | |
| Comparative Example 13F | −10 | −5 | 5 | 7.8 | 3.0 | X | ○ | 140 | ○ |
| Example 16F | −10 | −5 | 5 | 8.7 | 8.6 | ○ | ○ | 140 | ○ |
| Comparative Example 14F | −10 | −5 | 5 | 6.6 | 2.9 | X | X | 150 | ○ |
| Example 17F | −10 | −5 | 5 | 8.3 | 8.4 | ○ | ○ | 150 | ○ |
| Example 18F | −10 | −5 | 5 | 7.8 | 7.4 | ○ | ○ | 150 | ○ |
| Example 19F | −10 | −5 | 5 | 6.9 | 7.3 | ○ | ○ | 150 | ○ |
| Example 20F | −10 | −5 | 5 | 7.9 | 8.0 | ○ | ○ | 150 | ○ |
| Example 21F | −10 | −5 | 5 | 8.5 | 8.3 | ○ | ○ | 150 | ○ |
| Example 22F | −10 | −5 | 5 | 6.7 | 6.3 | ○ | ○ | 150 | ○ |
| Example 23F | −10 | −5 | 5 | 7.4 | 7.1 | ○ | ○ | 150 | ○ |
| Example 24F | −10 | −5 | 5 | 7.2 | 7.4 | ○ | ○ | 150 | ○ |
| Example 25F | −10 | −5 | 5 | 9.1 | 8.8 | ○ | ○ | 150 | ○ |
| Example 26F | −10 | −5 | 5 | 7.8 | 8.1 | ○ | ○ | 150 | ○ |
| Example 27F | −10 | −5 | 5 | 8.0 | 7.6 | ○ | ○ | 150 | ○ |
| Example 28F | −10 | −5 | 5 | 8.9 | 8.5 | ○ | ○ | 150 | ○ |
| Example 29F | −10 | −5 | 5 | 7.5 | 7.7 | ○ | ○ | 150 | ○ |
| Example 30F | −10 | −5 | 5 | 9.1 | 8.7 | ○ | ○ | 150 | ○ |
| Comparative Example 15F | −10 | −5 | 5 | 6.5 | 3.0 | X | X | 160 | ○ |
| Example 31F | −10 | −5 | 5 | 9.4 | 8.9 | ○ | ○ | 160 | ○ |

In Examples 16F to 31F and Comparative Examples 13F to 15F where in a battery packaging material including in order an insulating layer formed of a resin composition containing an acid-modified polyolefin resin and a curing agent, a second sealant layer 4b containing a polyolefin resin or an acid-modified polyolefin resin, and a first sealant layer 4a containing a polyolefin resin, the difference ($T_A-T$) between the melting point $T_A$ of the insulating layer and the set temperature T was not less than −10° C. and not more than −5° C., the difference ($T_{m2}-T$) between the melting point $T_{m2}$ of the second sealant layer 4b and the set temperature T was not less than −10° C. and not more than −5° C., and the difference ($T_{m1}-T$) between the melting point $T_{m1}$ of the first sealant layer 4a and the set temperature T was not less than −5° C. and not more than +5° C., at least a part of the insulating layer 6 was delaminated from the interface between itself and the metal layer 3, but the sealant layer 4 were formed into a bag shape to keep the inner part hermetically sealed until the ambient temperature reached the set temperature T° C., and 30 minutes after the ambient temperature reached the set temperature T° C., fine cleavages like pinholes were generated in the insulating layer 6 and the sealant layer 4 at the part delaminated from the metal layer 3, so that the battery packaging material could be unsealed under gentle conditions.

On the other hand, the battery packaging material of Examples 16F to 31F, each of which included an insulating layer 6 formed of a resin composition containing an acid-modified polyolefin resin and a curing agent, had high insulation performance to both caught contaminants and cracks, had a reduced change in peeling strength before and after the durability test, and were excellent in durability. On the other hand, the battery packaging material of Comparative Example 13F in which the resin composition for forming the insulating layer 6 did not contain a curing agent had low insulation quality to caught contaminants, and low durability. The battery packaging materials of Comparative Examples 14F and 15F in which the resin composition for forming the insulating layer did not contain a curing agent had low insulation quality to both caught contaminants and cracks, and low durability.

DESCRIPTION OF REFERENCE SIGNS

1 Base material layer
2 Adhesive layer
3 Metal Layer
4 Sealant layer
5 Adhesive layer
6 Insulating layer
10 Fine cleavages

The invention claimed is:

1. A battery packaging material which is used in a battery and is configured to ensure that when the battery is heated to a set temperature T° C. fixed between 100° C. and 160° C., the packaging material is not unsealed until the ambient temperature reaches T° C., and after the ambient temperature reaches T° C., the packaging material is quickly unsealed, the battery packaging material comprising a laminate including at least a base material layer, a metal layer and a sealant layer in this order, wherein:

the base material layer, the metal layer, and the sealant layer all cover a substantially identical surface area of the battery, the sealant layer includes a first sealant layer which is situated on the metal layer side and which contains an acid-modified polyolefin, and a second sealant layer which is laminated on the first sealant layer and situated at the innermost layer and which contains a polyolefin, and the first sealant layer and the second sealant layer satisfy the following formulae (1) and (2):

$$-10 \leq T_{m1}-T \leq -5 \tag{1}$$

$$-5 \leq T_{m2}-T \leq 5 \tag{2}$$

where:

$T_{m1}$ is a melting point (° C.) of the first sealant layer; and
$T_{m2}$ is a melting point (° C.) of the second sealant layer.

2. The battery packaging material according to claim 1, wherein before the ambient temperature reaches T° C., the battery packaging material is configured to delaminate at least at a part of an interface between the metal layer and an outside surface of the sealant layer while maintaining a hermetically sealed state, and then the battery packaging material is configured to change to an unsealed state after the ambient temperature reaches T° C.

3. The battery packaging material according to claim 2, wherein an inner bag is formed at the delaminated part before the ambient temperature reaches T° C., and then the inner bag is then cleaved and the battery packaging material works so as to turn into the unsealed state after the ambient temperature reaches T° C.

4. The battery packaging material according to claim 1, further including an adhesive layer between the base material layer and the metal layer.

5. The battery packaging material according to claim 1, further including an adhesive layer between the metal layer and the sealant layer.

6. The battery packaging material according to claim 1, wherein before the ambient temperature reaches T° C., the battery packaging material is configured to delaminate at least at one of an interface between the metal layer and the sealant layer, an interface between the metal layer and an adhesive layer, an interface between an adhesive layer and the sealant layer, the inside of an adhesive layer, and the inside of the sealant layer.

7. The battery packaging material according to claim 1, wherein a lamination strength between the metal layer and the sealant layer at 25° C. is 3 (N/15 mm) or more.

8. The battery packaging material according to claim 1, wherein a lamination strength between the metal layer and the sealant layer at 80° C. is 2.5 (N/15 mm) or more, and a lamination strength between the metal layer and the sealant layer at 125° C. is 2.5 (N/15 mm) or less.

9. The battery packaging material according to claim 1, wherein a sealing strength at a part that is heat-sealed with the sealant layers facing each other at 25° C. is 30 (N/15 mm) or more.

10. The battery packaging material according to claim 1, wherein a sealing strength at a part that is heat-sealed with the sealant layers facing each other at 125° C. is 20 (N/15 mm) or less.

11. The battery packaging material according to claim 1, wherein the battery packaging material is a bag-shaped packaging material obtained by performing heat-sealing with the sealant layers facing each other, and a sealing strength of the heat-sealed part is 0.2 (N/15 mm) or more after the packaging material is left standing at 85° C. for 24 hours with an electrolytic solution contained in an internal space of the bag-shaped packaging material.

12. The battery packaging material according to claim 1, wherein before the ambient temperature reaches T° C., the first sealant layer is configured to turn into a molten state so that at least a part of the sealant layer is delaminated from an interface between the metal layer and the sealant layer while maintaining a hermetically sealed state, and then the battery packaging material is configured to change to an unsealed state after the ambient temperature reaches T° C.

13. The battery packaging material according to claim 1, wherein the sealant layer extends substantially the same length as a remainder of the laminate.

14. A battery packaging material which is used in a battery and is configured to ensure that when the battery is heated to a set temperature T° C. fixed between 100° C. and 160° C., the packaging material is not unsealed until the ambient temperature reaches T° C., and after the ambient temperature reaches T° C., the packaging material is quickly unsealed, the battery packaging material comprising a laminate including at least a base material layer, a metal layer and a sealant layer in this order, wherein:

the sealant layer includes a first sealant layer which is situated on the metal layer side and which contains an acid-modified polyolefin, and a second sealant layer which is laminated on the first sealant layer and situated at the innermost layer and which contains a polyolefin, a surface area of the first sealant layer and a surface area of the second sealant layer are substantially identical to a surface area of the laminate, and the first sealant layer and the second sealant layer satisfy the following formulae (1) and (2):

$$-10 \leq T_{m1}-T \leq -5 \tag{1}$$

$$-5 \leq T_{m2}-T \leq 5 \tag{2}$$

where:

$T_{m1}$ is a melting point (° C.) of the first sealant layer; and
$T_{m2}$ is a melting point (° C.) of the second sealant layer.

15. A battery packaging material which is used in a battery and is configured to ensure that when the battery is heated to a set temperature T° C. fixed between 100° C. and 160° C., the packaging material is not unsealed until the ambient temperature reaches T° C., and after the ambient temperature reaches T° C., the packaging material is quickly unsealed, the battery packaging material comprising a laminate including at least a base material layer, a metal layer and a sealant layer in this order, wherein:

the sealant layer extends to cover an entirety of the battery except for one or more metal terminals that protrude outside of the battery packaging material, the sealant layer includes a first sealant layer which is situated on the metal layer side and which contains an acid-modified polyolefin, and a second sealant layer which is laminated on the first sealant layer and situated at the innermost layer and which contains a polyolefin, and the first sealant layer and the second sealant layer satisfy the following formulae (1) and (2):

$$-10 \leq T_{m1} - T \leq -5 \quad (1)$$

$$-5 \leq T_{m2} - T \leq 5 \quad (2)$$

where:
$T_{m1}$ is a melting point (° C.) of the first sealant layer; and
$T_{m2}$ is a melting point (° C.) of the second sealant layer.

16. A battery packaging material which is used in a battery and is configured to ensure that when the battery is heated to a set temperature T° C. fixed between 100° C. and 160° C., the packaging material is not unsealed until the ambient temperature reaches T° C., and after the ambient temperature reaches T° C., the packaging material is quickly unsealed, the battery packaging material comprising a laminate including at least a base material layer, a metal layer and a sealant layer in this order, wherein:

before the ambient temperature reaches T° C., the battery packaging material is configured to delaminate at least at a part of an interface between the metal layer and an outside surface of the sealant layer such that a delaminated part of the sealant layer forms an inner bag in which the battery is kept hermetically sealed, after the ambient temperature reaches T° C., the battery packaging material is configured to change to an unsealed state, the sealant layer includes a first sealant layer which is situated on the metal layer side and which contains an acid-modified polyolefin, and a second sealant layer which is laminated on the first sealant layer and situated at the innermost layer and which contains a polyolefin, and the first sealant layer and the second sealant layer satisfy the following formulae (1) and (2):

$$-10 \leq T_{m1} - T \leq -5 \quad (1)$$

$$-5 \leq T_{m2} - T \leq 5 \quad (2)$$

where:
$T_{m1}$ is a melting point (° C.) of the first sealant layer; and
$T_{m2}$ is a melting point (° C.) of the second sealant layer.

* * * * *